(12) United States Patent
Nakamura et al.

(10) Patent No.: US 6,396,795 B2
(45) Date of Patent: May 28, 2002

(54) DISC CHANGER WITH GAP MAINTAINING MEANS

(75) Inventors: Masahiko Nakamura, Osaka; Seizo Miyoshi, Neyagawa; Yukio Morioka, Katano; Takeshi Ota, Yao, all of (JP)

(73) Assignee: Matsushita Electric Industrial Co., Ltd. (JP)

( * ) Notice: Subject to any disclaimer, the term of this patent is extended or adjusted under 35 U.S.C. 154(b) by 0 days.

(21) Appl. No.: 09/790,540

(22) Filed: Feb. 23, 2001

Related U.S. Application Data

(62) Division of application No. 09/273,716, filed on Mar. 22, 1999, now Pat. No. 6,262,963.

(30) Foreign Application Priority Data

Mar. 27, 1998 (JP) .............................................. 10-80077
Mar. 27, 1998 (JP) .............................................. 10-80079
Mar. 27, 1998 (JP) .............................................. 10-80080

(51) Int. Cl.[7] ......................... G11B 17/04; G11B 17/08; G11B 33/02

(52) U.S. Cl. ...................................... 369/191; 369/77.1

(58) Field of Search .................................. 369/191, 192, 369/193, 194, 178, 75.1, 75.2, 77.1, 179, 34, 36, 212

(56) References Cited

U.S. PATENT DOCUMENTS

| | | | |
|---|---|---|---|
| 1,302,217 A | 4/1919 | Raney | 369/191 |
| 5,636,198 A | 6/1997 | Maeng | 369/191 |
| 5,959,958 A * | 9/1999 | Inatani et al. | 369/178 |
| 6,091,696 A | 7/2000 | Miyoshi et al. | 369/192 |

* cited by examiner

Primary Examiner—Hoa T. Nguyen
Assistant Examiner—Julie Anne Watko
(74) Attorney, Agent, or Firm—Parkhurst & Wendel, L.L.P.

(57) ABSTRACT

According to the present invention, an elevating means for elevating and lowering the spindles constituting the disc holding means and a disc playing means is configured so that a single part simultaneously performs these operations. Since the same part is driven to perform these operations, elevating and lowering timings for the spindles and the disc playing means can be easily matched to enable the elevation and lowering without changes in the gap between a played disc being elevated or lowered and held discs in a housing section, thereby preventing the discs being elevated or lowered from contacting with each other.

7 Claims, 44 Drawing Sheets

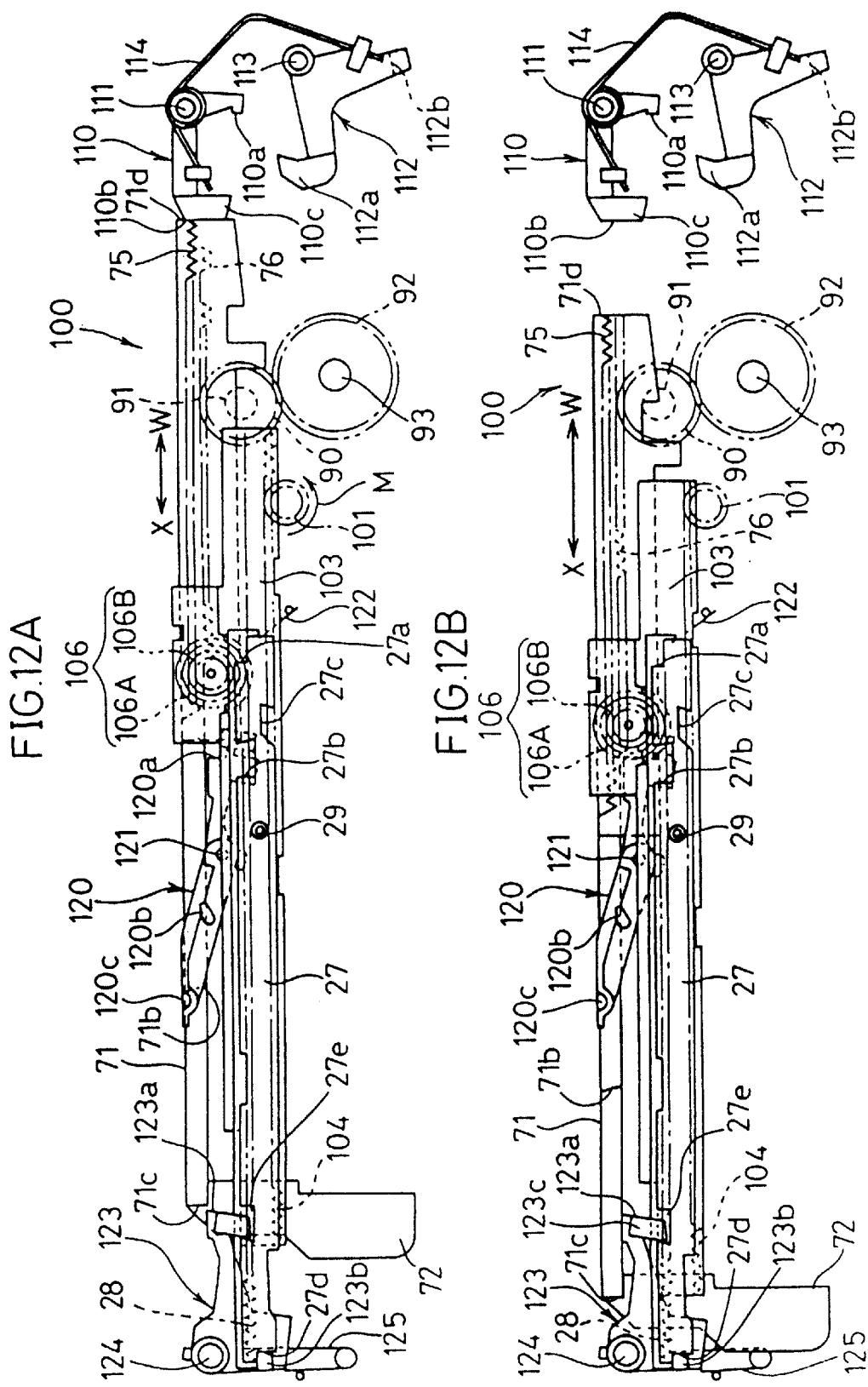

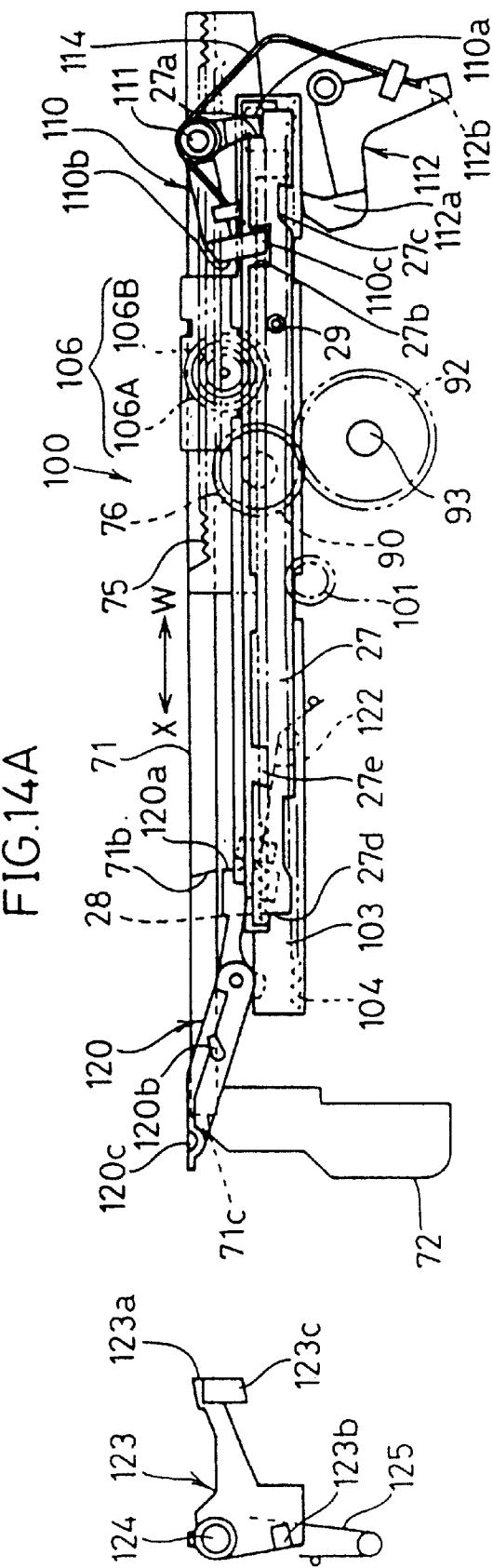
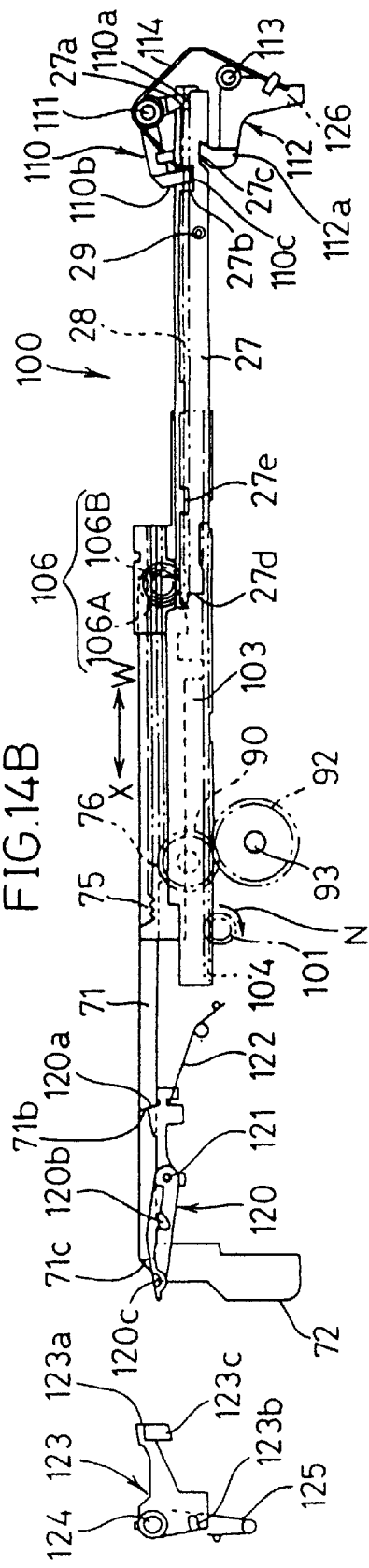
FIG.14A
FIG.14B

MODE SWITCHING

DISC CHANGER WITH GAP MAINTAINING MEANS

This application is a Rule 53(b) divisional application of U.S. Ser. No. 09/273,716, filed Mar. 22, 1999, now U.S. Pat. No. 6,262,963.

FIELD OF THE INVENTION

The present invention relates to a disc changer in which a plurality of discs are installed to select any one of the discs for recording/playing.

BACKGROUND OF THE INVENTION

In a conventional disc changer, a disc holding means is configured to house a plurality of subtrays in a stocker having a plurality of shelves, and a vertical driving means for selecting the position of an arbitrary disc is configured to drive all of the stocker, the plurality of subtrays, and the plurality of discs in the vertical direction.

In the conventional disc changer, however, while the vertical driving means for driving a disc holding means to select an arbitrary disc position is effecting driving, the large weight of the stocker having the plurality of shelves and the disc holding means for driving all of the plurality of subtrays and discs may cause a vertical driving motor to consume a large amount of energy or cause falling of finished discs or inappropriate vibration. In addition, the large number of parts increases costs.

Then, a recently contemplated disc changer comprises a disc holding means 204 for detachably supporting a plurality of spacers 203 on a pair of spindles 201 and 202 using a holding claw 200, a vertical driving means 205 for driving the spacers 203 in the vertical direction to select arbitrary positions of a plurality of discs 223 and 224 held by the plurality of spacers 203, a spindle driving means 206 for driving the holding claw 200 to engage and disengage the plurality of spacers 203 with and from the upper spindle 201, a horizontal transfer means 207 for transferring discs 223 and 224 to a recording/playing position E from arbitrary spacers 203 held by the holding claw 200, while supporting the discs on subtrays 225, and a disc clamp means 208 for clamping the discs 223 and 224 at the recording/playing position E, for example, as shown in FIGS. 43 to 45.

The disc changer of this configuration can drive in the vertical direction the plurality of spacers 203 and plurality of discs 223 and 224 installed on both spindles 201 and 202 to shift the arbitrary disc 223 or 224 from the spindle 201 or 202 to the recording/playing position E, then to an unloading position G, and back to a housing position F on the spindle 201 or 202, and can select the arbitrary disc 223 or 224 for recording/playing. Thereby, this configuration eliminates the needs for a stocker having a plurality of shelves or a plurality of subtrays to reduce the weight and costs, and provides a disc changer having excellent housing and operating capabilities.

In this disc changer, however, separate elevating cams 209 and 210, connecting mechanisms 211 and 212 and lock means 213 and 214 were used to execute driving including the elevation and lowering of the disc holding means 204 using the spindles and the elevation and lowering of the disc clamp means 208 to clamp the discs 223 and 224 at the recording/playing position E. Consequently, the apparatus was complicated and loads of the elevating cams 209 and 210 enormously varied when the spindles 202 of the disc holding means 204 and the disc clamp means 208 were simultaneously driven to elevate and lower, respectively, resulting in problems such as an unstable operation during the elevating driving caused by an insufficient driving force and a high operation noise during the lowering driving.

Furthermore, since a horizontal transfer means 207 for transferring a tray 215 depended on driving based on the engagement between a single driving gear 216 and racks 217 and 218 provided for each part, the driving was carried out at a single reduction gear ratio to preclude the reduction gear ratio from being adjusted to account for operation loads, thereby preventing requirements for both the operation time and load margin from being met.

Furthermore, due to the independency between a vertical driving system for driving in the vertical direction the spacers 203 holding the discs 223 and 224 and a horizontal driving system for driving the elevation and lowering of the spindle and transferring the tray 215, separate driving sources had to be provided for these systems, and intermediate gears were also required. As a result, the number of required parts was increased to increase the size and costs of the apparatus.

Moreover, in order to compactify the changer, an attempt was made to reduce the distance between the recording/playing position E and the disc holding position F so that the disc 224 at the recording/playing position E appeared to partly overlap the disc 224 at the disc holding section as seen from above. Due to vibration, however, the disc housed adjacent to the disc 224 under recording/playing at the disc holding section contacted the disc 224 under recording/playing to cause an accidental track shift or to damage the disc.

Furthermore, in order to integrate the independent driving sources into a single common source, an attempt was made to allow-part of the gear train to be shared by both the driving system for the vertical driving of the spacers 203 and the horizontal driving system and to use a gear that slided in the axial direction to select the engaged driving system, as a means for switching the driving. When, however, the gear sliding in the axial direction started to engage with the gear of the driving system upon driving switching, it was blocked and failed to effect switching, causing the apparatus to stop with an abnormal noise.

Moreover, the disc clamp means 208 was elevated from and lowered to the recording/playing position E by engaging a lateral pair of pins 221 on a disc playing means 220 with cam grooves 219 formed in right and left elevating cams 210. In this case, during elevation and lowering, the disc playing means 220 might be rotationally moved via the pins 221. If two left pins and one right pin were used instead of the lateral pair of pins 221 to solve this problem, the stroke of the right and left elevating cams 210 increased, resulting in another new problem that size of the apparatus increased.

Furthermore, when the tray 215 was opened to change the disc, a disc of a small diameter 223 such as 8 cm might accidentally fall into the apparatus due to a large opening 222 in the front surface of the apparatus.

DISCLOSURE OF THE INVENTION

It is an object of this invention to provide a small disc changer of a simple configuration that can avoid operation noise or unstable operations due to the variation of operation loads, that enables a disc playing means to be elevated and lowered with its posture maintained in the horizontal direction, and that can prevent a disc from accidentally falling into the apparatus when a tray is opened.

To achieve this object, a disc changer according to this invention comprises an apparatus body, a disc transfer means for transferring a disc in the apparatus body between a disc housing position and a disc playing position, and a vertical pair of spindles detachably holding a plurality of spacers at the disc housing position, and comprises a disc holding means capable of relatively elevating and lowering the spindles and driving the spacers in the vertical direction to deliver the disc to the disc transfer means, a disc playing means supported on the apparatus body at the disc playing position so as to be able to elevate and lower, an elevating means for elevating and lowering the spindles and the disc playing means, and a horizontal driving means capable of driving the disc transfer means and the elevating means, wherein the elevating means is configured so that a single part simultaneously effects the driving of the spindles and the disc playing means.

This invention can drive in the vertical direction the plurality of spacers and plurality of discs installed on both spindles to shift the arbitrary disc from the spindle to a disc playing position, then to an unloading position, and back to a disc housing position on the spindle, and can select the arbitrary disc for recording/playing. This configuration eliminates the needs for a stocker having a plurality of shelves or a plurality of subtrays to reduce the weight and costs, and provides a disc changer having excellent housing and operating capabilities.

Besides, the same part is used to drive the elevation and lowering of the spindles of the disc holding means and the disc playing means to allow the elevation and lowering timings for both components to coincide easily in order to enable elevation and lowering without a change in the gap between a played disc being elevated or lowered and a held disc in the housing section, thereby preventing discs from contacting each other during elevation or lowering.

One embodiment of this invention is configured so that a plate having a cam groove drives the elevation and lowering of the spindles of the disc holding means and the disc playing means.

According to this embodiment, the spindles and the disc playing means can be elevated and lowered using a simple configuration in such a way as to maintain coincident timings.

Another embodiment of this invention uses in part of the elevating means for the spindles and the disc playing means, a cam gear connected to a lateral pair of plates via an intermediate gear to rotate in synchronism with the movement of the plates.

Even if the pitch between the pins provided in the lateral direction relative to the disc playing means is different from the width-wise pitch of the pins provided in the lateral direction relative to a elevating base for the spindles, this embodiment enables elevation and lowering using the simple configuration without a change in such a way as to maintain coincident timings for both components.

In addition, according to the disc changer of this invention, the horizontal driving means is composed of a driving gear connected to the driving source via a speed reduction mechanism, a driving rack meshing with the driving gear, and a speed-increasing gear rotatably supported on the driving rack. The speed-increasing gear is a double-gear unit composed of a larger and a smaller gears having the same number of teeth and different modules, and the smaller gear engages with a rack provided in the elevating means, while the larger gear engages with a rack provided in the disc transfer means.

According to this invention, by freely selecting the module, that is, the pitch diameter between the larger and smaller gears having the same number of teeth, the driving of the tray and the driving of the elevating means for the spindle and the disc playing means, the two driving types involving significantly different operation loads, can be freely set so that a driving force transmitted from the common driving source is suitable for the loads on the tray and the elevating means and the required speeds.

Furthermore, the disc changer according to this invention comprises a switching gear connected to the driving source via the speed reduction mechanism and supported so as to slide in the axial direction and that can selectively mesh with either a gear train provided in the horizontal driving means or a gear train provided in the vertical driving system for the spacers; and a drive-switching means for allowing the switching gear to slide in the axial direction, and has a switching mode that includes at least the rotational driving, stop, and reverse driving of the switching gear and that is available during the sliding of the switching gear effected by the drive-switching means.

According to this invention, the switching gear switching between the two driving systems meshes with the gear train in one of the driving systems while carrying out a small number of repetitions of rotations, stoppages, and reverse rotations, thereby preventing the tooth tips from mutually abutting to obstruct the sliding of the switching gear. This configuration enables the sharing of the driving source and the partial sharing of the driving systems to reduce the number of required parts and thus the size of the apparatus.

One embodiment of this invention uses in part of the common speed reduction mechanism, an elastic belt each end of which is passed around each of a pair of pulleys.

When the elastic belt is used in part of the speed reduction mechanism according to this embodiment, the lateral pressure of the belt remains in the driving system after driving is stopped, thereby increasing loads effected when the switching gear is disengaged from the teeth of the driving system to which the switching gear has been connected prior to switching. Thus, the repetitions of rotations, stoppages, and reverse rotations are effective in eliminating this advantage.

Another embodiment of this invention provides control such that when the driving is switched, the switching gear is initially rotated in the direction opposite to the rotating direction of the driving system to which the switching gear has been connected prior to switching, the rotating direction existing immediately before the stoppage of the driving system.

This embodiment can stop the rotation caused by driving inertia after the stoppage of driving to reduce the standby time from the stoppage of driving prior to switching until the switching mode is entered, thereby reducing the disc change time. In addition, in the above configuration with the elastic belt, this embodiment is particularly effective in reducing switching loads effected by the lateral pressure of the belt.

Furthermore, the disc changer according to this invention comprises a disc gap maintaining means that can advance between housed discs vertically adjacent to a played disc.

According to this invention, even if the disc housing and playing positions are located closer to position the housed discs and the played disc in such a way that the discs appear to overlap one another in a top view, in order to compactify the apparatus, the gap maintaining means advances into the gap between the housed discs adjacent to the played disc in the vertical direction to preclude the gap from being narrowed despite vibration, thereby preventing an accidental track shifts or damage to the disc caused by the contact between the played disc and the housed disc.

According to a preferred embodiment of this invention, the gap maintaining means comprises levers, so it can be simply positioned and can stably maintain the constant gap using a simple configuration. In addition, since the gap maintaining means is configured to be driven by the elevating means, it can be driven without deviating from the elevating and lowering timings for the spindles provided by the elevating means and the elevating and lowering timings for the disc playing means. The arrangement of the gap maintaining means between the disc housing position and the disc playing position allows the gap to be maintained close to both the disc playing and housing positions, thereby enabling accurate gap maintenance. Furthermore, sections of the disc gap maintaining means that advance between the adjacent discs are provided at two positions approximately laterally symmetrical about the center of the disc to prevent the housed discs at the lateral advancing section from inclining relative to the placed disc, thereby enabling the gap to be stably maintained despite adverse effects such as the inclination and vibration of the apparatus. Besides, if the advancing sections of the disc gap maintaining means are composed of planes with a sharp junction, when their tips advance between the two housed discs adjacent to the played disc in the vertical direction, they can target a single point in the gap between the discs to provide margins for displacements of the advancing gap maintaining means. In addition, if the disc contact surfaces are smooth planes, sliding loads on the end surface of the disc can be reduced to prevent the gap maintaining means from contacting the disc end and then being caught on it.

In addition, the disc changer according to this invention comprises an apparatus body, a disc playing means supported on the apparatus body at the disc playing position so as to be able to elevate and lower, an elevating means for elevating and lowering the disc playing means, and a horizontality maintaining means for regulating the elevating and lowering postures of the disc playing means. The elevating means comprises a lateral pair of plates supported so as to slide relative to the apparatus body, and a connecting lever rotatably supported on the apparatus body to connect the lateral pair of plates together. The horizontality maintaining means comprises a rotating shaft extending in parallel with the sliding direction of the plate and rotatably supported on the apparatus body, a horizontality maintaining lever that can rotate with the rotating shaft, and a engaging section provided on the horizontality maintaining lever and parallel with the rotating shaft. The engaging section slidably engages with an engaging groove provided in the disc playing means to rotationally move around the axis of the rotating shaft during the elevation and lowering of the disc playing means.

According to this invention, the elevating means effects driving to allow the right and left plates to slide in opposite directions to synchronously elevate or lower both pins engaged with the cam groove, by an equal amount, thereby enabling the disc playing means to be elevated and lowered. When this disc playing means elevates or lowers, the engaging section, elevates and lowers with the disc playing means due to its engagement with the engaging groove while rotationally moving the horizontality maintaining lever with the engaging section integrated therewith, together with the rotating shaft, thereby allowing the engaging section to rotate around the axis of the rotating shaft. This configuration can elevate and lower the disc playing means with the other movement, that is, the rotational movement of the disc playing means restrained by the horizontality maintaining lever with the rotating shaft held in the horizontal direction, thereby enabling the rotating shaft of the horizontality maintaining lever to be held in the horizontal direction when the disc playing means elevates and lowers.

One embodiment of this invention is configured so that the disc playing means is elevated and lowered by engaging the lateral pair of pins provided on the disc playing means with the lateral pair of cam grooves provided in the elevating means, respectively.

According to this invention, the elevating means requires only the single lateral pair of cam grooves, thereby reducing the sliding stroke of the elevating means and thus the size of the disc playing apparatus.

Furthermore, the disc changer according to this invention provides a disc playing apparatus which comprises an apparatus body, a tray that can move between a first position in the apparatus body at which the disc can be played and a second position at which the tray protrudes from the apparatus body so that the disc can be changed, and at least one covering means rotatably supported on the apparatus body to cover at least part of an opening formed due to the protrusion of the tray to the second position. The covering means has levers rotationally moving in response to the movement of the tray, and having a pair of protruding portions arranged at positions approximately laterally symmetrical around the center of the disc on the tray and provided at an interval smaller than the outer diameter of a small-diameter disc. The opposite ends of the protruding portions each have an uneven surface formed like saw teeth.

According to this invention, when the tray is allowed to protrude to move from the first position to the second position, the cams on the tray automatically rotationally moves the levers so as to stand. Thus, the protruding portions integrated with both levers can cover part of the opening formed due to the protrusion of the tray to the second position. Consequently, when the disc is manually removed from the tray or changed even if the disc accidentally falls from the opening toward the inside of the apparatus body, the end of the disc is caught between the uneven surfaces formed like saw teeth in the pair of protruding portions provided at the interval smaller than the outer diameter of the small-diameter disc, thereby preventing the disc from falling into the apparatus body.

One embodiment of this invention is configured so that the cams provided on the tray rotationally move the levers during the opening and closing of the tray.

According to this embodiment, even if the disc is pressed toward the interior of the apparatus body while contacting the levers, the levers are precluded from rotationally moving and falling down to prevent the disc from falling into the apparatus body.

BRIEF DESCRIPTION OF THE DRAWINGS

FIGS. 12A–B show the elevating means and horizontal driving means of the disc changer, FIG. 12A being a side view showing a tray rear state and FIG. 12B being a side view showing a stock state;

FIGS. 14A–B show the elevating means and horizontal driving means of the disc changer, FIG. 14A being a side view showing a closed state and FIG. 14B being a side view showing an open state;

EMBODIMENT

A disc changer that is an example of an embodiment of this invention will be described below.

Figure 1:
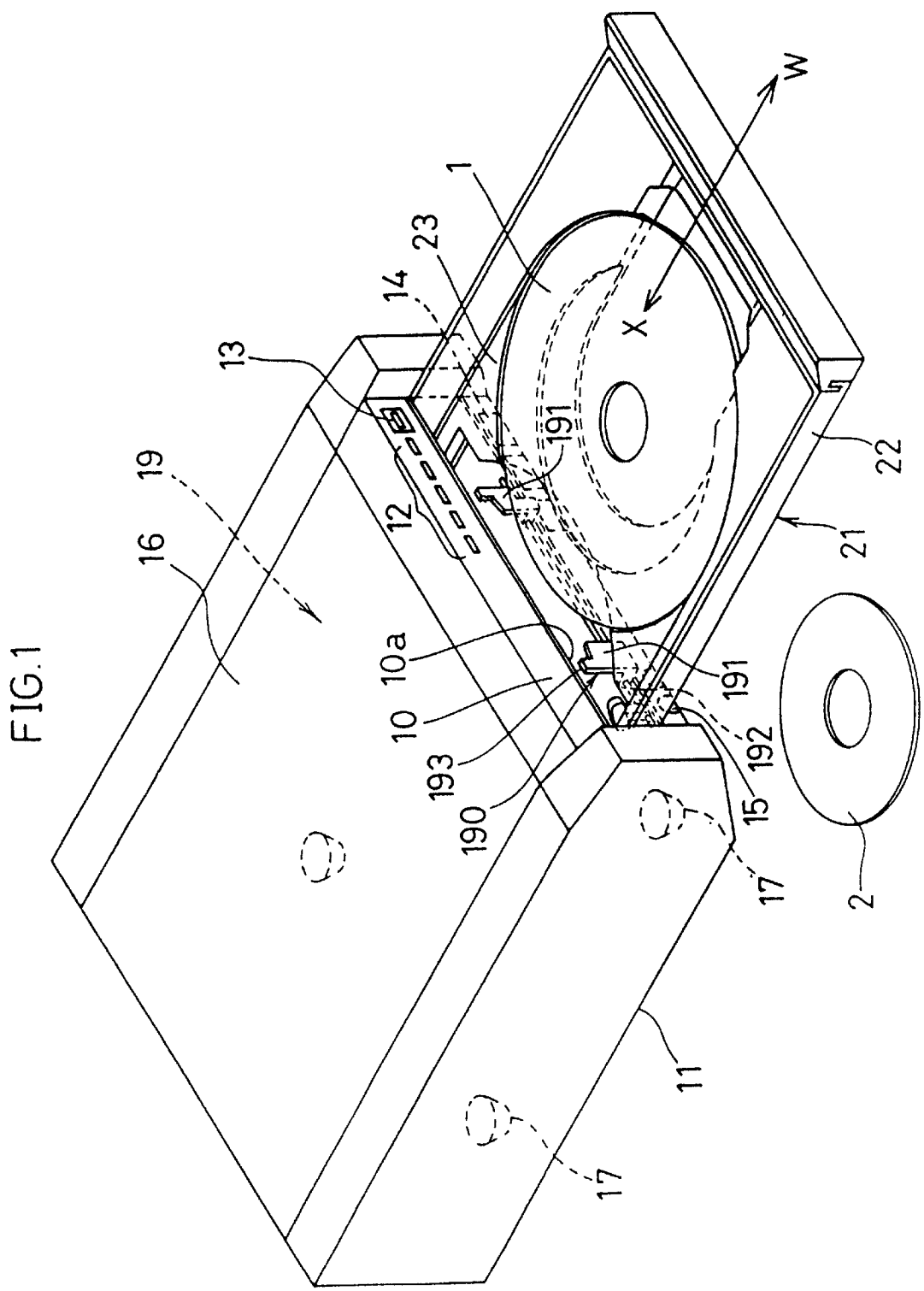
FIG. 1 is a perspective view showing the appearance of a disc changer according to one embodiment of this invention.

In FIG. 1, reference numeral 1 is a large-diameter disc of diameter 12 cm and 2 is a small-diameter disc of diameter 8 cm. A front panel 10 is attached to a bottom plate body 11, and No. keys 12, an open and close key 13, and a play key 14, and a stop key 15 are provided on the front surface of the front panel 10. Reference numeral 16 is an armoring case for covering a disc changer 19, and 17 is an insulator provided on the bottom plate body 11. Reference numeral 22 designates a tray base protruding from an opening 10a of the front panel 10. Reference numeral 23 denotes a tray that is guide by the tray base 22 to slide in a direction W-X shown by the arrow in the figure and that has a changed disc 1 or 2 supplied thereon.

In FIGS. 2, 4, 33, and 34, an apparatus body 20 is composed of a bottom plate 20A, a right and a left side plates 20B, and a rear plate 20C. Inside the apparatus body 20, a disc housing position A is formed on the rear plate 20C side, while a disc playing position B is formed on the front surface side. A distance L between the center of the disc 1 or 2 housed at the disc housing position A and the center of the disc 1 or 2 played at the disc playing position B is set larger than 10 cm (the radius of the large-diameter disc 1+the radius of the small-diameter disc 2) and smaller than 12 cm (the diameter of the large-diameter disc 1).

This configuration can reduce the distance between the disc housing position A and the disc playing position B to allow the housed large-diameter disc 1 and the played large-diameter disc 1 to overlap each other in a top view, thereby compactifying the apparatus. In addition, the housed large-diameter disc 1 and the played small-diameter disc 2 or the housed small-diameter disc 2 and the played large-diameter disc 1 are located so as not to overlap each other in a top view.

Figure 2:
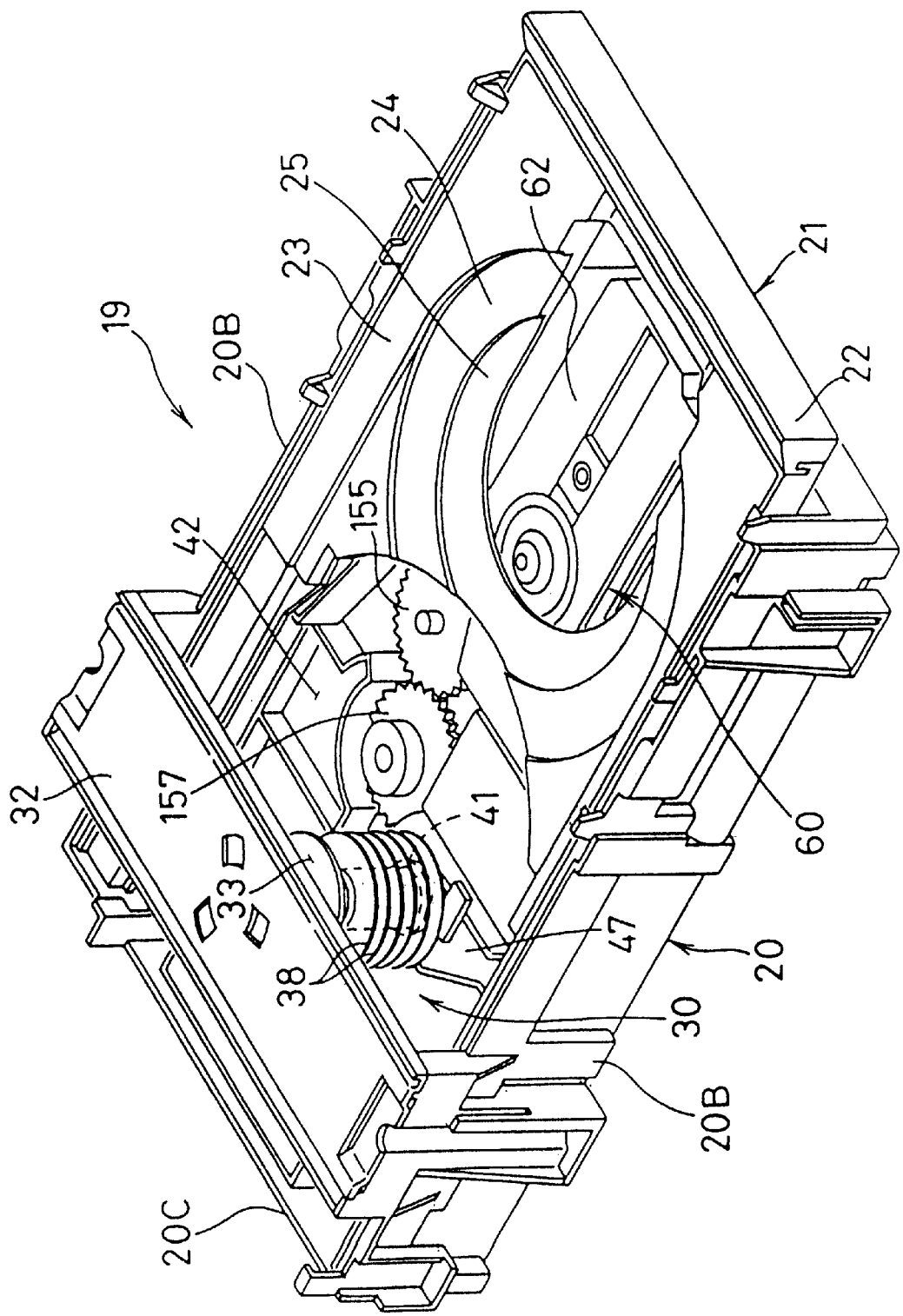
FIG. 2 is a perspective view showing the disc changer with an armoring case removed therefrom.
Figure 3:
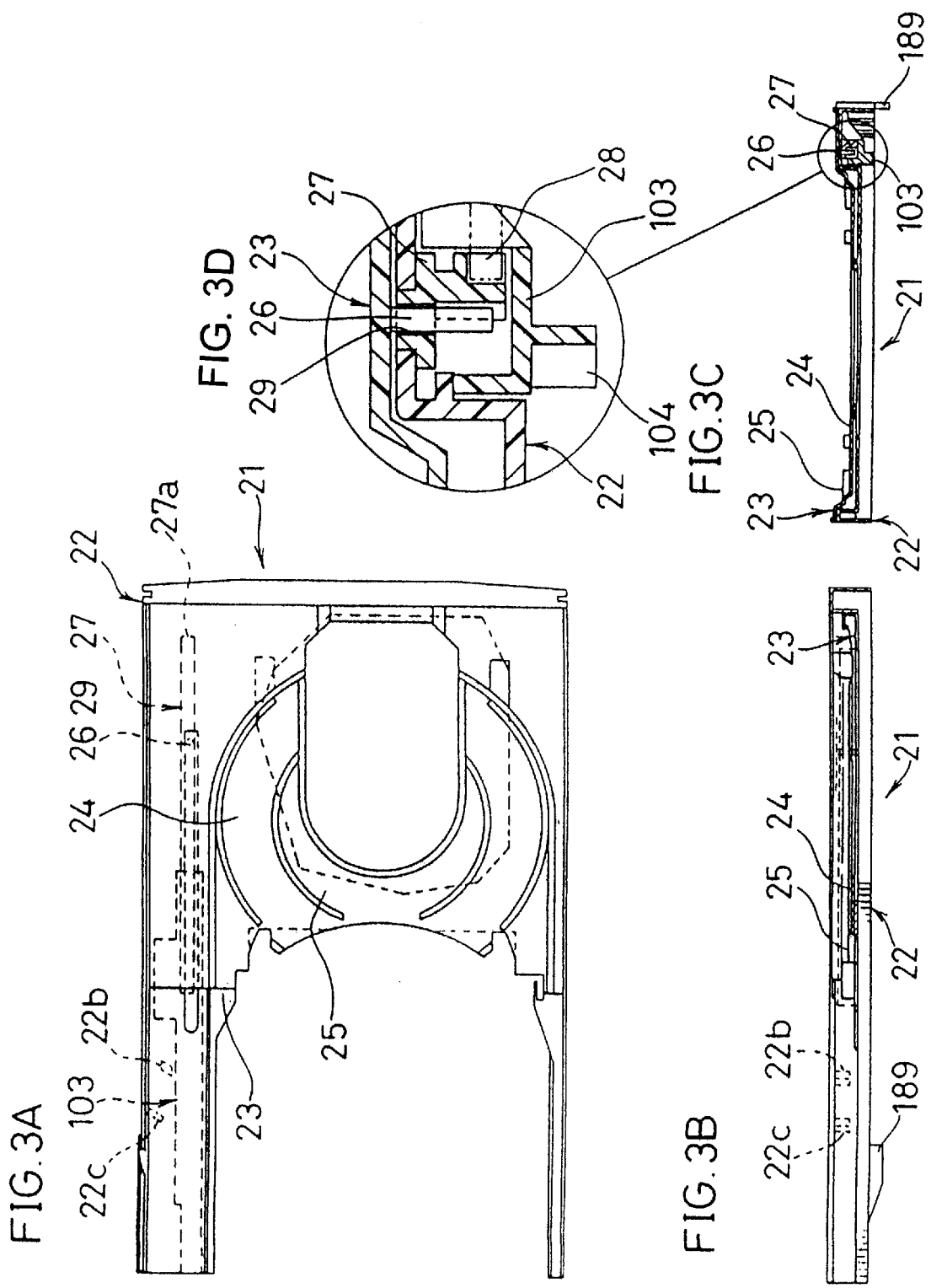
FIGS. 3A–D show a tray base and a tray of the disc changer.

Next, the configuration of a disc transfer means will be described with reference to FIGS. 2 and 3.

That is, the disc transfer means 21 is provided in the apparatus body 20 to transfer the disc 1 or 2 between the disc housing position A and the disc playing position B. The disc transfer means 21 is composed of a tray base 22 guided by the side plates 20B of the apparatus body 20 to slide in the direction shown by the arrows W-X, (longitudinal direction) a tray 23 guided by the tray base 22 to slide in the direction shown by the arrows W-X, and a carrier 27 supported and guided by the tray base 22 side to slide in the direction shown by the arrows W-X. The tray base 22 slides in the direction shown by the arrow W (forward) to protrude from the opening 10a formed in the front panel 10.

A 12-cm-disc placement section 24 and an 8-cm-disc placement section 25 are formed in the top-surface side of the tray 23. To reduce the height of spacers (described below) of a disc holding means to reduce the thickness of the disc changer 19, the 12-cm-disc placement section 24 is formed slightly above the 8-cm-disc placement section 25.

The carrier 27 is provided on the rear surface of the right of the tray base 22, is shaped like a linear material, and has a rack 28 formed on its outer side. An engaging locking hole 29 extending in the vertical direction is formed in a predetermined position of the carrier 27 so that an engaging locking pin 26 from the tray 23 is engagingly locked in the engaging locking hole 29.

These components 22 to 29 constitute an example of the disc transfer means 21. According to the disc transfer means 21, frontward and backward driving executed by a horizontal driving means (described below) moves the carrier 27 forward and backward through the rack 28 to allow the tray base 22 to support and guide the tray 23 integrated with the carrier 27, thereby enabling integral movement. This configuration enables the disc 1 or 2 to move within the apparatus body 20 between the disc housing position A and the disc playing position B.

Next, the configuration of a disc holding means 30 will be described with reference to FIGS. 2, 5 to 7, 26, 27, and 35.

The disc holding means 30 is provided at the disc housing position A and has a vertical pair of spindles, that is, an upper spindle 31 and a lower spindle 41 that detachably hold a plurality of spacers 38. The disc holding means 30 elevates and lowers the lower spindle 41 and drives the spacers 38 in the vertical direction to enable the disc 1 or 2 to be delivered to the disc transfer means 21.

Reference numeral 32 is a spindle mounting plate provided in the rear half of the side plates 20B and between the top surfaces of the side plates 20B, and the upper spindle 31 is provided under the spindle mounting plate and at the center thereof. In addition, 42 is an elevating base (a spindle base) opposed to the spindle mounting plate 32 from below, driven by an elevating means (described below) in the vertical direction, and having the lower spindle 41 provided thereon and at the center thereof.

The upper spindle 31 has a flange 31b at the upper end of an upper spindle body 31a, and an engaging piece 31c formed on the flange 31b engages with an engaging hole 32a formed in the spindle mounting plate 32. A disc presser 33 is buried in the outer circumference of the upper spindle body 31a so as to move along a vertical groove 31e in the upper spindle body 31a. The disc presser 33 is urged downward by a disc presser spring 34 provided between the disc presser 33 and the flange 31b.

A holding claw 35 is housed inside the upper spindle body 31a. The holding claw 35 consists of a claw portion 35a for holding the spacers 38 on the upper spindle 31, a core portion 35b on which a protruding portion 44c of the lower spindle 41 abuts, and an upper stopper 35c, and is integrally formed of a synthetic resin.

The holding claw 35 is urged downward by a claw opening spring 36 provided between the holding claw 35 and the spindle mounting plate 32, but is prevented by a pressing section 31d from jumping out. The pressing section 31d is formed integrally with the upper spindle body 31a, and the tip of a press-down piece 48a of a detachment prevention claw 48, which is described below, abuts on the pressing section 31d.

The claw portion 35a is configured to be bent inward and outward because its root is formed of a sheet. The tip 35d of the claw portion 35a is shaped like a hook, and its portion that contacts the upper spindle body 31a inclines inward. To allow the tip 35d of the claw portion 35a to sufficiently move backward into the upper spindle body 31a, three vertical grooves 35e are formed in the core portion 35b of the holding claw 35 at positions at which the tip 35d abuts on the upper spindle body 31a.

The lower spindle 41 is composed of a lower spindle body 45 consisting of an outer cylinder 43 and an inner cylinder 44; and the detachment prevention claw 48 buried in the inner cylinder 44. The inner cylinder 44 is buried in a lower shaft 42a formed on an elevating base 42 and has at its lower end an engaging locking piece 44a engaged with and fixed to the elevating base 42. The outer cylinder 43 has a flange 43a at its lower end, and a ring-shaped gear 43b is provided on the bottom surface of the flange 43a. The ring-shaped gear 43b meshes with a second intermediate gear 157 in a gear train (described below) to rotate the outer cylinder 43.

A male thread 43c is formed in the outer circumference of the outer cylinder 43, and a screw section 46 that moves the spacer 38 in the vertical direction is screwed on the male thread 43c. A rotation stopper 47 is mounted on the screw section 46 to prevent the screw section 46 from rotating with the rotation of the cylinder 43. The rotation stopper 47 has one end journaled to the screw section 46 and the other end journaled to the elevating base 42.

A detachment preventing claw 48 is composed of three claw sections 48b that are open outward, three pressed-up pieces 48a each formed between the claw sections 48b, and a lower stopper 48d protruding downward.

Figure 7:
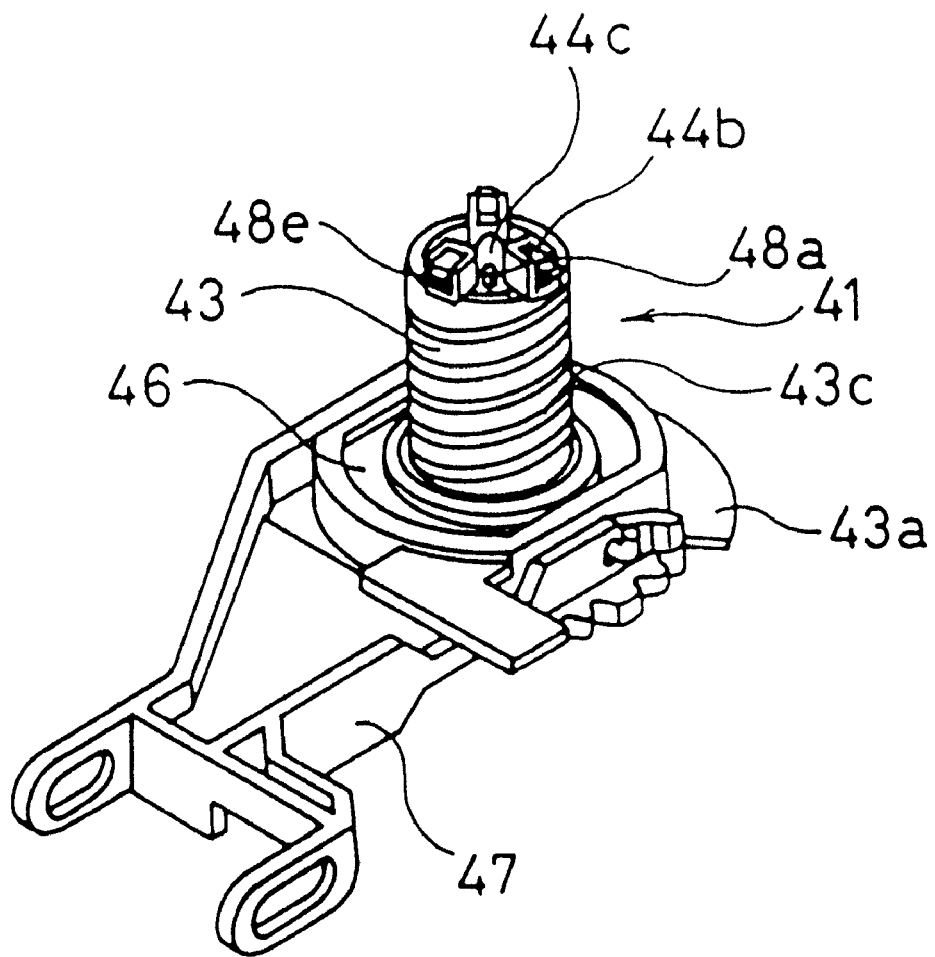
FIG. 7 is a perspective view showing the disc holding means of the disc changer, particularly the lower spindle portion.
Figure 8:
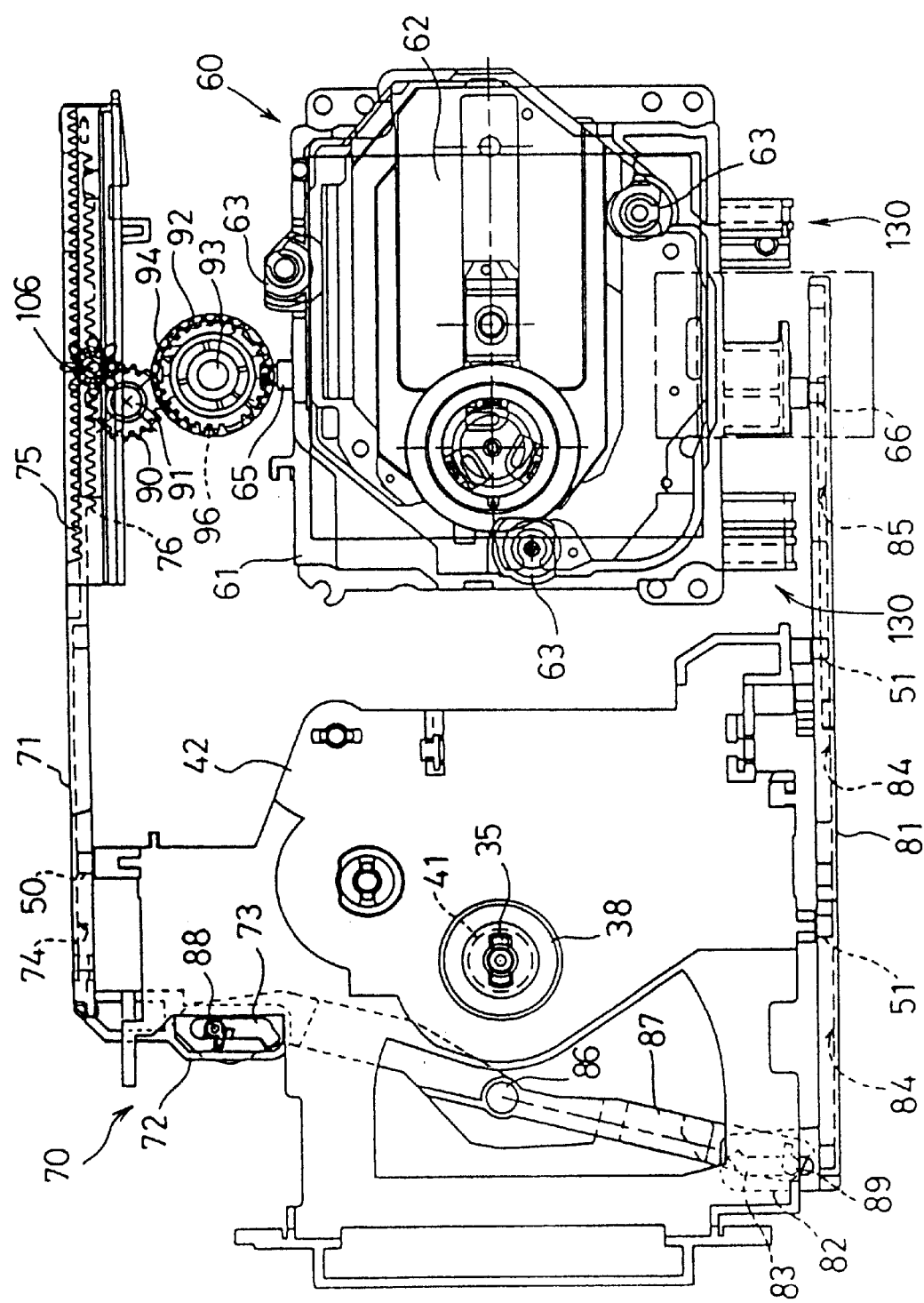
FIG. 8 is a top view showing an elevating means of the disc changer.

Three claw holes 44b are formed at the top of the inner cylinder 44 to allow the tips of the claw sections 48b to enter and leave these holes (see FIG. 7). Small holes are each formed between the claw holes 44b to allow the tip of the pressed-up piece 48a to protrude therefrom. The detachment preventing claw 48 is pressed upward by a compression spring 49 within the lower shaft 42a in such a way that the tips 48e of the claw sections 48b protrude from the claw holes 44b to allow the pressing-up pieces 48a to protrude from the small holes. In addition, a protruding portion 44c that presses the holding claw 35 upward is formed at the center of the top of the inner cylinder 44. The lower side of the protruding portion 44c inclines SQ that the claw sections 48b can enter and leave the claw holes 44b easily.

A pin 50 and two pins 51 protruding outward are provided on the right and left sides, respectively, of the elevating base 42, wherein the two (left) pins 51 are provided in the longitudinal direction. In addition, 52 is vertical-feeding detection sensor for detecting slits 43d formed in the outer circumference of the flange 43a to count the number of rotations.

The components 31 to 52 constitute an example of the disc holding means 30, which operates as described below.

Figure 5:
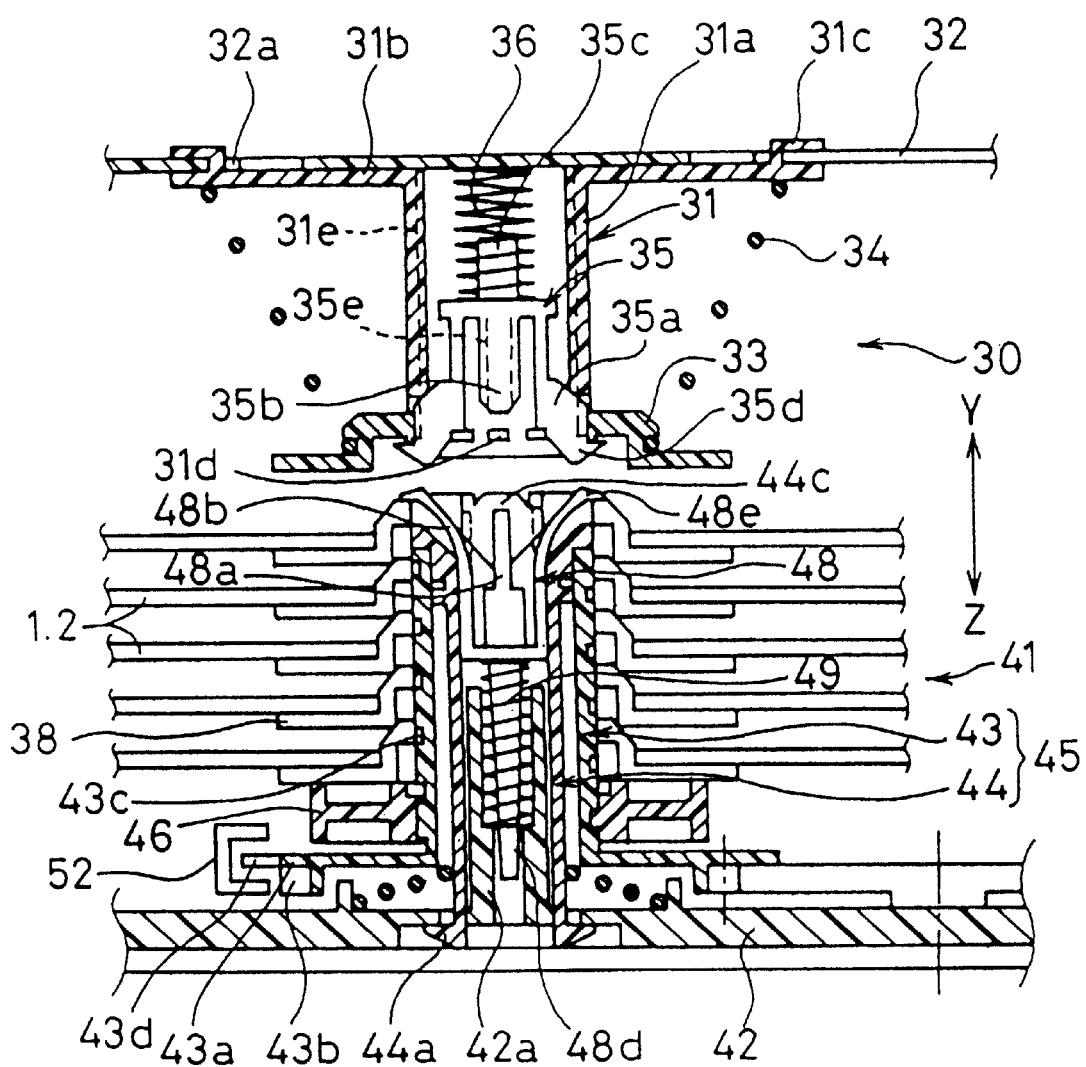
FIG. 5 is a vertical sectional view showing a disc holding means of the disc changer wherein a lower spindle is lowering.
Figure 6:
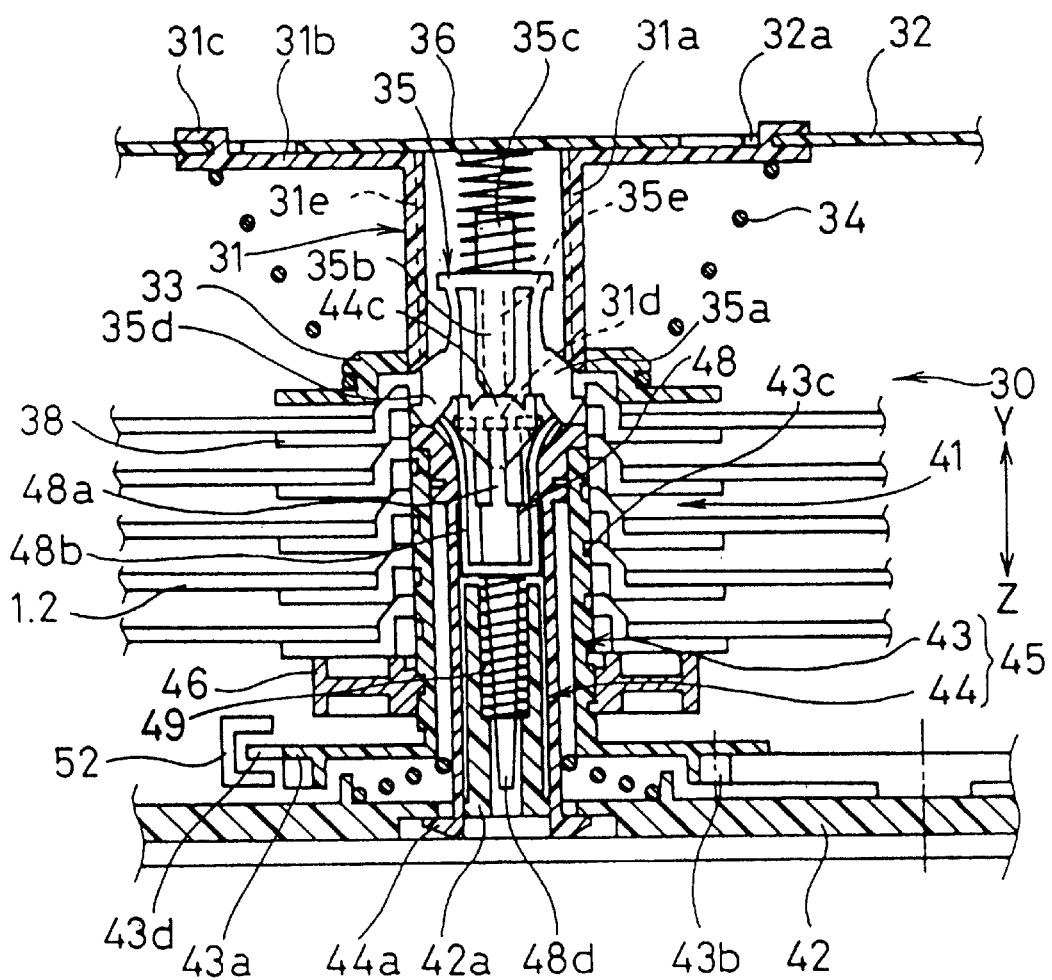
FIG. 6 is a vertical sectional view showing the disc holding means of the disc changer wherein the lower spindle is elevating.

In FIG. 5, the five discs 1.2 are stored in the lower spindle 41, and the upper and lower spindles 31 and 41 are mutually spaced. When an elevating means (described below) elevates the elevating base 42 (in the arrow Y direction), the lower spindle 41 mounted on the elevating base 42 also elevates.

The elevation of the lower spindle 41 causes the three holding claws 35 arranged at an angle of 120° and the detachment preventing claw 48 to fit with each other in such a way that the protruding portion 44c abuts on a core portion 35b of the holding claws 35. Furthermore, as the protruding portion 44c presses the holding claw 35 upward against the force of the claw opening spring 36, the tip 35d of the holding claw 35 enters the upper spindle body 31a. Thus, the spacers 38 move toward the upper spindle 31 without being obstructed by the tips of the claw sections 35a.

At the same time, the pressed-up pieces 48a of the detachment preventing claw 48 abut on the pressing section 31d of the upper spindle 31. As the pressing section 31d presses back the detachment preventing claw 48 downward against the force of the compression spring 49, the tips 48e of the claw sections 48b of the detachment preventing claw 48 moves backward into the inner cylinder 44. Thus, the spacer 38 can move from the lower spindle 41 to the upper spindle 31 (see FIG. 6).

In this state, the rotational force of a second intermediate gear 157 in the gear train is transmitted to the ring-shaped gear 43b to rotate the outer cylinder 43. The rotation of the outer cylinder 43 causes the threaded portion 46 to move along the lower spindle 41 to press the spacers 38 up. The threaded portion 46 moves the discs 1 and 2 from the lower spindle 41 to the upper spindle 31 so that required discs 1, 2 stop when they are located at the lower end of the upper spindle 31.

To move the discs 1 and 2 on the upper spindle 31 to the lower spindle 41, the outer cylinder 43 may be reversely rotated to lower the threaded portion 46. The amount of movement is controlled so that stoppage is carried out based on the number of rotations of the flange 43a integrated with the lower spindle 41 amount of movement, which is counted by the vertical-feeding detection sensor 52.

Once the elevating means lowers the elevating base 42 (in the arrow Z direction) to space the upper and lower spindles 31 and 41 mutually, the tray 23 is moved to between the upper and lower spindles 31 and 41.

When the upper and lower spindles 31 and 41 are mutually spaced, the claw opening spring 36 presses the holding claw 35 downward to cause the tips 35d of the claw sections 35a to protrude from the outer circumferential wall of the upper spindle 31 to hold the spacers 38 and discs 1 and 2 that have been moved to the upper spindle 31. At the same time, the compression spring 49 presses the detachment preventing claw 48 upward to allow the claw sections 35a to protrude from the claw holes 44b in order to prevent the spacers 38 fitted on the lower spindle 41 from being detached therefrom.

After the tray 23 has moved to between the upper and lower spindles 31 and 41, the elevating means elevates the lower spindle 41 again. When the lower spindle 41 abuts on the upper spindle 31 to detach the holding claw 35, the spacers 38 are vertically driven to lower by one slit (corresponding to one rotation of the lower spindle 41). Then, the upper and lower spindles 31 and 41 are then mutually spaced again to place the required discs 1 and 2 on the tray 23, and the discs are then transferred to the disc playing position B or the exterior.

Next, the configuration of the disc playing means 60 will be described with reference to FIGS. 2, 4, 8, 25, and 34 to 40.

The disc playing means 60 supported on the apparatus body 20 so as to be able to elevate and lower is provided at the disc playing position B. The disc playing means 60 has an elevating stand 61 that can elevate and lower in the arrow Y-Z direction, with a recording/playing apparatus 62 for the discs 1 and 2 embedded in the elevating stand 61. Buffer springs 63 are provided between the elevating stand 61 and the recording/playing apparatus 62 at a plurality of positions to urge and elevate the recording/playing apparatus 62. Disc clampers 64 of the recording/playing apparatus 62 are supported at a predetermined interval in an upper cover 67 provided between the top surfaces of the side plates 20B and closer to the front side. A pin 65 and a pin 66 both protruding outward are provided on the left and right sides, respectively, of the elevating stand 61.

The components 61 to 67 constitute an example of the disc playing means 60. The elevating means (described below) elevates the elevating stand 61 of the disc playing means 60 in the arrow Y direction to separate the discs 1 and 2 from the top surface of the tray 23, and the discs are then clamped between the recording/playing apparatus 62 and the disc dampers 64 for recording/playing.

Next, the configuration of an elevating means 70 for elevating and lowering the lower spindle 41 and the disc playing means 60 will be described with reference to FIGS. 4, 8, 16, 25 to 27, 34, and 40.

A lateral pair of plates 71 and 81 that are supported and guided by the side plates 20B of the apparatus body 20 to slide in the arrow W-X direction are provided in the apparatus body 20. Protruding portions 72 and 82 protruding in opposite directions are integrally connected to the ends of the plates 71 and 81 near the rear plate 20C, and long holes 73 and 83 extending in opposite directions are formed in the protruding portions 72 and 82, respectively.

One (the right) plate 71 of the plates is an example of a unitary part. It has a cam groove 74 in its rear portion, with which a pin 50 provided on one side of the elevating base 42 of the lower spindle 41 is engaged and has in its front portion an upper rack 75 and a lower rack 76 facing inward. In addition, the other (the left) plate 81 has in its front and rear portions a pair of cam grooves 84 with which a pair of pins 51 provided on the other side of the elevating base 42 are engaged and a cam groove 85 with which a pin 66 provided on the other side of the disc playing means 60 is engaged. A pin 65 provided on one side of the disc playing means 60 engages with a cam groove 96 on the cam gear (described below) side.

Figure 9:
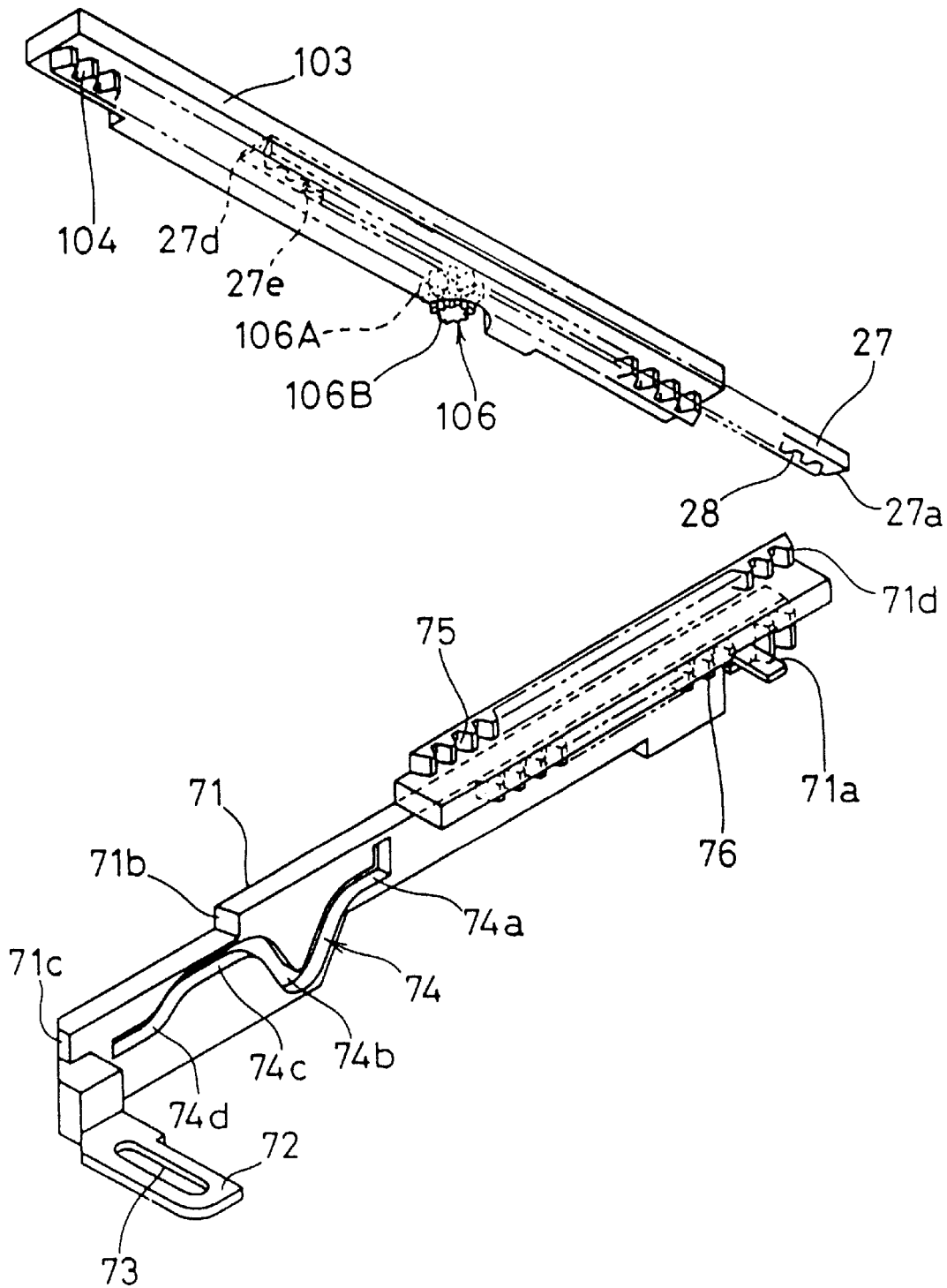
FIG. 9 is a developed perspective view showing the elevating means and a horizontal driving means of the disc changer, particularly a rack and a gear portion.
Figure 10:
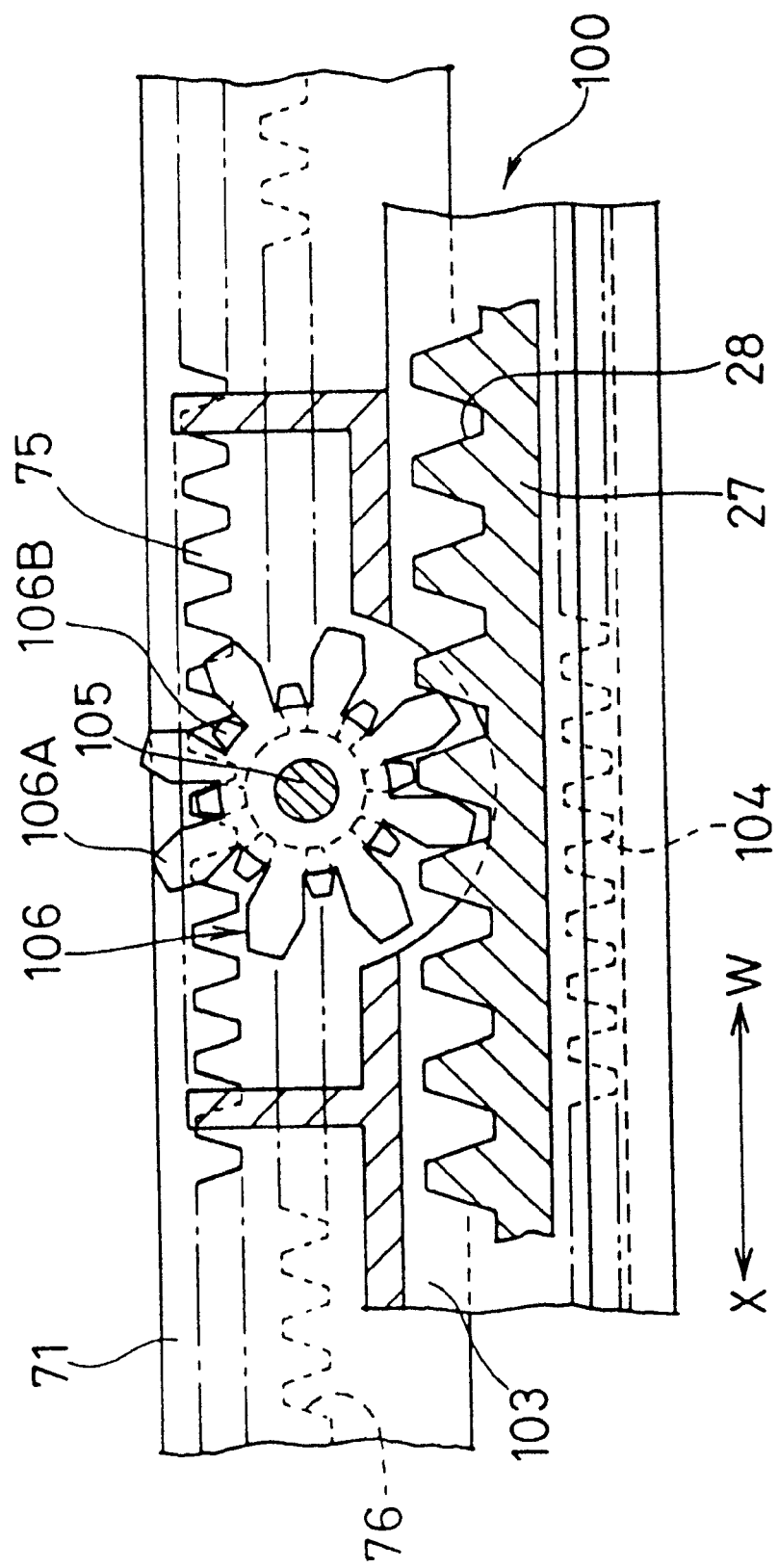
FIG. 10 is a sectional top view showing the elevating means and horizontal driving means of the disc changer, particularly a speed-increasing gear portion.

The cam groove 74 in one 71 of the plates is formed of the continuous groove in an upper front cam section 74a, V-shaped cam section 74*b*, an upper intermediate cam section 74*c*, and an upper rear cam section 74*d* arranged from front to rear in this order (see FIGS. 9 and 16). The upper intermediate cam section 74*c* and the upper front cam section 74*a* are located above the upper rear cam section 74*d*.

Figure 26:
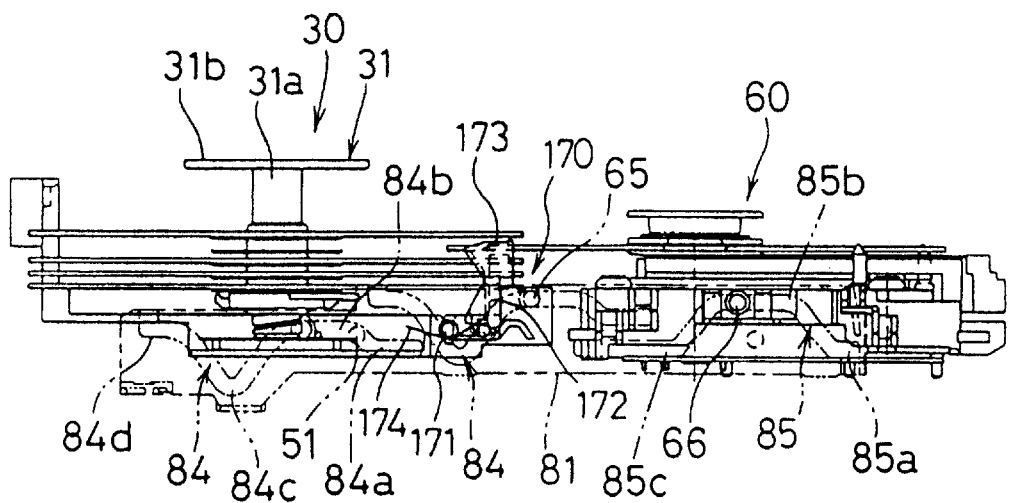
FIG. 26 is a side view showing the gap maintaining means of the disc changer in an off state.
Figure 27:
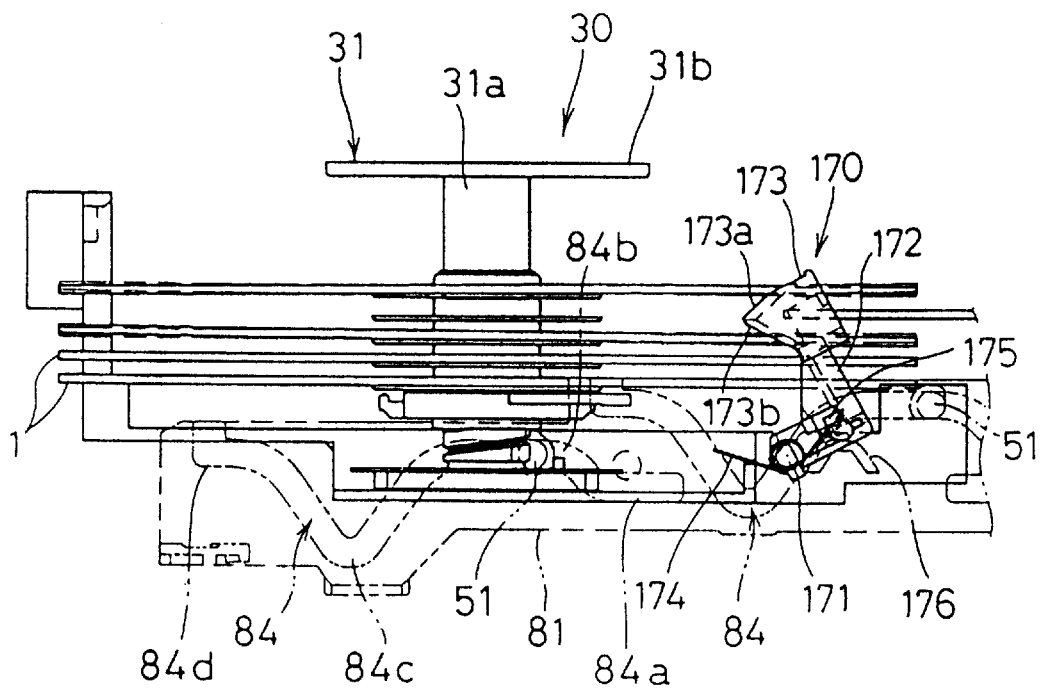
FIG. 27 is a side view showing the gap maintaining means of the disc changer in an on state.

The cam grooves 84 in the rear and intermediate of the other plate 81 are formed of the continuous groove in an upper front cam section 84*a*, an upper intermediate cam section 84*b*, a V-shaped cam section 84*c*, and an upper rear cam section 84*d* arranged from front to rear in this order (see FIGS. 26 and 27). The upper front cam section 84*a* is located above the upper intermediate cam section 84*b* and the upper rear cam section 84*d*.

Figure 35:
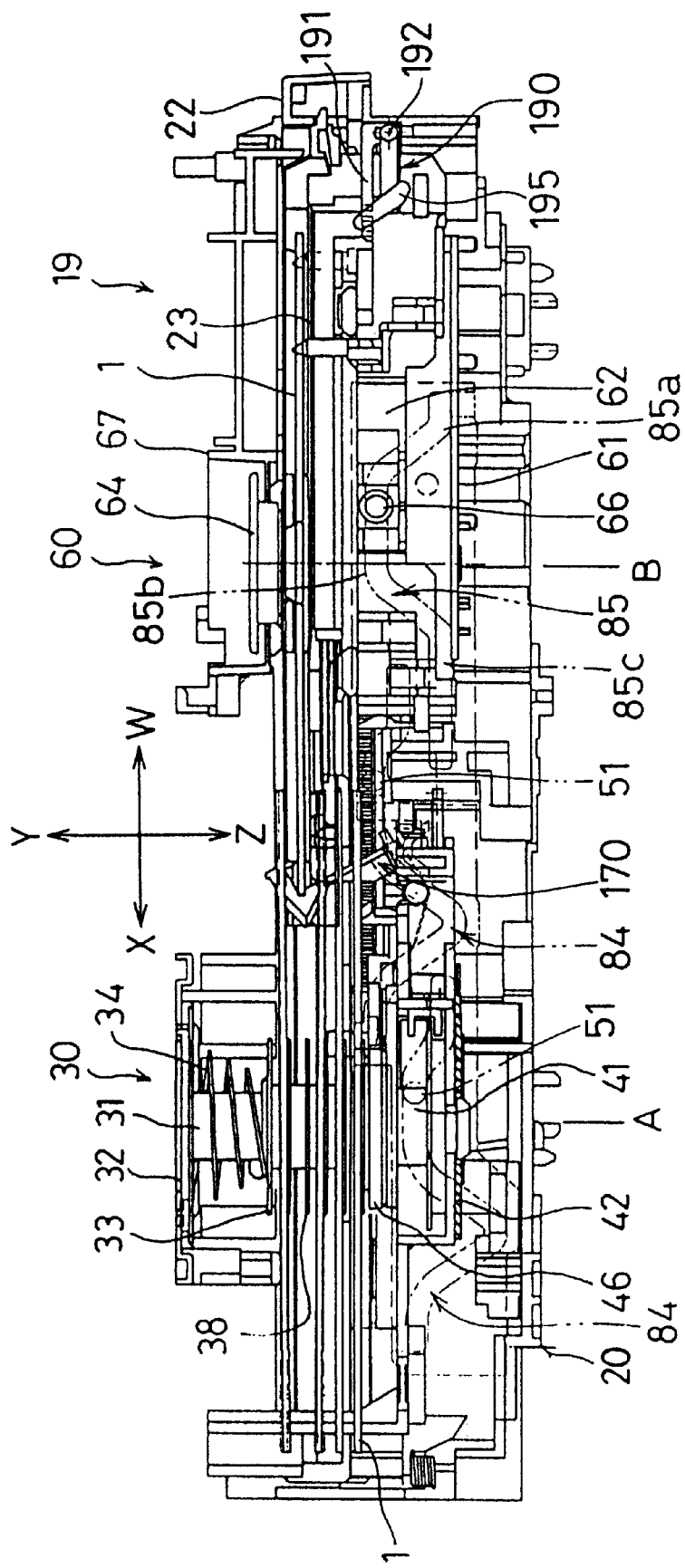
FIG. 35 is a side view showing a disc change operation of the disc changer in the play state.

The front cam groove 85 in the other plate 81 is formed of the continuous groove in a lower front cam section 85*a*, an upper intermediate cam section 85*b*, and a lower rear cam section 85*c* arranged from front to rear in this order (see FIGS. 26 and 35). The cam groove 96 on the cam gear side is formed like a spiral (see FIGS. 17, 19, and 25).

A shaft 86 stands from the bottom plate 20A of the apparatus body 20 near the rear plate 20C, and has a connection lever 87 rotatably supported on its intermediate. Pins 88 and 89 stand from the respective ends of the connection lever 87 and engage with the long holes 73 and 83, respectively. Thus, the connection lever 87 rotatably supported on the apparatus body 20 connects the lateral pair of plates 71 and 81 together so that the plates 71 and 81 slide in opposite direction.

In the apparatus body 20, an intermediate gear 90 that engages with the lower rack 76 is rotatably provided via a shaft 91 standing from the bottom plate 20A, and a cam gear 92 that engages with the intermediate gear 90 is rotatably provided via a shaft 93. A cam cylinder 94 is integrated with the cam gear 92 on its bottom surface. The cam groove 96 with which the pin 65 provided on one side of the disc playing means 60 is engaged is formed in the outer circumference of the cam cylinder 94.

The components 71 to 96 constitute an example of the elevating means 70. According to the elevating means 70, the gear rotating force of a horizontal driving means (described below) is transmitted to one 71 of the plates via the upper rack 75 to allow the plate 71 to slide in the arrow W-X direction while allowing the other plate 81 to slide in the opposite direction via the connection lever 87. At the same time, the intermediate gear 90 engaging with the lower rack 76 is rotated to rotate the cam cylinder 94 via the cam gear 92.

Thus, the left and right plates 71 and 81 are allowed to slide in the opposite directions and the cam gear 92 is rotated in response to the movement of one 71 of the plates to elevate and lower the elevating base 42 of the lower spindle 41 via the cam grooves 74 and 84 in the arrow Y-Z direction while elevating and lowering the disc playing means 60 via the cam grooves 96 and 85 in the arrow Y-Z direction. The formation positions of the cam grooves 74, 84, 96, and 85 and the cam shapes are set so that the operation is preferably performed in response to the movement of the plates 71 and 81 with timings described below.

Figure 16A:
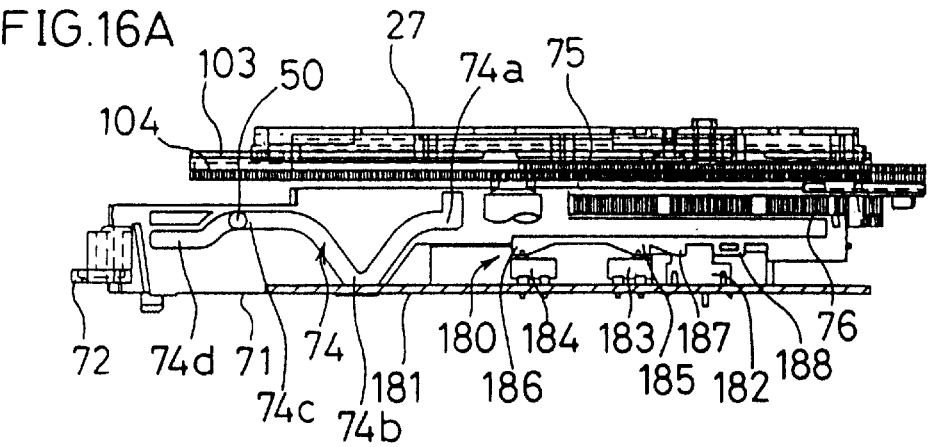
FIG. 16 shows the horizontal driving means of the disc changer and the arrangement of switches, FIG. 16A being a side view showing the play state, FIG. 16B a side view showing the change state, and FIG. 16C a side view showing the stock state.
Figure 29:
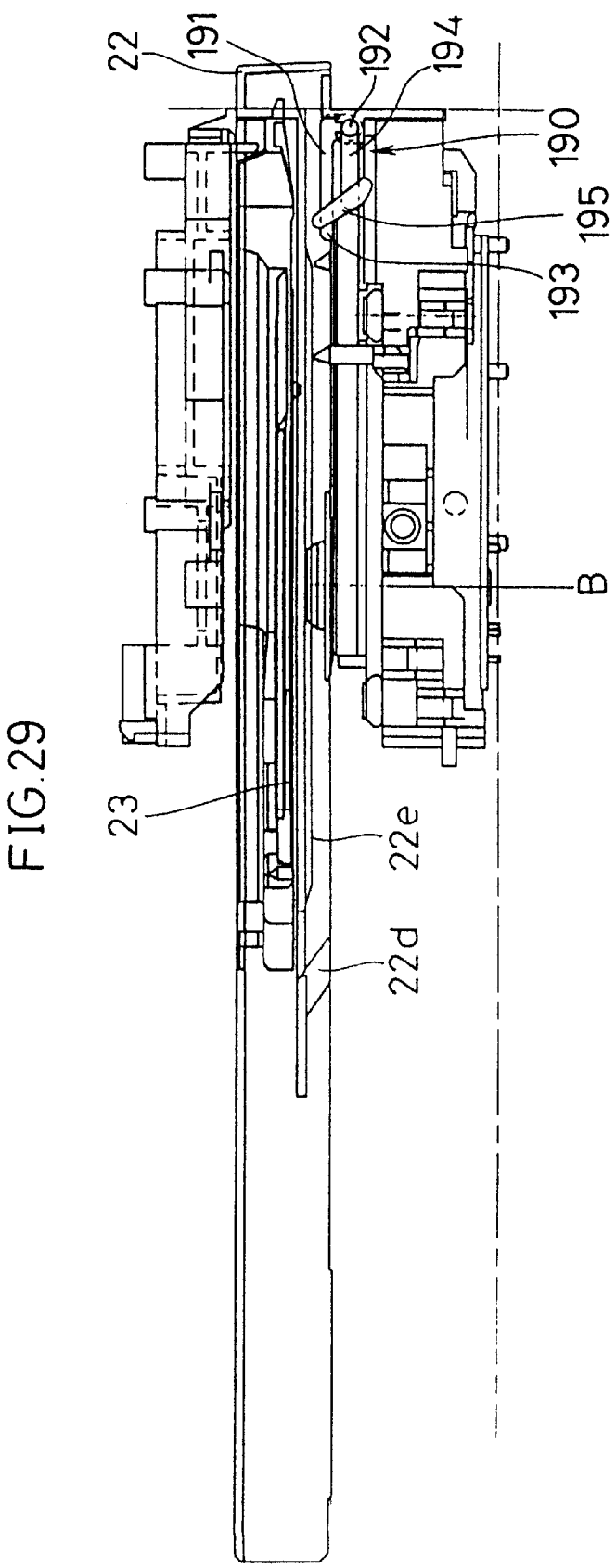
FIG. 29 is a side view showing the covering means of the disc changer in the play state.

During playing as shown in FIGS. 16(A), 27, and 29, one 50 of the pins of the elevating base 42 engages with the upper intermediate cam section 74*c* of the cam groove 74, the other pin 51 of the engaging base 42 engages with the upper intermediate cam section 84*b* of the cam groove 84, the other pin 66 of the disc playing means 60 engages with the upper intermediate cam section 85*b* of the cam groove 85, and one 65 of pins of the disc playing means 60 engages with the cam groove 96.

While the lower spindle is lowering and the tray is located in front as shown in FIGS. 17 to 19 and 36, one 50 of the pins of the elevating base 42 engages with the V-shaped cam section 74*b* of the cam groove 74, the other pin 51 of the engaging base 42 engages with the V-shaped cam section 84*c* of the cam groove 84, the other pin 66 of the disc playing means 60 engages with the lower rear cam section 85*c* of the cam groove 85, and one 65 of pins of the disc playing means 60 engages with the cam groove 96.

Figure 37:
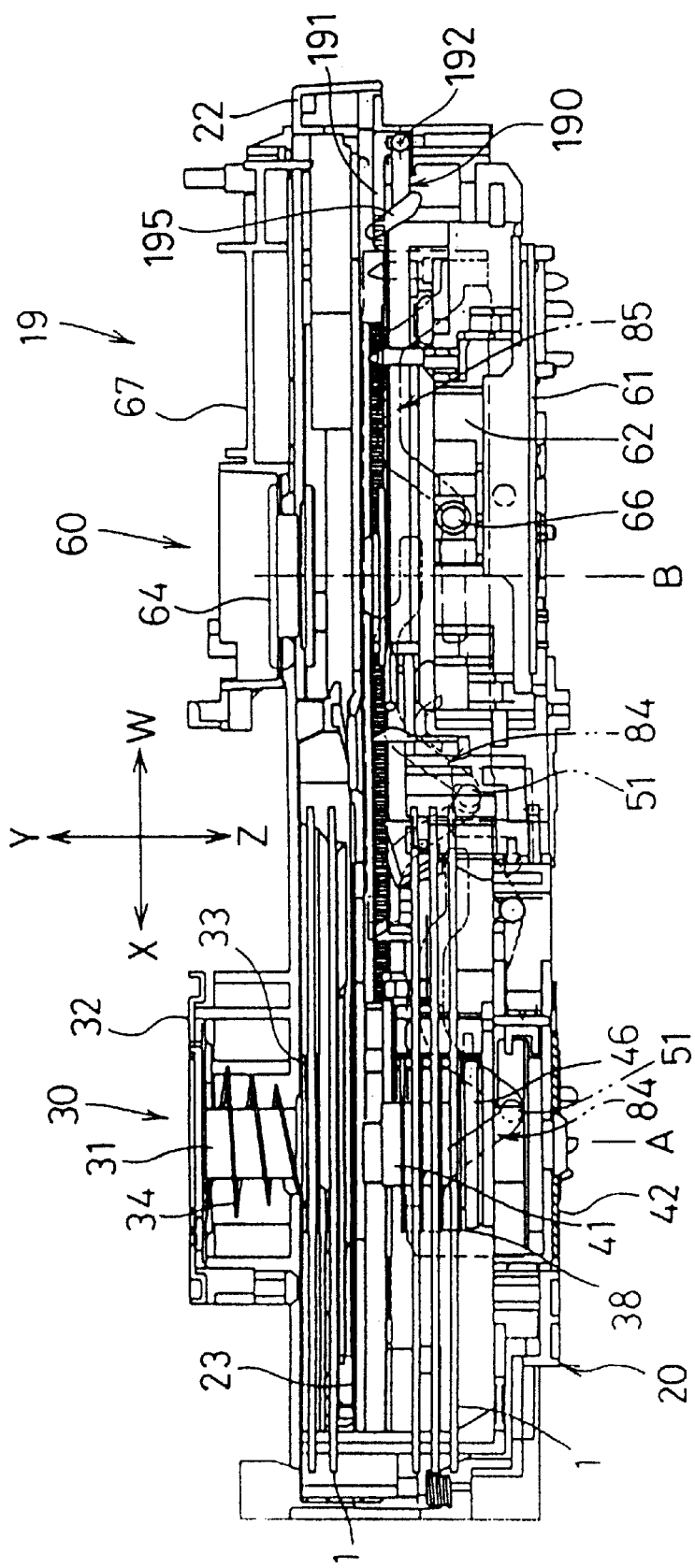
FIG. 37 is a side view showing the disc change operation of the disc changer wherein the lower spindle has lowered and wherein the tray is located at the rear position.

In addition, while the lower spindle is lowering and the tray is located in rear as shown in FIG. 37, one 50 of the pins of the elevating base 42 engages with the V-shaped cam section 74*b* of the cam groove 74, the other pin 51 of the engaging base 42 engages with the V-shaped cam section 84*c* of the cam groove 84, the other pin 66 of the disc playing means 60 engages with the lower rear cam section 85*c* of the cam groove 85, and one 65 of pins of the disc playing means 60 engages with the cam groove 96.

Figure 16B:
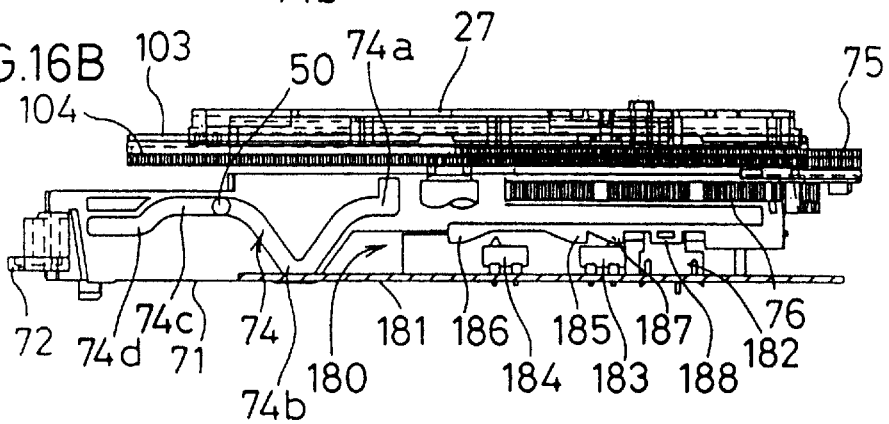
Figure 16C:
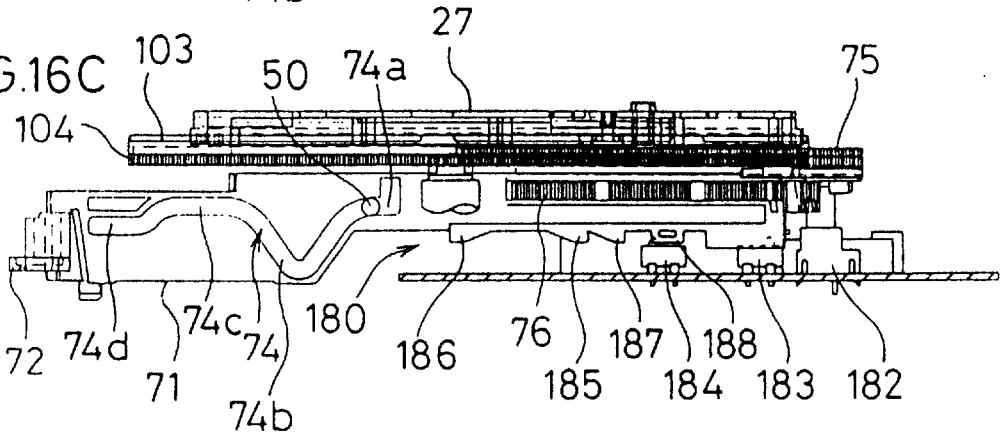
Figure 38:
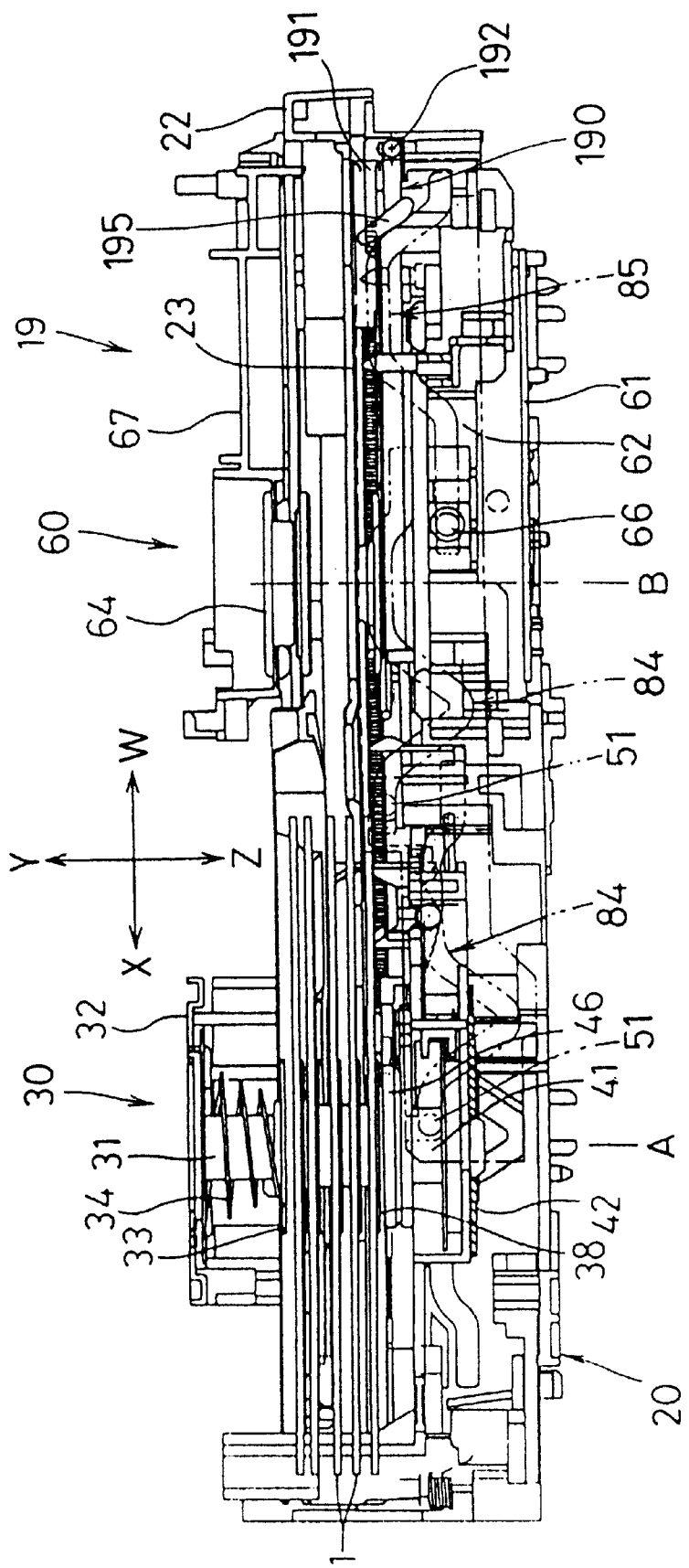
FIG. 38 is a side view showing the disc change operation of the disc changer and showing the disc stock state.

In addition, while the disc is being stocked as shown in FIGS. 16(C) and 38, one 50 of the pins of the elevating base 42 engages with the upper front cam section 74*a* of the cam groove 74, the other pin 51 of the engaging base 42 engages with the upper rear cam section 84*d* of the cam groove 84, the other pin 66 of the disc playing means 60 engages with the lower rear cam section 85*c* of the cam groove 85, and one 65 of pins of the disc playing means 60 engages with the cam groove 96.

Figure 39:
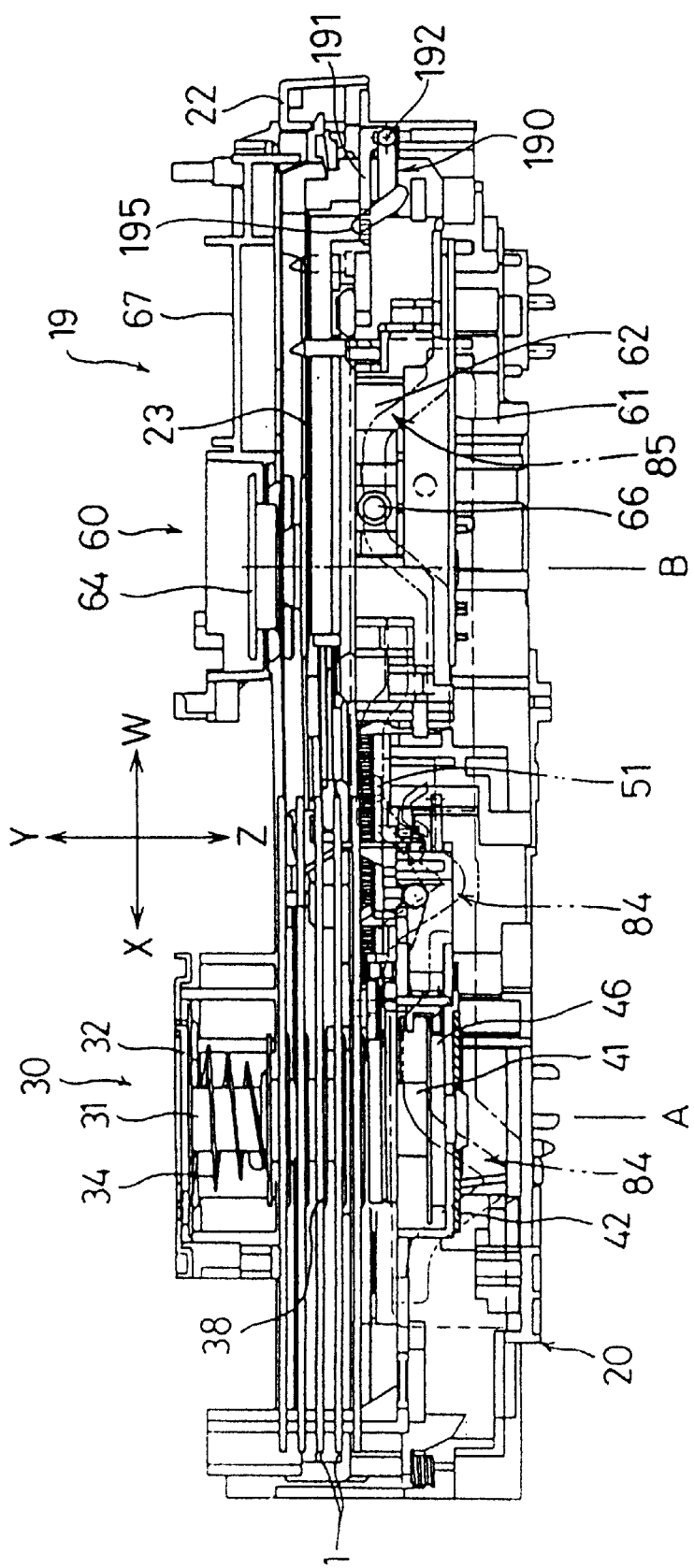
FIG. 39 is a side view showing the disc change operation of the disc changer in a disc change state.

In addition, while the disc is being changed as shown in FIGS. 16(B) and 39, one 50 of the pins of the elevating base 42 engages with the upper intermediate cam section 74*c* of the cam groove 74, the other pin 51 of the engaging base 42 engages with the upper intermediate cam section 84*b* of the cam groove 84, the other pin 66 of the disc playing means 60 engages with the upper intermediate cam section 85*b* of the cam groove 85, and one 65 of pins of the disc playing means 60 engages with the cam groove 96.

As described above, the elevating means 70 is configured so that the movement of one 71 of the plates that is a unitary part simultaneously allows the lower spindle 41 and the disc playing means 60 to elevate and lower. Thus, by using the same plate 71 to drive the elevation and lowering of the lower spindle 41 and the disc playing means 60, timings for the elevation and lowering can be easily matched between these components to enable the discs to be elevated and lowered without changing the gap between the elevating or lowering played disc and the held discs in the housing section, thereby preventing the disc from contacting one another.

In addition, since the plates 71 and 81 having the cam grooves 74, 84, and 85 drive the elevation and lowering of the lower spindle 41 of the disc holding means 30 and the disc playing means 60, the elevation and lowering of the lower spindle 41 and the disc playing means 60 can be carried out using the simple configuration while precluding the timings from being unmatched.

Furthermore, due to the configuration in which the elevating means 70 shared by the lower spindle 41 and the disc playing means 60 include the lateral pair of plates 71 and 81 and the cam gear 92 connected to the plate 71 via the intermediate gear 90 to rotate in synchronism with the movement of the plate 71, elevation and lowering can be carried out using the simple configuration while precluding the timings from being unmatched even if the widthwise pitch of the pins 65 and 66 provided on the left and right of the disc playing means 60 is different from the widthwise pitch of the pins 50 and 51 provided on the left and right of the elevating base 42 of the lower spindle 41.

Next, the configuration of a horizontal driving means 100 that can drive the disc transfer means 21 and the elevating means 70 will be described with reference to FIGS. 9–15, 23, and 40.

The horizontal driving means 100 has a driving gear 101 connected to a driving source via a speed reduction mechanism (described below) and rotatably mounted on a shaft 102 standing from the bottom plate 20A. A driving rack 103 is provided that is supported and guided by the carrier 27 side of the disc transfer means 21 and the tray base 22 to relatively slide in the arrow W-X direction, and a rack 104 of the driving rack 103 is formed in its inner side to engage with the driving gear 101.

A speed increasing gear 106 is rotatably provided at a predetermined position of the driving rack 103 via a shaft 105. The speed increasing gear 106 is a two-stage gear composed of a larger and a smaller gears 106A and 106B that have the same number of teeth but different modules, wherein the smaller gear 106B engages with the rack 75 of one 71 of the plates provided in the elevating means 70, while the larger gear 106A engages with the rack 28 of the carrier 27 provided in the disc transfer means 21.

The tray base 22 has in its front a stopper device 110 that restrains the sliding of the carrier 27 and the plate 71 in the arrow W direction and a carrier lock device 112 that inhibits the sliding of the carrier 27 in the arrow X direction.

The stopper device 110 is in the form of an L-shaped lever and is rotatably provided on the tray base 22 via a pin 111. One of its arm sections is formed into a receiving section 110a on which an abutting section 27a formed at the front end of the carrier 27 can be abutted. In addition, the other arm section has formed therein a receiving section 110b on which a tip abutting section 71d formed at the tip of the plate 71 can be abutted and an engaging locking section 110c that can engage with the carrier 27.

The engaging locking section 110c is configured to engage with an engaging-locking recessed portion 27b formed in the outer side of the carrier 27 when the abutting section 27a of the carrier 27 abuts on the receiving section 110a to rotate the stopper device 110 around the pin 111 by a predetermined amount.

The carrier lock device 112 is also in the form of an L-shaped lever and is rotatably provided on the tray base 22 via a pin 113. One of its arm sections is formed into a stopper section 112a that can engage with a stopper recessed portion 27c formed in the inner side of the carrier 27. In addition, the other arm section is formed into an unlocking rotary receiving section 112b.

A common urging spring 114 is provided across the stopper device 110 and the carrier lock device 112 to rotate and urge these devices. The urging spring 114 is disposed to urge the stopper device 110 in a direction in which the device 110 is released while urging the carrier lock device 112 in a direction in which the device 112 engages with the carrier.

An operation device 115 is provided in front of the apparatus body 20 to rotationally move the carrier lock device 112 in the unlocking direction. The operation device 115 is in the form of a lever and is rotatably provided on the apparatus body 20 via a pin 116.

A first arm section of the operation device 115 has formed therein a receiving section 115a on which a front abutting section 71a formed on one 71 of the plates can be abutted.

In addition, a second arm section has formed therein a rotary operation section 115b that can be abutted on the unlocking rotary receiving section 112b of the carrier lock device 112 from the rear. A third arm section has formed thereon a cam pin 115c that can be laterally engaged with and detached from a locking cam groove 22a provided in the bottom surface of the tray base 22. The locking cam groove 22a is formed like a curved surface in such a way to follow the moving trace of the cam pin 115c.

A spring 117 is provided to urge the operation device 115 for rotational movement wherein the urging direction is set so as to shift the receiving section 115a backward.

An intermediate lock device 120 that inhibits one 71 of the plates that has moved in the arrow W direction as far as possible from moving in the arrow X direction while restraining the movement of the tray base 22 in the arrow X direction is provided in the middle of the apparatus body 20. The intermediate lock device 120 is in the form of a lever and its central position is rotationally formed on the apparatus body 20 via a pin 121.

A receiving section 120a on which an intermediate abutting section 71b formed in the middle of the plate 71 can be abutted is formed at the front end of the intermediate lock device 120. A passive cam section 120b on which a driving cam section 22b (see FIG. 3) provided close to the rear of the tray base 22 can be abutted is formed close to the rear of the intermediate lock device 120. In addition, a stopper section 120c on which a stopped portion 22c (see FIG. 3) provided close to the rear of the tray base 22 can be abutted is formed at the rear end of the intermediate lock device 120. A spring 122 urges the intermediate lock device 120 so that the receiving section 120a thrusts into the moving trace of the intermediate abutting section 71b.

The apparatus body 20 has in its rear, a rear lock device 123 that receives one 71 of the plates that has moved in the arrow X direction and that locks the carrier 27 when the plate 71 has further moved in the arrow X direction. The rear lock device 123 is in the form of an L-shaped lever and its central position is rotationally formed on the apparatus body 20 via a pin 124.

A receiving section 123a on which a rear-end abutting section 71c formed at the rear end of the plate 71 can be abutted is formed at the front end of a front-facing arm section of the rear lock device 123. An abutting section 123b on which a rear-end abutting section 27d formed at the rear end of the carrier 27 can be abutted is formed in a horizontal arm section of the rear lock device 123. In addition, the receiving section 123a has formed thereon an engaging locking section 123c that can be externally engaged with and disengaged from an engaging-locking recessed portion 27e provided close to the rear of the carrier 27 and that is outwardly open. A spring 125 urges the rear lock device 123 so that the receiving section 123a thrusts into the moving trace of the rear-end abutting section 71c.

The components 101 to 125 constitutes an example of the horizontal driving means 100 capable of driving the disc transfer means 21 and the elevating means 70. According to the horizontal driving means 100, a driving source rotationally drives the driving gear 101 forward and backward via the speed reduction mechanism to allow the driving rack 103 to slide in the arrow W-X direction. The sliding of the driving rack 103 causes the disc transfer means 21 and the elevating means 70 to be driven via the speed increasing gear 106.

Figure 11A:
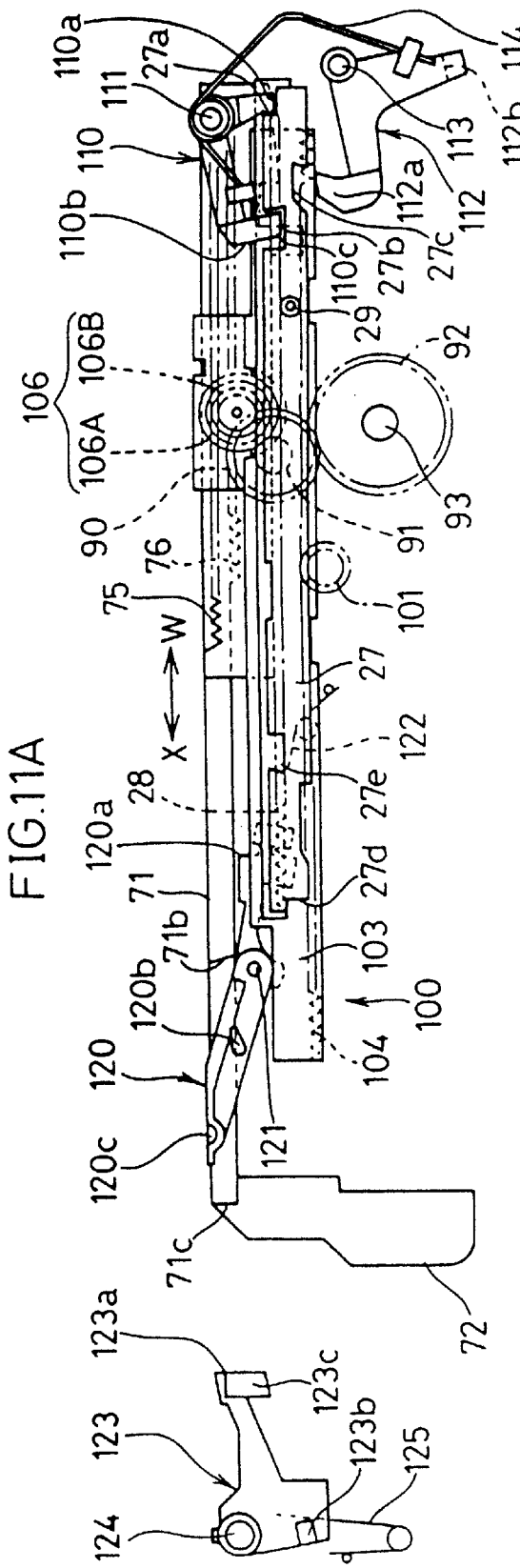
FIGS. 11A–B show the elevating means and horizontal driving means of the disc changer, FIG. 11A being a side view showing a play state and FIG. 11B being a side view and showing a lower-spindle lowering state.

For example, while the disc is being played as shown in FIG. 11(A), the carrier 27 is moved to the front end limit to allow its abutting section 27a to abut on the receiving section 110a to rotationally move the stopper device 110 against the force of the urging spring 114, thereby engaging the engaging locking section 110c with the engaging-locking recessed portion 27b of the carrier 27. This operation serves to maintain the position of the carrier 27 at the front end limit. In addition, the rotary operation section 115b of the operation device 115 abuts on the rotary receiving section 112b of the carrier lock device 112 to rotationally move the carrier lock device 112 against the force of the urging spring 114 to detach the stopper section 112 from the stopper recessed portion 27c.

The driving cam section 22b of the tray base 22 acts on the receiving cam section 120b to rotationally move the intermediate lock device 120 against the force of the spring 122 to place the receiving section 120a out of the moving trace of the rear abutting section 71b. Furthermore, the rear lock section 123 is rotationally moved by means of the urging force of the spring 125 to thrust the receiving section 123a into the moving trace of the rear-end abutting section 71c. In addition, one 71 of the plates slides toward the front end to elevate the elevating means 70 to lift the spindle 41 and the recording/playing apparatus 62.

Figure 11B:
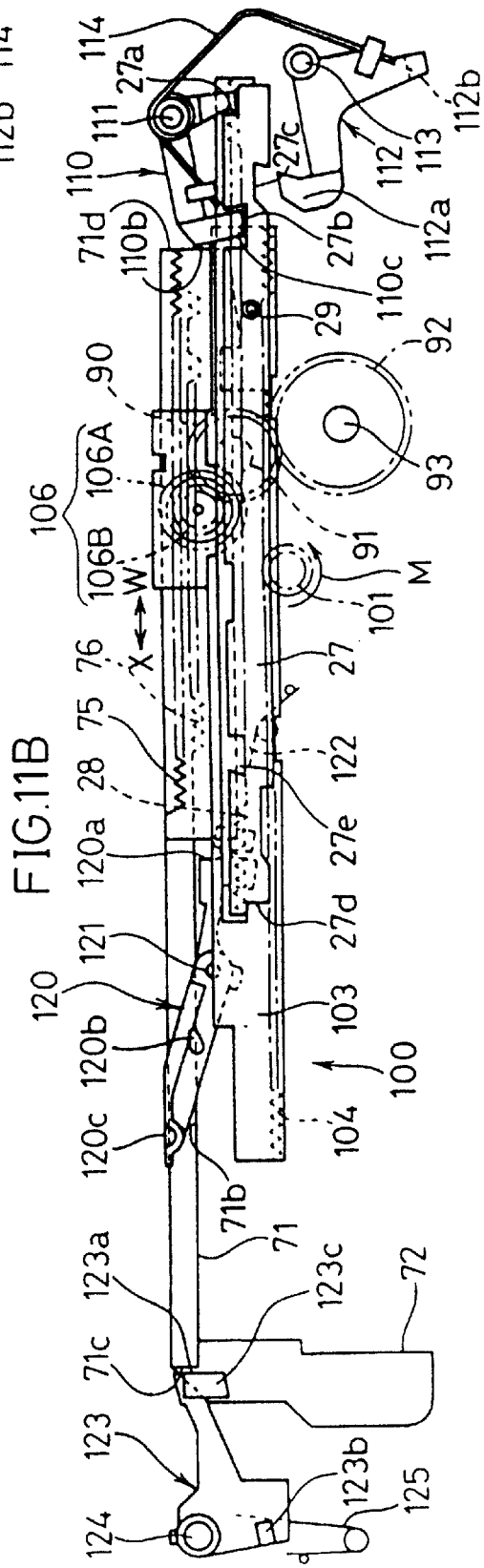

In this state, to return to the disc housing position A the discs 1 and 2 that have been played, the driving gear 101 is first rotated in the arrow M direction in FIG. 11(B). Then, the driving rack 103 slides in the arrow X direction, but since the stopper device 110 inhibits the movement of the carrier 27, the larger gear 106A of the speed increasing gear 106 journaled to the driving rack 103 meshes with the rack 28 of the carrier 27 to rotate the speed increasing gear 106.

Consequently, the smaller gear 106B of the speed increasing gear 106 is rotated to cause the one 71 of the plates to slide in the arrow X direction via the upper rack 75 until the rear-end abutting section 71c abuts on the receiving section 123a.

The sliding of one 71 of the plates in the arrow X direction causes the elevating means 70 to descend to lower the lower spindle 41 and the recording/playing apparatus 62. In this case, the speed increasing gear 106 is transmitting a force at a reduced speed to enable slow and stable descent. As a result, the lower spindle has lowered and the tray is placed at the front position as shown in FIG. 11(B).

When the rear-end abutting section 71c of one 71 of the plates abuts on the receiving section 123a to stop the sliding of the plate 71, the driving rack 103 slides in the arrow X direction to allow the smaller gear 106B of the speed increasing gear 106 journaled to the driving rack 103 to mesh with the fixed upper rack 75 to rotate the speed increasing gear 106. Consequently, as shown in FIG. 12(A), the larger gear 106A of the speed increasing gear 106 is rotated to allow the carrier 27 to slide in the arrow X direction via the rack 28 to rotationally move the stopper device 110 due to the urging spring 114, thereby detaching the engaging locking section 110c from the engaging-locking recessed portion 27b of the carrier 27.

The carrier 27 slides until the rear-end abutting section 27d abuts on the abutting section 123b. This abutment causes the rear lock device 123 to be rotationally moved against the force of the spring 125 to externally engage the engaging-locking section 123c with the engaging-locking recessed portion 27e to lock the position of the carrier 27 at the rear end limit. The carrier 27 slides to allow the tray 23 to slide in the arrow X direction relative to the tray base 22, resulting in the state shown in FIG. 12(A) in which the lower spindle has lowered and in which the tray is placed at the rear position. The locking rotational movement of the rear lock device 123 causes the receiving section 123a to escape inward from the rear-end abutting section 71c of the plate 71.

This operation enables the plate 71 to slide in the arrow X direction. Thus, one 71 of the plates is allowed to slide in the arrow X direction to elevate the elevating means 70 and thus the lower spindle 41 and the recording/playing apparatus 62, resulting in the disc stock state shown in FIG. 12(B).

Figure 13:
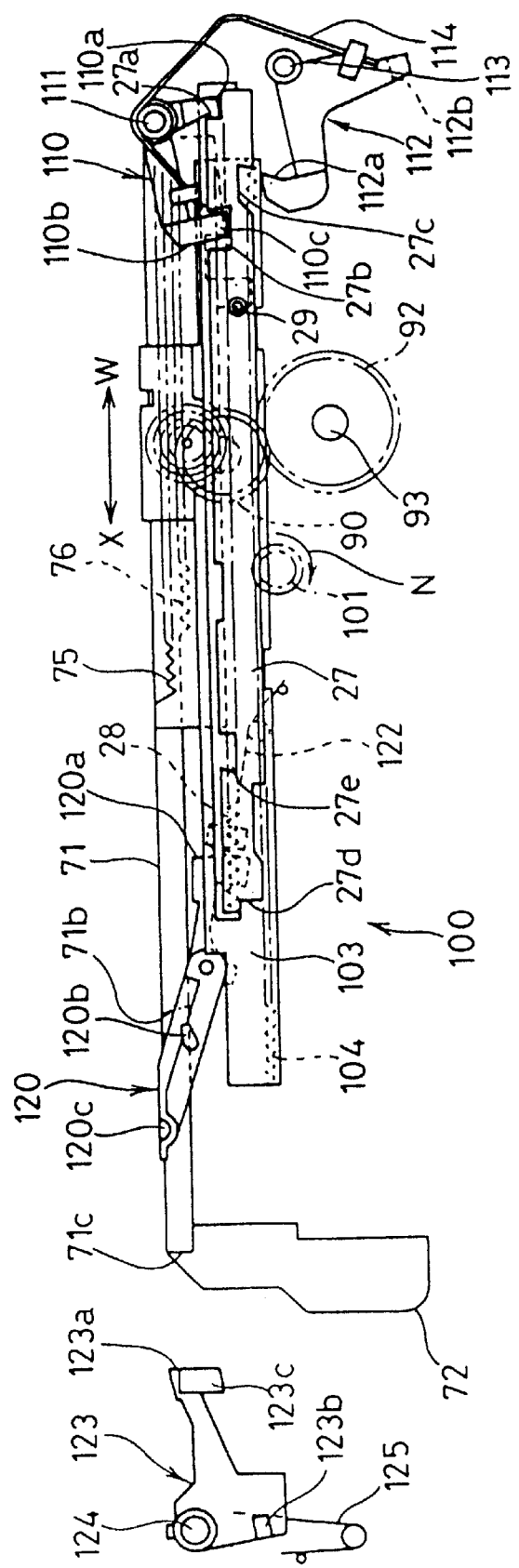
FIG. 13 is a side view showing the elevating means and horizontal driving means of the disc changer in a change state.

To switch this state to the disc change state shown in FIG. 13, the driving gear 101 is first rotated in the direction opposite to the one described above, that is, the arrow N direction. Then, the driving rack 103 slides in the arrow W direction, but since the rear lock device 123 inhibits the movement of the carrier 27, the larger gear 106A of the speed increasing gear 106 journaled to the driving rack 103 meshes with the fixed rack 28 of the carrier 27 to rotate the speed increasing gear 106.

Consequently, the smaller gear 106B of the speed increasing gear 106 is rotated to cause the one 71 of the plates to slide in the arrow W direction via the upper rack 75. Then, the elevating means 70 descends to lower the lower spindle 41 and the recording/playing apparatus 62.

When one 71 of the plates slides in the arrow (a) direction to abut and lock the tip abutting section 71d of the plate 71 on the receiving section 110d of the lock device 110, as described above, the rear lock device 123 can be rotationally moved by the spring 125 in the unlocking direction. Thus, the rear lock device 123 is rotationally moved in the unlocking direction to detach the engaging locking section 123c from the engaging-locking recessed portion 27e. The sliding of the driving rack 103 in the arrow (a) direction causes the speed increasing gear 106 journaled to the driving rack 103 to rotate due to the engagement of its smaller gear 106B with the fixed upper rack 75.

Consequently, the larger gear 106A of the speed increasing gear 106 is rotated to feed the carrier 27 in the arrow W direction via the rack 28, and the carrier 27 slides in the arrow W direction while having its speed increased as the driving rack 103 moves. The carrier 27 slides until its abutting section 27a abuts on the receiving section 110a of the lock device 110. The sliding of the carrier 27 causes the tray 23 to slide in the arrow W direction relative to the tray base 22. In addition, the abutting section 27a abuts on the receiving section 110a to rotationally move the stopper device 110 against the force of the urging spring 114 to engage the engaging-locking section 110c with engaging-locking recessed portion 27b of the carrier 27. This operation serves to maintain the position of the carrier 27 at the front end limit. The locking rotational movement of the stopper device 110 causes the receiving section 110b to escape inward from the tip abutting section 71d of the plate 71.

This operation enables the plate 71 to slide in the arrow w direction. Thus, one 71 of the plates is allowed to slide in the arrow W direction to elevate the elevating means 70, thereby elevating the lower spindle 41 and the recording/playing apparatus 62, resulting in the disc change state shown in FIG. 13.

In the closed state shown in FIG. 14(A), one 71 of the plates further slides in the arrow W direction compared to the play state shown in FIG. 11(A). Thus, the elevating means 70 descends to lower the lower spindle 41 and the recording/playing apparatus 62.

Figure 15:
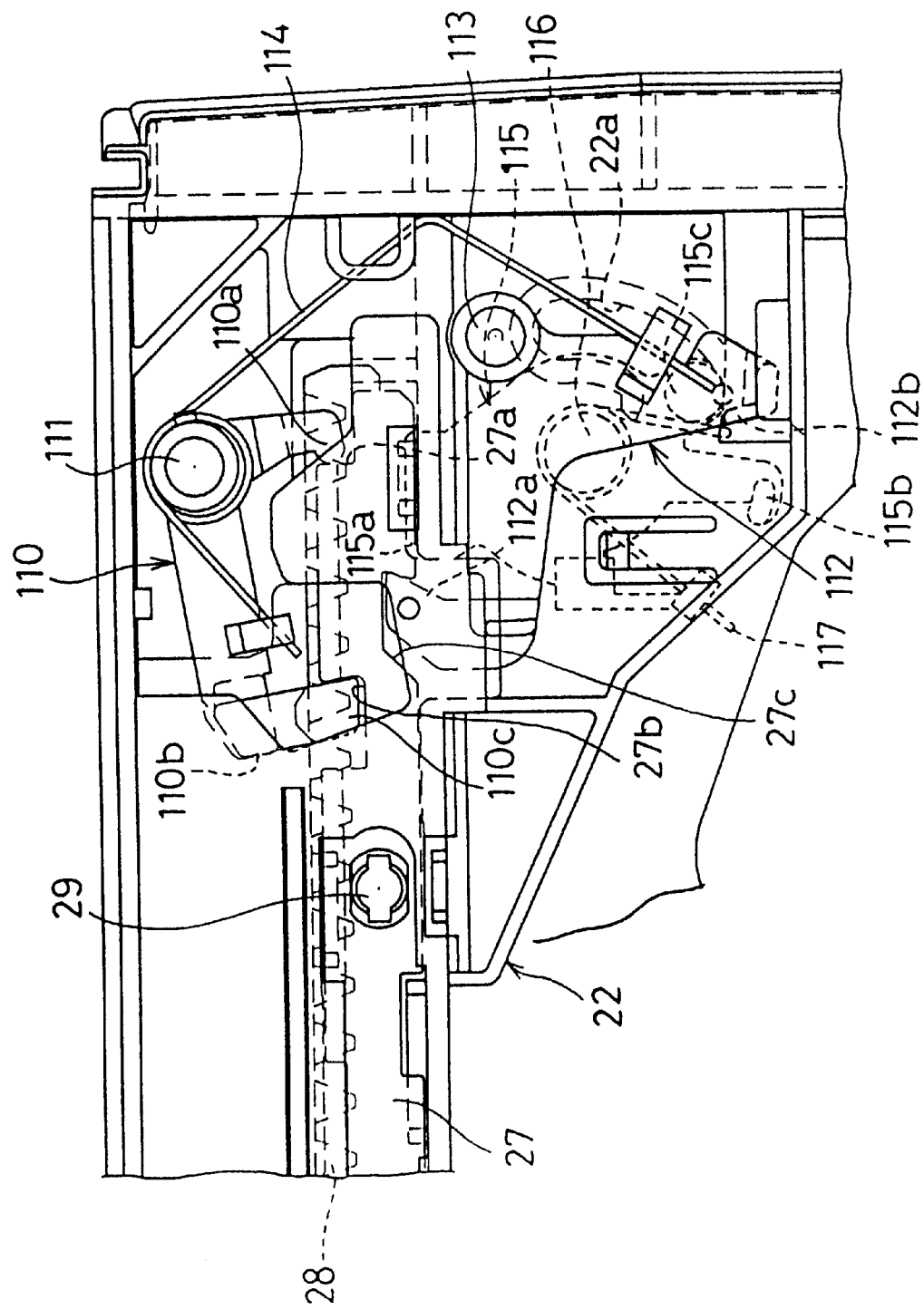
FIG. 15 is a top view showing the elevating means and horizontal driving means of the disc changer, particularly a stopper portion.

In the closed state shown in FIG. 14(A), the driving gear 101 can be rotated in the arrow direction to enter the open state shown in FIG. 14(B). That is, the driving gear 101 is rotated to allow the driving rack 103 to slide in the arrow W direction to abut on a stopper (not shown) provided in front of the apparatus body 20, thereby meshing the smaller gear 106B with the upper rack 75 on the plate 71 that is stopped in the arrow W direction. The smaller gear 106B is then rotated to rotate the larger gear 106A of the speed increasing gear 106 to cause the carrier 27 to slide in the arrow W direction via the rack 28. In this case, the carrier lock device 112 is rotationally moved due to the urging spring 114 to engage its stopper section 112a with the stopper recessed portion 27c of the carrier 27 as shown in FIGS. 14(B) and 15 in order to lock the carrier 27. The carrier lock device 112 allows the tray base 22 and tray 23 integrated with the carrier 27 to protrusively move in the arrow W direction.

The movement of the tray base 22 and the tray 23 in the arrow X direction in switching from the open state shown in FIG. 14(B) to the close state shown in FIG. 14(A) is effected by rotating the driving gear 101 in the arrow M direction.

According to the horizontal driving means 100, with respect to the driving of the tray 23 and the driving of both spindles 31 and 41 and the elevating means 70 of the disc playing means 60 which involve significantly different operational loads, by freely selecting the modules, that is, the pitch radii of the larger and smaller gears 106A and 106B having the same number of teeth, the driving force transmitted from the common driving source can be freely set depending on loads on the tray 23 and elevating means 70 and required speeds.

Next, the configuration of a horizontality maintaining means 130 for restraining the elevating posture of the disc playing means 60 will be described with reference to FIGS. 17 to 22 and 40.

The horizontally maintaining means 130 has a rotating shaft 131 extending parallel with the sliding direction of the plate 81 (the arrow W-X direction) and rotatably supported on the other side plate 20B of the apparatus body 20. V-shaped horizontally maintaining levers 132 are integrated with the rotating shaft 131 at two longitudinal positions thereof (the levers 132 may be provided at a single or plural positions) via its proximal ends so as to rotationally move with the rotating shaft 131. An engaging pin (an example of an engaging section) extending parallel with the rotating shaft 131 is provided at the free end of the horizontally maintaining lever 132.

In addition, an L-shaped lower member 134 and an L-shaped upper member 135 are integrally provided on the other side of the elevating stand 61 of the disc playing means 60 at two positions in the arrow W-X direction and in parallel in this direction. The lower member 134 forms an upward receiving surface 134a and the upper member 135 forms a downward pressing surface 135a. A receiving surface 134a and the pressing surface 135a form an engaging groove 136 that appears like a long hole in the lateral direction as seen from the longitudinal direction. The engaging pin 133 is configured to slidably engage with the engaging groove 136 to rotationally move around the axis of the rotating shaft 131 during the elevation and lowering of the disc playing means 60.

The components 131 to 136 constitutes an example of the horizontality maintaining means 130 for restraining the elevating and lowering posture of the disc playing means 60.

According to the horizontality maintaining means 130, the elevating means 70 drives the left and right plates 71 and 81 to allow them to slide in opposite directions. Thus, the cam gear 92 rotates in response to the movement of one 71 of the plates to rotate the cam cylinder 94 integrated with the cam gear 92 to rotate the cam groove 96 formed in the cam cylinder 94, thereby elevating and lowering the pin 65 engaged with the cam groove 96, and thereby synchronously elevating and lowering the pin 66 engaged with the cam groove 85, by the corresponding amount due to the movement of the cam groove 85 formed in the other plate 81.

Figure 17:
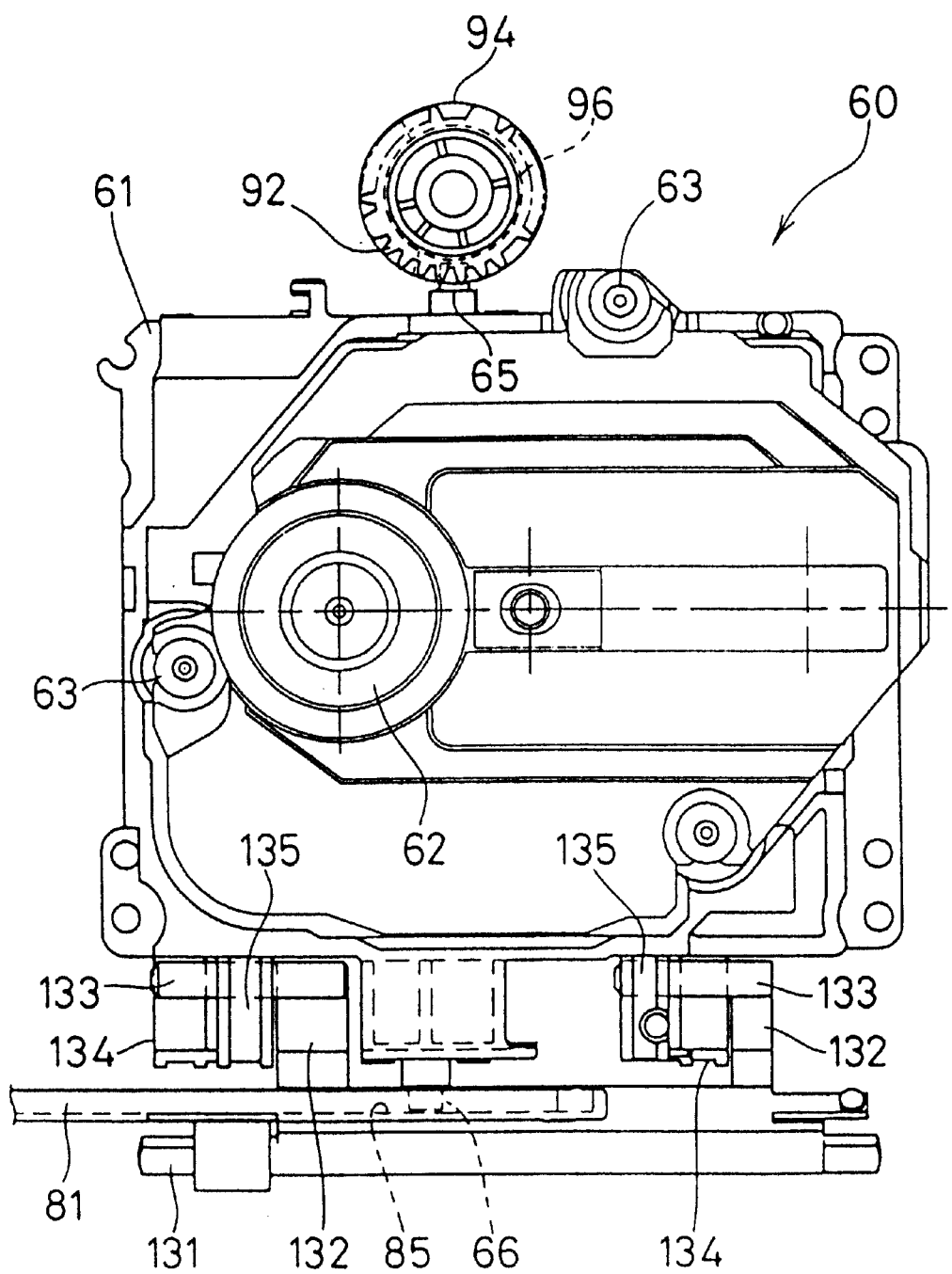
FIG. 17 is a top view showing a horizontality maintaining means of the disc changer in a disc playing lowering state.
Figure 18:
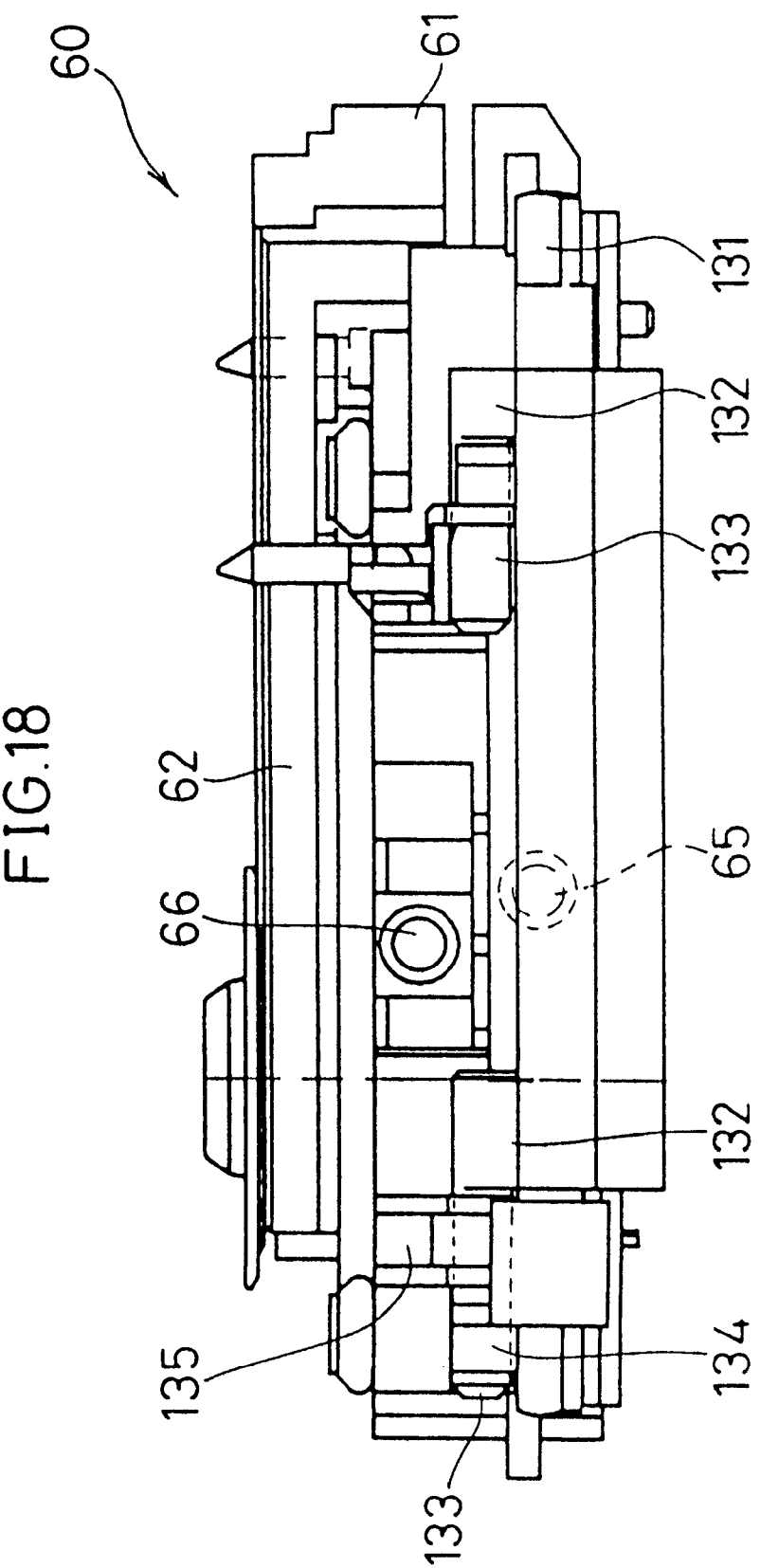
FIG. 18 is a side view showing the horizontality maintaining means of the disc changer in the disc playing lowering state.
Figure 19:
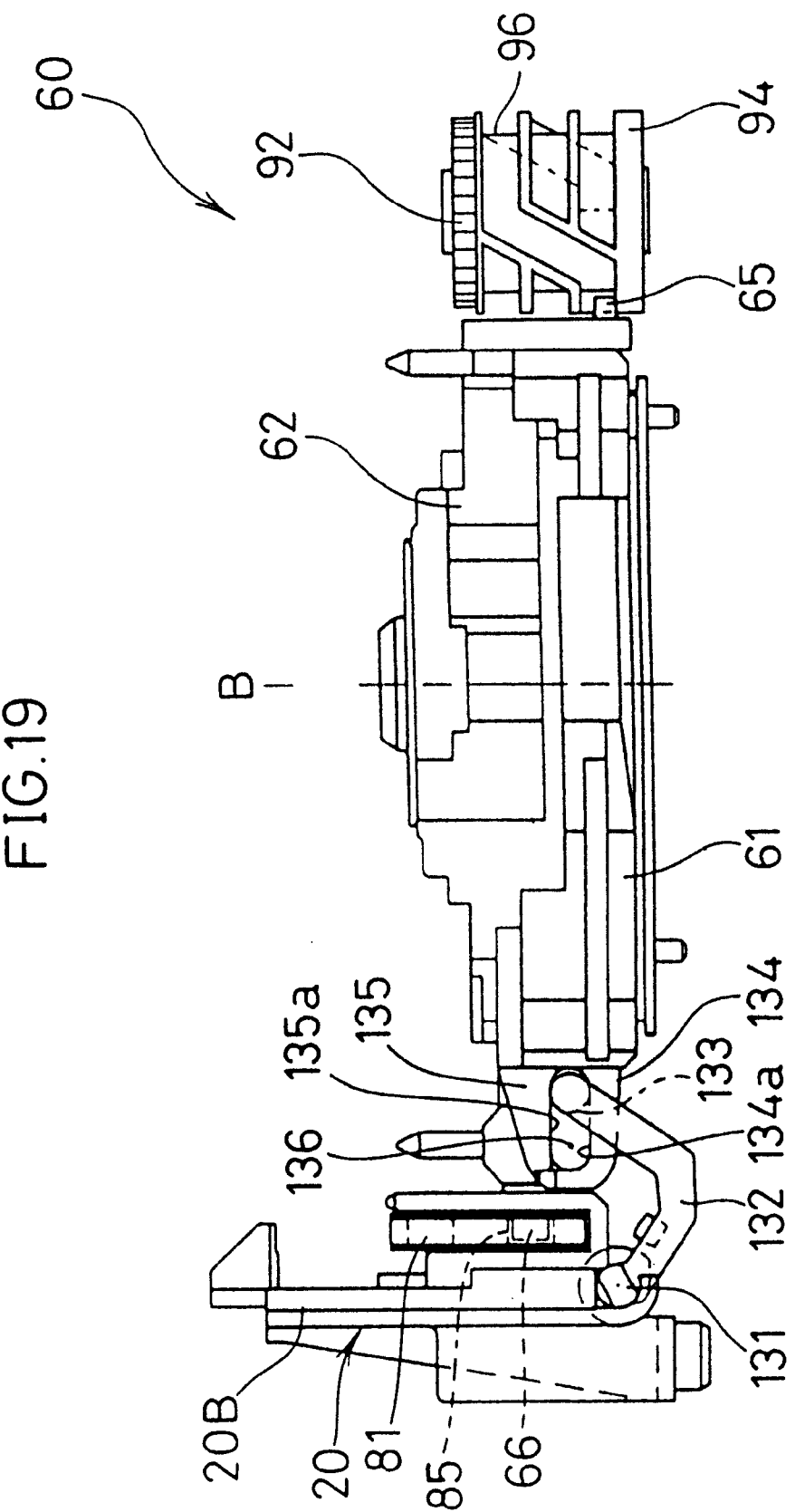
FIG. 19 is a front view showing the horizontality maintaining means of the disc changer in the disc playing lowering state.
Figure 20:
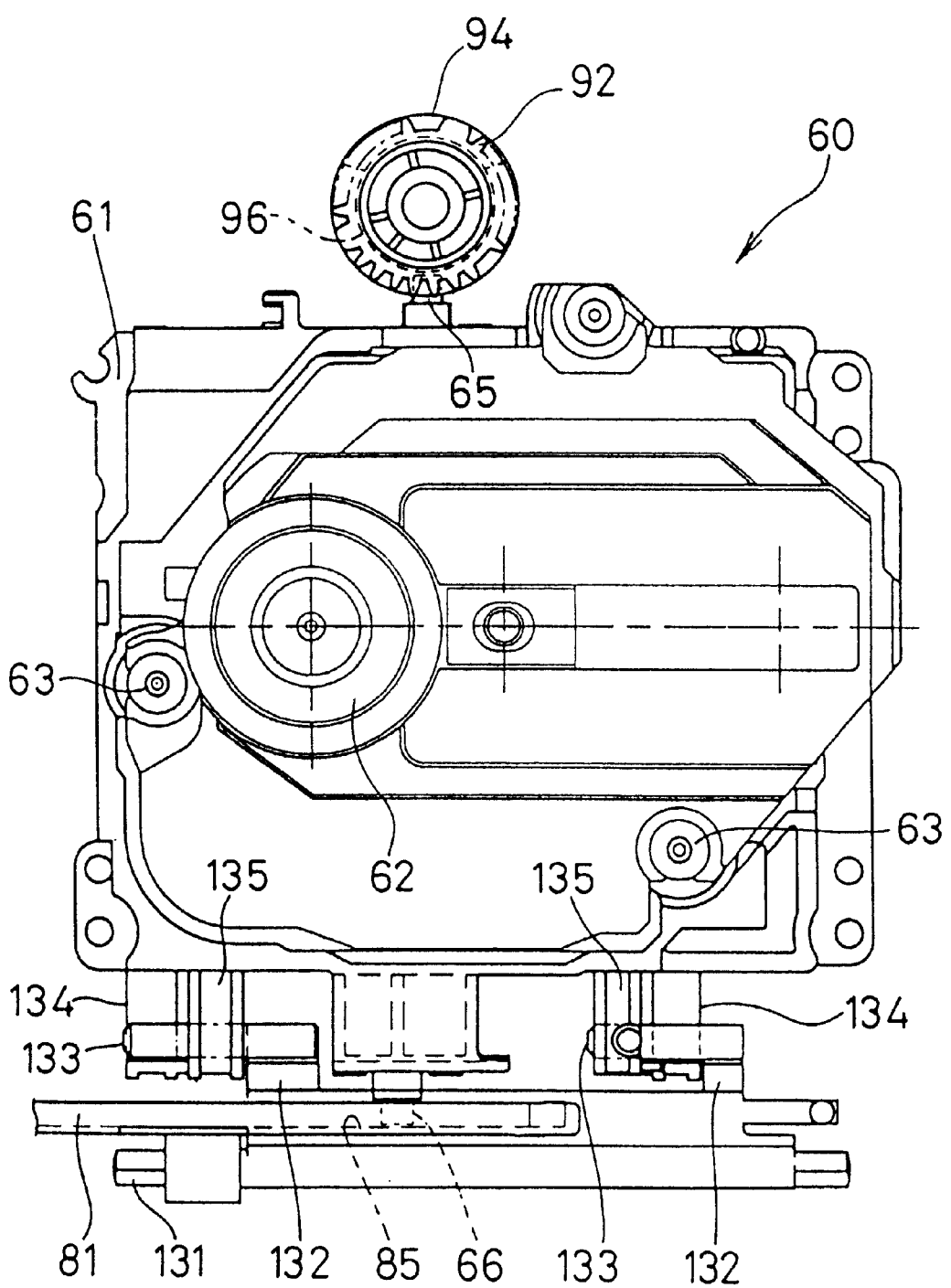
FIG. 20 is a top view showing the horizontality maintaining means of the disc changer in a disc playing elevating state.
Figure 21:
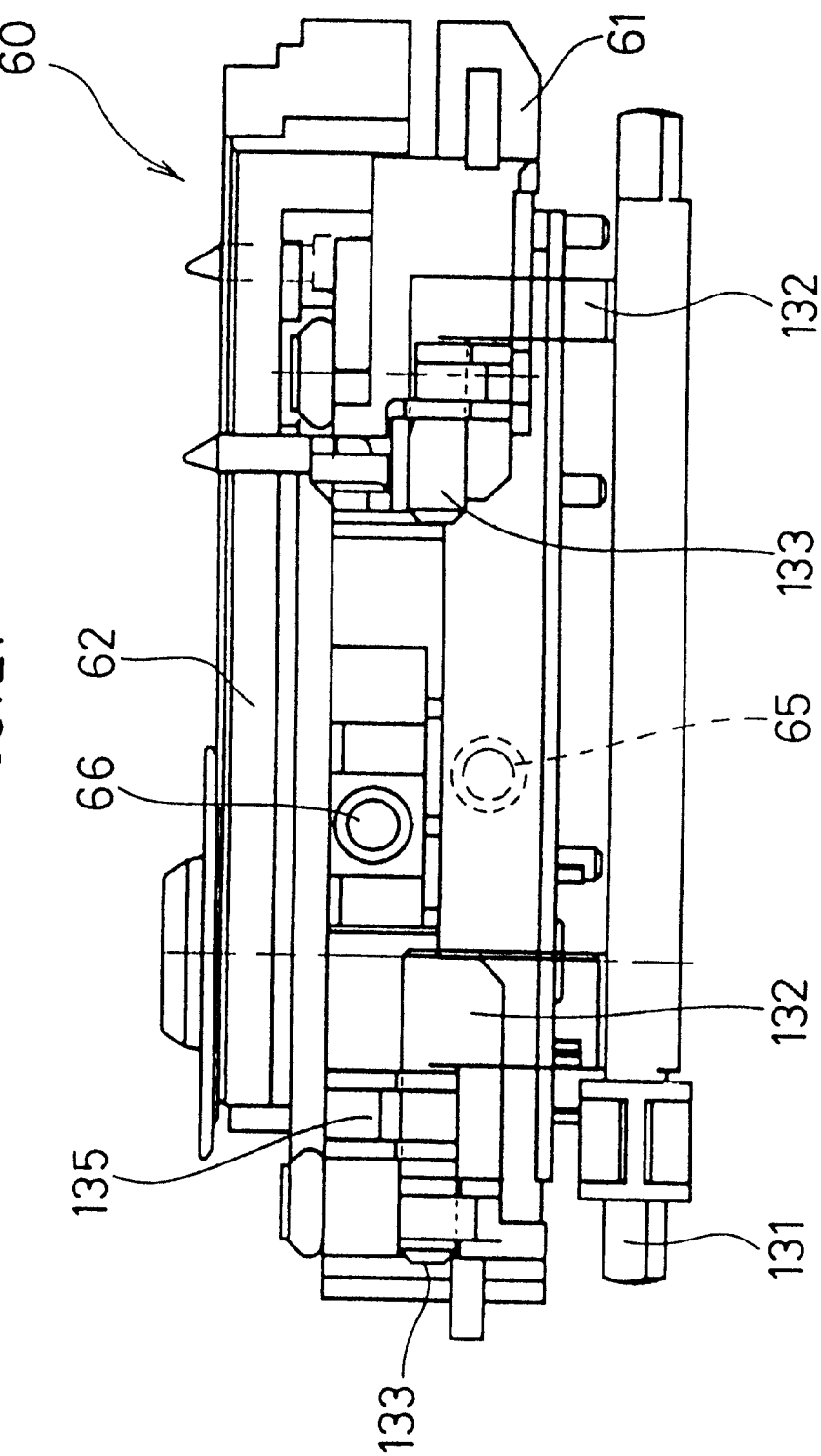
FIG. 21 is a side view showing the horizontality maintaining means of the disc changer in the disc playing elevating state.
Figure 22:
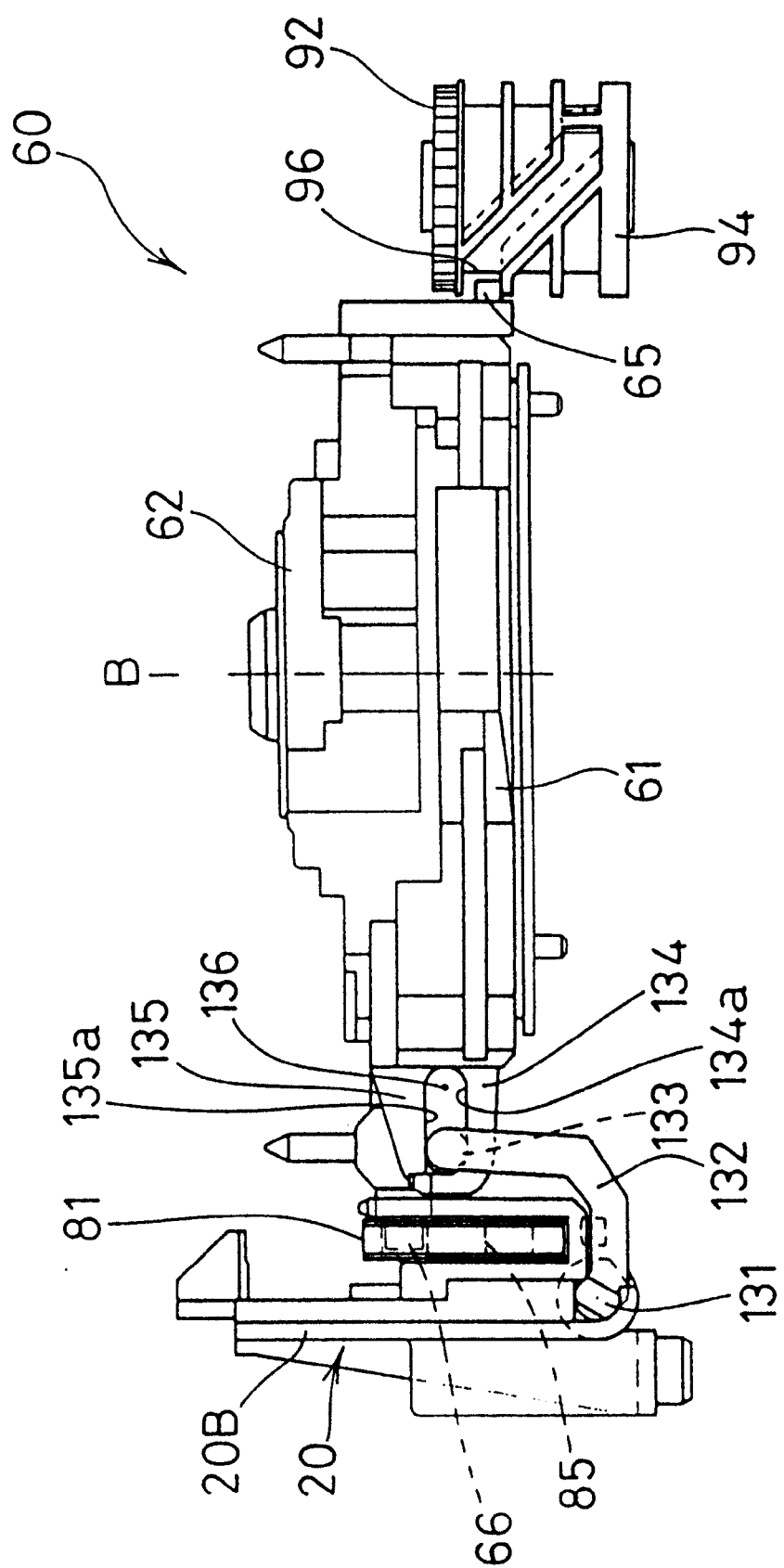
FIG. 22 is a front view showing the horizontality maintaining means of the disc changer and showing the disc playing elevating state.

Thus, the disc playing means 60 elevates and lowers in the arrow Y-Z direction. That is, FIGS. 17 to 19 show a state in which the disc playing means 60 is lowered in the arrow Z direction, whereas FIGS. 20 to 21 show a state in which the disc playing means 60 is elevated in the arrow Y direction.

While the disc playing means 60 is elevating and lowering in this manner, in the horizontality maintaining means 130 the engaging pin 133 is slidably engaged with the engaging groove 136 and is thus elevated and lowered in response to the decent and descent of the disc playing means 60. Then, the horizontality maintaining levers 132 with the engaging pin 133 integrated therewith are rotationally moved with the rotating shaft 131 to rotationally move the engaging pin 133 around the axis of the rotating shaft 131.

Thus, the disc playing means 60 can be elevated and lowered while using the pair of horizontality maintaining levers 132 to restrain movements other than the elevation and lowering, that is, to restrain the rotational movement of the disc playing means 60.

The horizontality maintaining means 130 is composed of the rotating shaft 131 extending parallel with the sliding direction of the plate 81, the horizontality maintaining lever 132 that can rotationally move with the rotating shaft 131, and the engaging pin 133 provided on the horizontality maintaining lever 132 and parallel with the rotating shaft 131 so that the engaging pin 133 is slidably engaged with the engaging locking groove 36 provided in the disc playing apparatus 60 and thus the horizontality maintaining means 130 rotationally moves around the axis of the rotating shaft 131 when the disc playing apparatus 60 elevates or lowers. Thus, when the disc playing apparatus 60 elevates or lowers, the engaging pin 133 provided on the horizontality maintaining lever 132 and parallel with the rotating shaft 131 contacts the engaging groove 136 in the disc playing means 60 and slides to enable the rotational movement of the disc playing means 60 to be restrained, thereby maintaining the horizontal posture of the disc playing means 60.

In addition, the disc playing means 60 is elevated and lowered by engaging the lateral pair of pins 65 and 66 provided on the disc playing means 60 with the lateral pair of cam grooves 85 and 96 provided in the elevating means 70. Accordingly, the elevating means 70 requires only the single pair of cam grooves 85 and 96, so the sliding stroke of the elevating means 70 can be reduced to compactify the disc playing apparatus 19.

Figure 23:
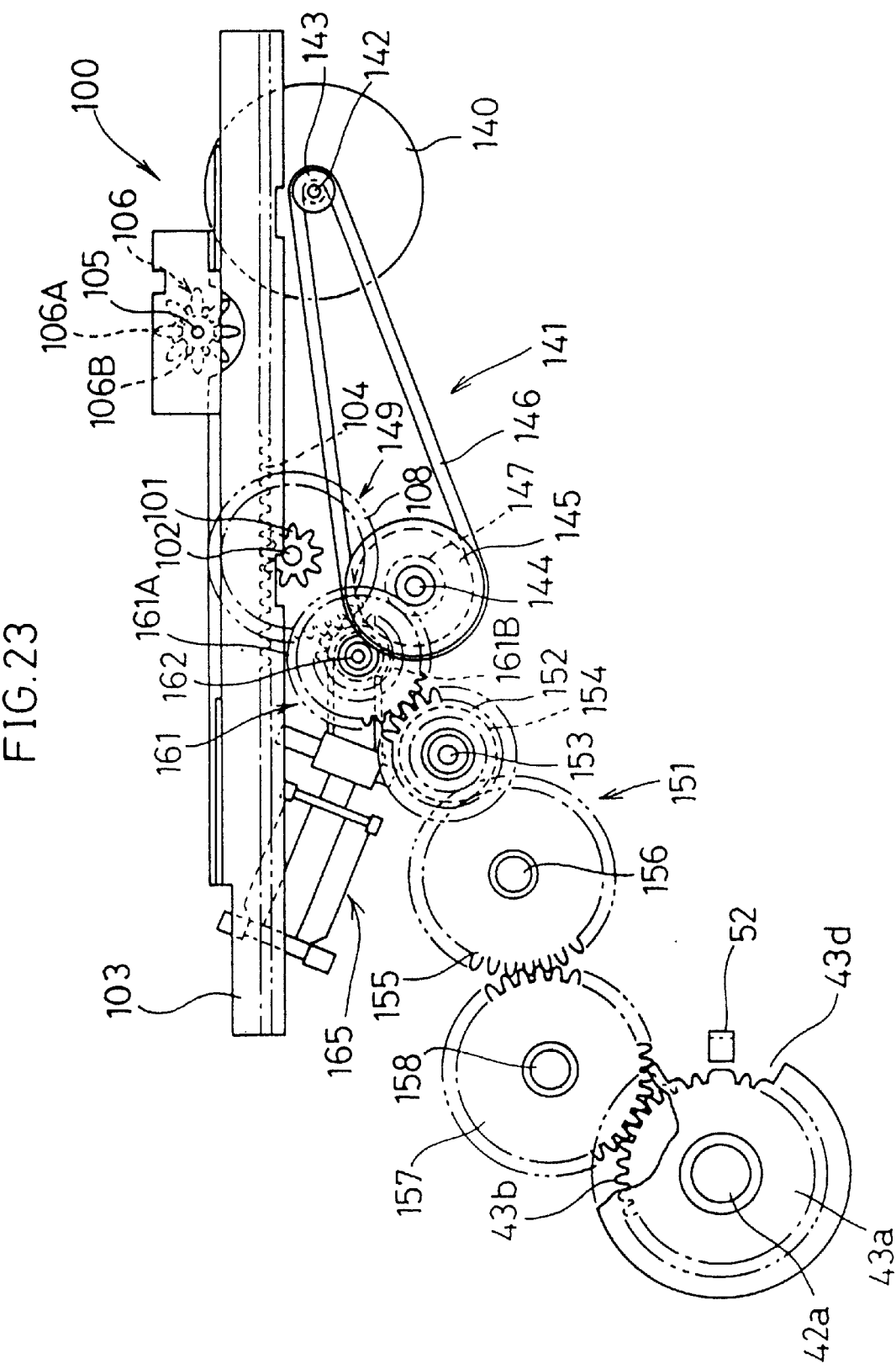
FIG. 23 is a top view showing the horizontal driving means of the disc changer.
Figure 40:
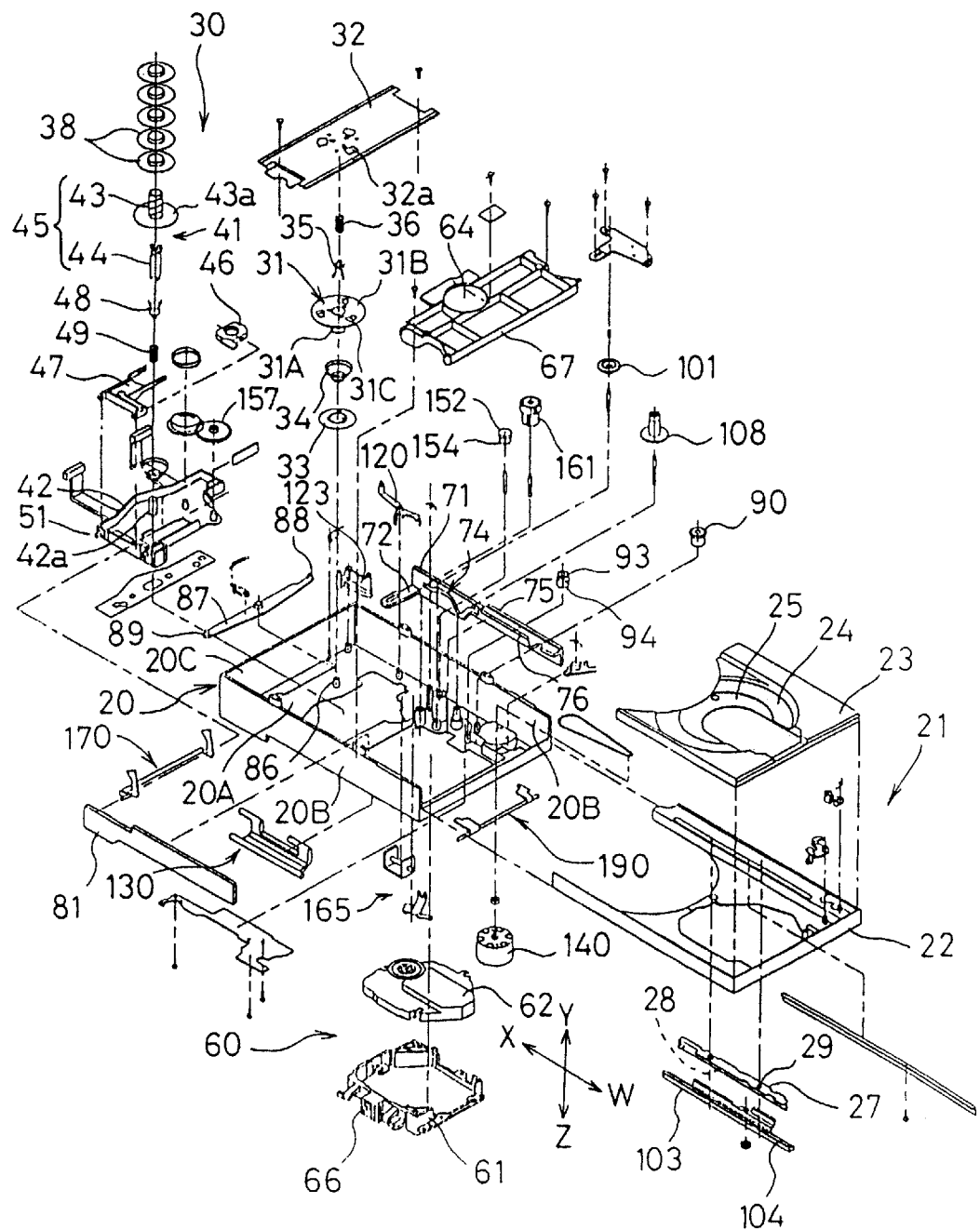
FIG. 40 is an exploded perspective view of the disc changer.
Figure 41A:
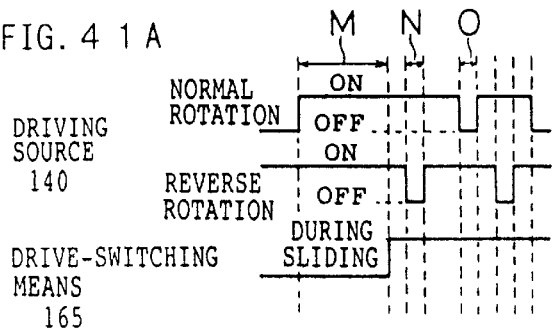
FIGS. 41A–D are timing charts showing each mode switching of the disc changer.
Figure 41B:
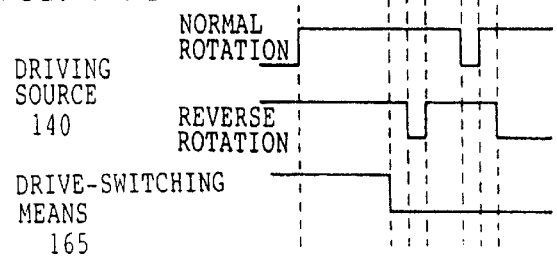
Figure 41C:
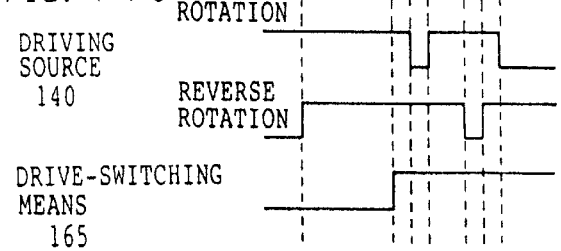
Figure 41D:
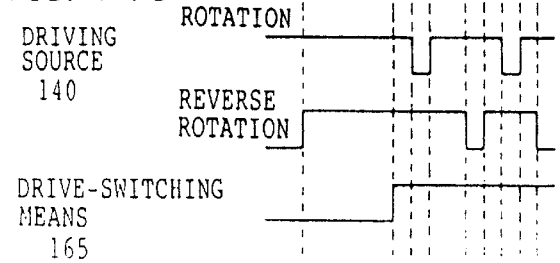
Figure 41E:
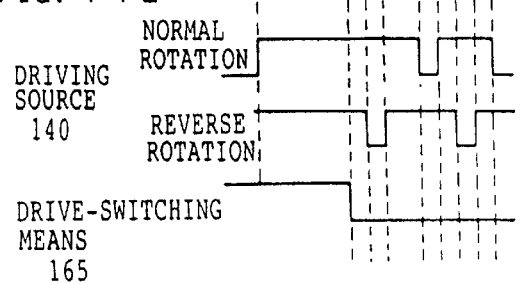
Figure 41F:
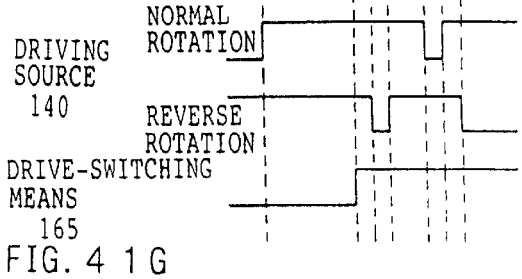
Figure 41G:
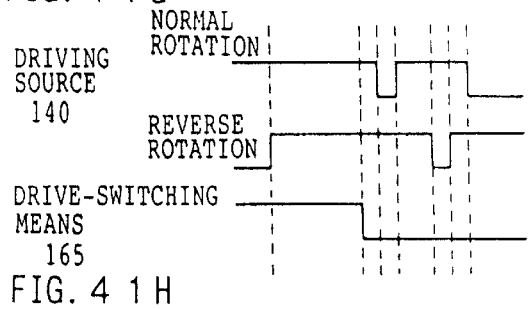
Figure 41H:
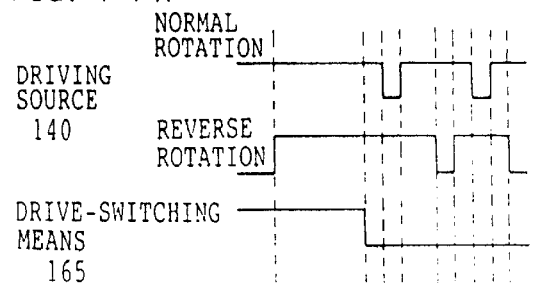

Next, the configuration of a speed reduction mechanism 141 for connecting to the driving gear 101 of the horizontal-driving means 100, the rotation of a driving source 140 consisting of a motor that can be driven forward and backward, the configuration of a gear train 149 provided on the horizontal-driving means 100, and the configuration of a gear train 151 provided in a vertical-driving system for the spacers 38 will be described with reference to FIGS. 23, 24, and 40.

The driving source 140 consisting of a motor that can be driven forward and backward is fixed to the front of the apparatus body 20, and an elastic belt 146 is extended between a transmission pulley 143 mounted on an output shaft 142 of the driving source and a passive pulley 145 rotatably provided in the middle of the apparatus 20 via a shaft 144. A cylindrical gear 147 is fixed to the bottom surface of the passive pulley 145. The components 142 to 147 constitute an example of the speed reduction mechanism 141 for connecting the rotation of the driving source 140 to the driving gear 101.

An example of the gear train 149 provided on the horizontal-driving means 100 is composed of the driving gear 101 of the horizontal-driving means 100 and a large-diameter passive gear 108 integrated with the driving gear 101.

The gear train 151 provided in the vertical-driving system for the spacers 38 has a passive gear 152 provided opposite to the cylindrical gear 147 and is rotationally installed on the apparatus body 20 via a shaft 153. A cylindrical transmission gear 154 is fixed to the bottom surface of the passive gear 152. A first intermediate gear 155 that constantly meshes with the transmission gear 154 is rotatably provided on the elevating base 42 of the disc holding means 30 via a shaft 156, and a second intermediate gear 157 that constantly meshes with the first intermediate gear 155 is rotatably provided thereon via a shaft 158.

The components 152 to 158 constitutes an example of the gear train 151 provided in the vertical-driving system for the spacers 38. The second intermediate gear 157 constantly meshes with the ring-like gear 43b of the disc holding means 30.

Next, the configurations of a switching gear 161 and a drive-switching means 165 for allowing the switching gear 161 to slide in the axial direction will be described with reference to FIGS. 23, 24, and 40. The switching gear 161 is provided opposite to all of the cylindrical gear 147, the passive gear 108, and the passive gear 152.

The switching gear 161 can slide (elevate and lower) and rotate in the axial direction of a shaft 162 from the apparatus body 20. The switching gear 161 consists of a large-diameter gear section 161A that constantly meshes with the cylindrical gear 147 and a small-diameter gear section 161B provided on the bottom surface of the large-diameter gear section 161A. The switching gear 161 is configured to be urged downward by a compression spring 163 and to elevate against the force of the compression spring 163 by means of the forward and backward movements of the drive-switching means 165 consisting of a plunger or a lever.

Furthermore, the switching gear 161 is configured so that when the drive-switching means 165 is not driving and is lowered by the elastic force of the compression spring 163, the small-diameter gear section 161B meshes with the passive gear 108 and so that when the drive-switching means 165 operates to elevate against the force of the compression spring 163, the large-diameter gear section 161A meshes with the passive gear 152.

Then, the switching gear 161 is connected to the driving source 140 via the speed reduction mechanism 141, and the drive-switching means 165 operates to slide in the axial direction in order to mesh with either the gear train 149 provided in the horizontal-driving means 100 or the gear train 151 provided in the elevation and lowering driving system for the spacers 38.

According to the configuration of the speed reduction mechanism 141, the gear train 149, the gear train 151, and the switching gear 161, the forward or backward driving is transmitted to the cylindrical gear 147 via the speed reduction mechanism 141 having the elastic belt 140 to reduce the speed of the cylindrical gear 147 for normal or reverse rotations. During the sliding of the switching gear 161 driven by the drive-switching means 165, switching modes are available including at least the rotational driving, stoppage, and backward driving of the switching gear 161. In this case, the forward and backward switching mode is controlled to start with reverse rotations relative to the rotational direction of the driving source 140 immediately before the start of switching.

That is, in FIGS. 41A–D, mode switching A comprises play, change, and elevation, or play, change, stock, and elevation, mode switching B comprises elevation, change, play, and open, or stock elevation, change, and open, mode switching C comprises stock, change, and elevation, mode switching D comprises stock, change, and lowering, mode switching E comprises elevation, change, and stock, mode switching F comprises play, change, and lowering, or play, change, stock, and lowering, mode switching G comprises lowering, change, and stock, and mode switching H comprises elevate, change, play, and open, or stock lowering, change, and open. In either mode, during the forward or backward sliding of the switching gear 161 driven by the drive-switching means 165, the driving source 140 is controlled to start with reverse rotations instead of normal rotations or with normal rotations instead of reverse rotations.

That is, in mode switching A, the normal- or reverse-rotation line for the driving source 140 indicates brake-on in its higher position and brake-off in its lower position. Thus, in area M, the rotation is stopped because both normal and reverse rotations are braked. In addition, during the sliding of the drive-switching means 165, in area N, the brakes are taken off from the reverse rotation to start reverse rotations, whereas in area O, the brakes are not applied to the normal rotation but to the reverse rotation to effect intended normal rotations.

Figure 24A:
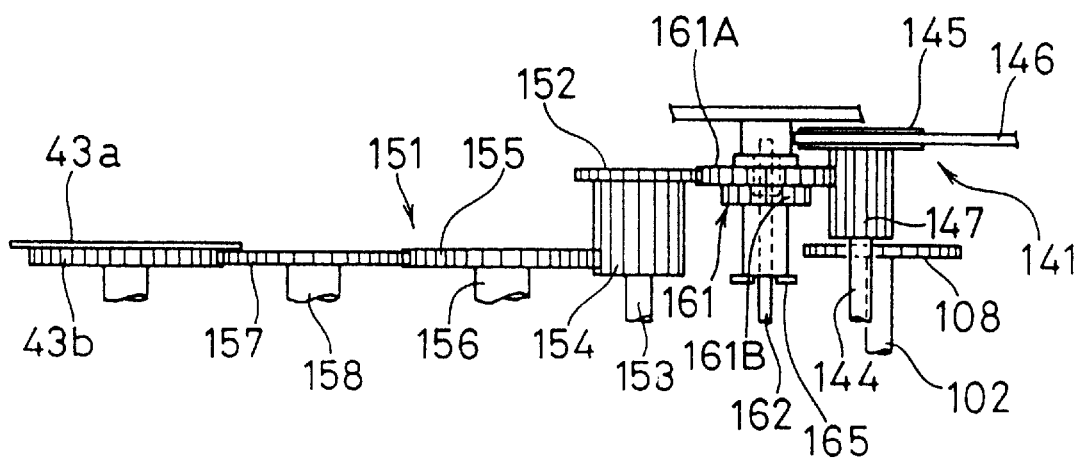
FIG. 24 shows the horizontal driving means of the disc changer, FIG. 24A being a developed side view showing switching to the disc holding means and FIG. 24B being a developed side view showing switching to the horizontal driving means.

When the drive-switching means 165 operates to elevate the switching gear 161 against the elastic force of the compression spring 163, the large-diameter gear section 161A meshing with the cylindrical gear 147 meshes with the passive gear 152, as shown in FIG. 24(A). Thus, after the switching and sliding of the switching gear 161 has been completed, the forward or backward driving by the driving source 140 is transmitted to the ring-like gear 43b of the disc holding means 30 via the gear train 151 to rotate the ring-like gear 43b in the normal or reverse direction.

Figure 24B:
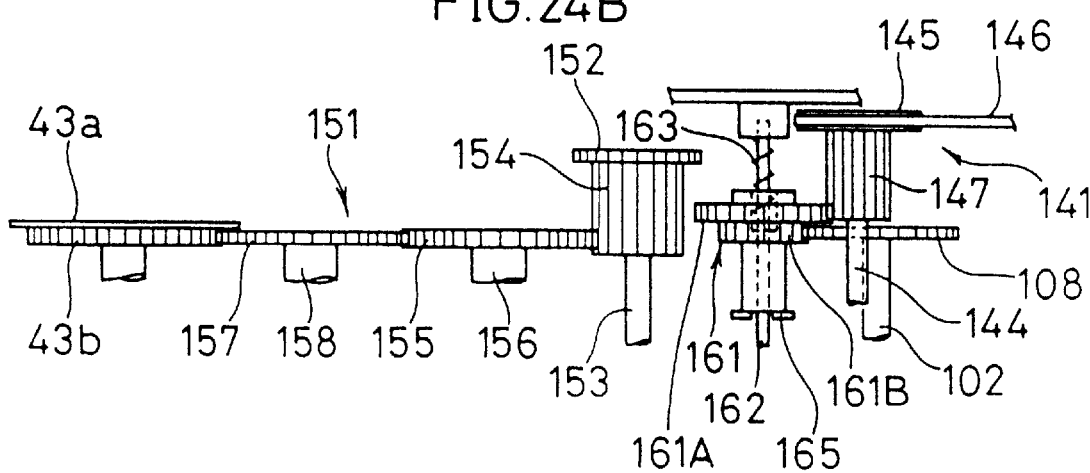

In addition, when the drive-switching means 165 is not operated and the switching gear 161 is lowered by the elastic force of the compression spring 163, the large-diameter gear section 161A is disengaged from the passive gear 152, while the small-diameter gear section 161B meshes with the passive gear 108, as shown in FIG. 24(B). Thus, after the switching and sliding of the switching gear 161 has been completed, the forward or backward driving by the driving source 140 is transmitted to the driving gear 101 of the horizontal-driving means 100 via the gear train 149 to rotate driving gear 101 in the normal or reverse direction.

In these operations, the switching modes including the rotational driving, stoppage, and reverse driving of the switching gear 161 are available during the sliding of the switching gear 161 driven by the drive-switching means 165. Thus, upon switching, the switching gear 161 that effects switching between the two driving systems starts to mesh with the gear train 149 or 151 in each driving system while carrying out a few repetitions of rotations, stoppages, and reverse rotations. Consequently, the teeth tips are prevented from mutually abutting to obstruct the sliding of the switching gear 161, thereby enabling the rotation to be positively transmitted. As a result, the sharing of the driving source 140 and partial sharing of the driving systems are enabled to reduce the number of required parts and thus the size of the apparatus.

The use of the elastic belt 146 as part of the speed reduction mechanism 141 causes the lateral pressure of the elastic belt 146 to remain in the driving system after the driving source 140 has stopped driving, thereby increasing loads effected when the switching gear 161 is disengaged from the driving system to which it has been connected prior to switching. Thus, the repetitions of rotations, stoppages, and reverse rotations effectively eliminates this disadvantage.

In addition, since upon driving switching, the initial rotational direction of the switching gear 161 is controlled to start with the direction opposite to the rotational direction of the driving system to which the gear has been connected prior to switching, the rotation caused by the inertia of driving after its stoppage can be stopped to reduce the standby time from the stoppage of driving prior to switching until the switching mode is entered, thereby reducing the disc change time. In addition, the configuration using the elastic belt 146 is particularly effective in reducing switching loads caused by the lateral pressure of the elastic belt 146.

Figure 25:
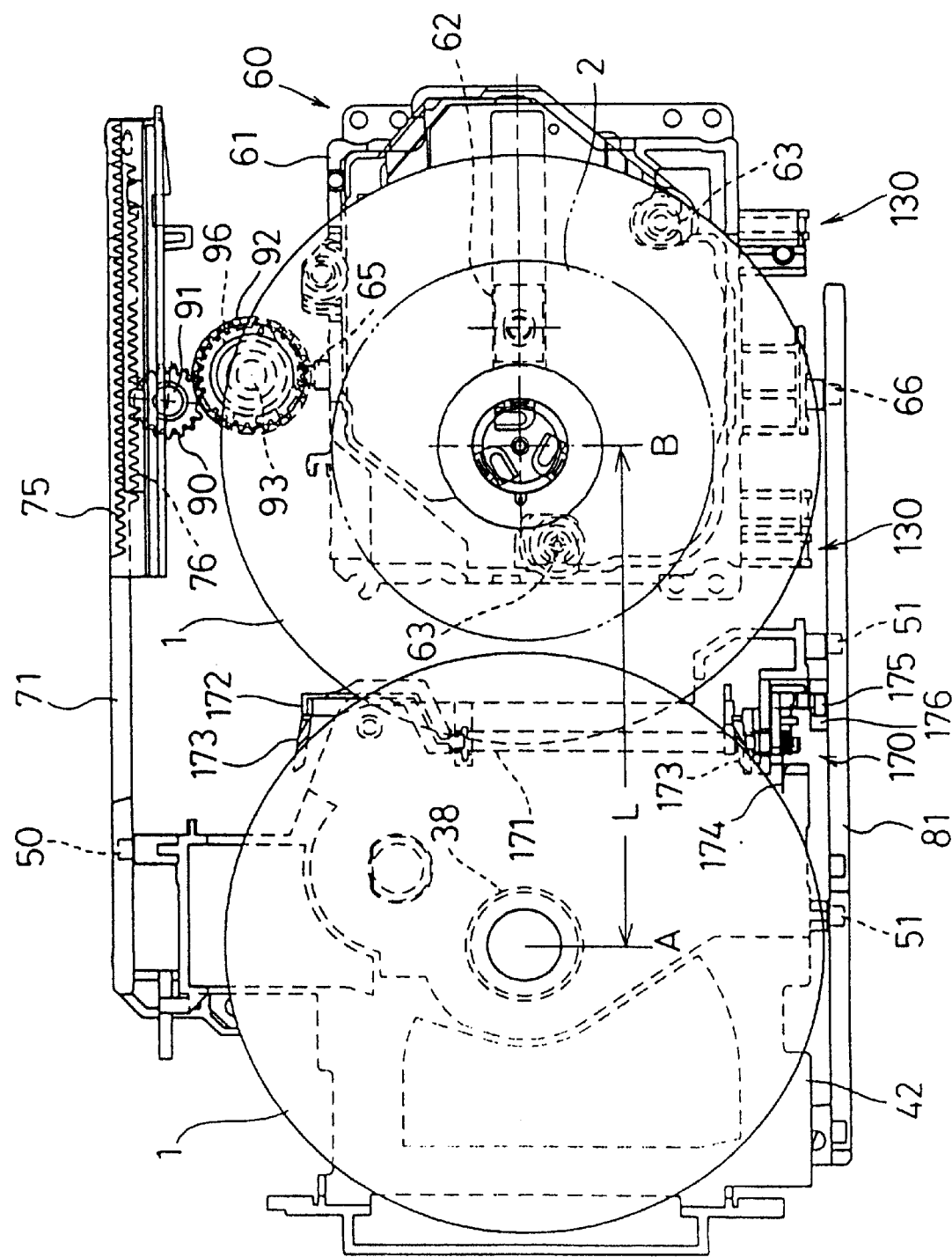
FIG. 25 is a top view showing a gap maintaining means of the disc changer.

Next, the configuration of a disc gap maintaining means 170 will be described with reference to FIGS. 25 to 27. The disc gap maintaining means 170 is configured to advance between housed discs adjacent to a played disc in the vertical direction. The disc gap maintaining means 170 is provided between the disc playing position B and the disc housing position A and is composed of a shaft section 171 rotatably supported on the elevating base 42 of the lower spindle 41 and levers 172 connected to the shaft section 171 at two lateral positions.

Advancing sections 173 that can advance between adjacent housed discs are provided at the tips of the respective levers 172, and are each composed of two smooth planes 173*a* and 173*b* having a sharp junction and that directly contact the end surfaces of the respective discs located above and below the planes 173*a* and 173*b* to separate these adjacent discs in the vertical direction (the planes may be configured to advance between the discs without separating them in the vertical direction). In this case, the two advancing sections 173 of the disc gap maintaining means 170 are provided approximately symmetrically around a centerline common to the played and housed discs.

The disc gap maintaining means 170 is configured to be driven by the elevating means 70. That is, the disc gap maintaining means 170 is configured to use a spring 174 provided between the disc gap maintaining means 170 and the elevating gap 42 to stand the levers 172 in order to move the advancing sections 173 backward from the end surfaces of the upper and lower discs. A lever-shaped cam follower 175 is provided at the end of the shaft section 171, and a cam body 176 is provided on the inner surface of the other plate 81.

The components 171 to 176 constitute an example of the disc gap maintaining means 170. According to the disc gap maintaining means 170, the plate 81 moves to the disc playing position B to allow the cam follower 175 to act on the cam body 176 to incline the levers 172 toward the disc housing position A against the force of the spring 174, thereby allowing the advancing sections 173 to advance between the adjacent housed discs.

Thus, even if the distance between the disc housing position A and the disc playing position B is reduced so that the housed discs 1 and 2 and the played discs 1 and 2 appear to overlap one another in a top view, in order to compactify the apparatus, as described above, the disc gap maintaining means 170 advances between the housed discs adjacent to the played disc in the vertical direction and prevents the gap from being narrowed even when vibration occurs, thereby preventing accidental track shifts or damage to the disc caused by the contact between the played and housed discs.

In addition, since the disc gap maintaining means 170 is configured to have the levers 172, it can be simply positioned and the gap can be stably maintained using the simple configuration. Furthermore, since the disc gap maintaining means 170 is configured to be driven by the elevating means 70, it can be driven so as not to deviate from the elevating and lowering timings for the lower spindle 41 and disc playing means 60 provided by the elevating means 70.

Furthermore, since the disc gap maintaining means 170 is provided between the disc housing position A and the disc playing position B, the gap can be maintained at a position close to both the disc housing and playing positions A and B, resulting in accurate gap maintenance.

In the disc gap maintaining means 170, the advancing sections 173 that advance between the adjacent discs are provided at the two positions that are almost symmetrical around the center of the discs 1 and 2, so that the right and left advancing sections 173 inhibits the housed discs from inclining relative to the played disc to maintain a stable gap despite adverse effects such as the inclination or vibration of the apparatus.

Furthermore, since the advancing sections 173 of the disc gap maintaining means 170 are composed of the planes having the sharp junction, when the tip of the disc gap maintaining means 170 advances between the two housed discs adjacent to the played disc in the vertical direction, it can target a single point in the gap between the discs 1 and 2 to provide margins for displacements occurring when the disc gap maintaining means 170 is advancing. In addition, since the disc contact surfaces are the smooth planes 173*a* and 173*b*, sliding loads on the end surfaces of the discs 1 and 2 can be reduced to prevent the advancing section from being caught on the end of the disc.

Next, the configuration of a covering means 190 that is rotatably supported on the apparatus body 20 and that can cover at least a part of the opening 10*a* formed due to the protrusion of the tray 23 to the second position will be described with reference to FIGS. 1, 4, and 28 to 33. The first position in the apparatus body 20 at which the disc can be played corresponds to the disc playing position B, while the second position outside the apparatus body 20 at which the disc can be removed and changed corresponds to a disc removal and change position C at which the tray 23 protrudes out from the apparatus.

The covering means 190 has levers 191 that are rotatably supported on the apparatus body 20 and that rotationally move in response to the movement of the tray 23. The lateral pair of levers 191 are integrated with a lateral rotational-moving shaft 192 rotatably supported on the apparatus body 20. The levers 191 have a pair of protruding portions 193 that are located approximately laterally symmetrically around the center of the disc 1 or 2 placed on the tray 23 and that are spaced at an interval smaller than the outer diameter of the small-diameter disc 2. The opposed ends of the protruding portions 193 are each formed into a saw-teeth-shaped uneven surface 193*a*.

Furthermore, a passive lever 194 is integrated with the other (left) end of rotational-moving shaft 192, and is also integrated with a passive cam 195 that faces rearward when the levers 191 and passive lever 194 are rotationally moved rearward to assume a horizontal posture.

A cam 22d is formed on the other side of the tray base 22 and on the bottom surface of the longitudinal middle of the base 22 to slide under the passive cam 195 to stand and rotationally move it when the tray base 22 is moved in such a way as to protrude in the arrow W direction. This configuration allows the levers 191 to be rotationally moved when the cam 22d provided on the tray base 22 contacts and urges part of the lever 191 for rotational movement as the tray 23 is allowed to protrude.

Moreover, a linear cam body 22e is formed on the other side of the tray base 22 and on the bottom surface of the base 22 between its longitudinal middle and its front end. The linear cam body 22e is configured to abut on the stood and rotationally moved passive cam 195 from the front to bring down and rotationally move the passive cam 195 in the horizontal direction and to then sit above the horizontally brought-down passive cam 195 to inhibit it from being deflected in the direction in which it is stood and rotationally moved while the tray 23 is moving.

Figure 28:
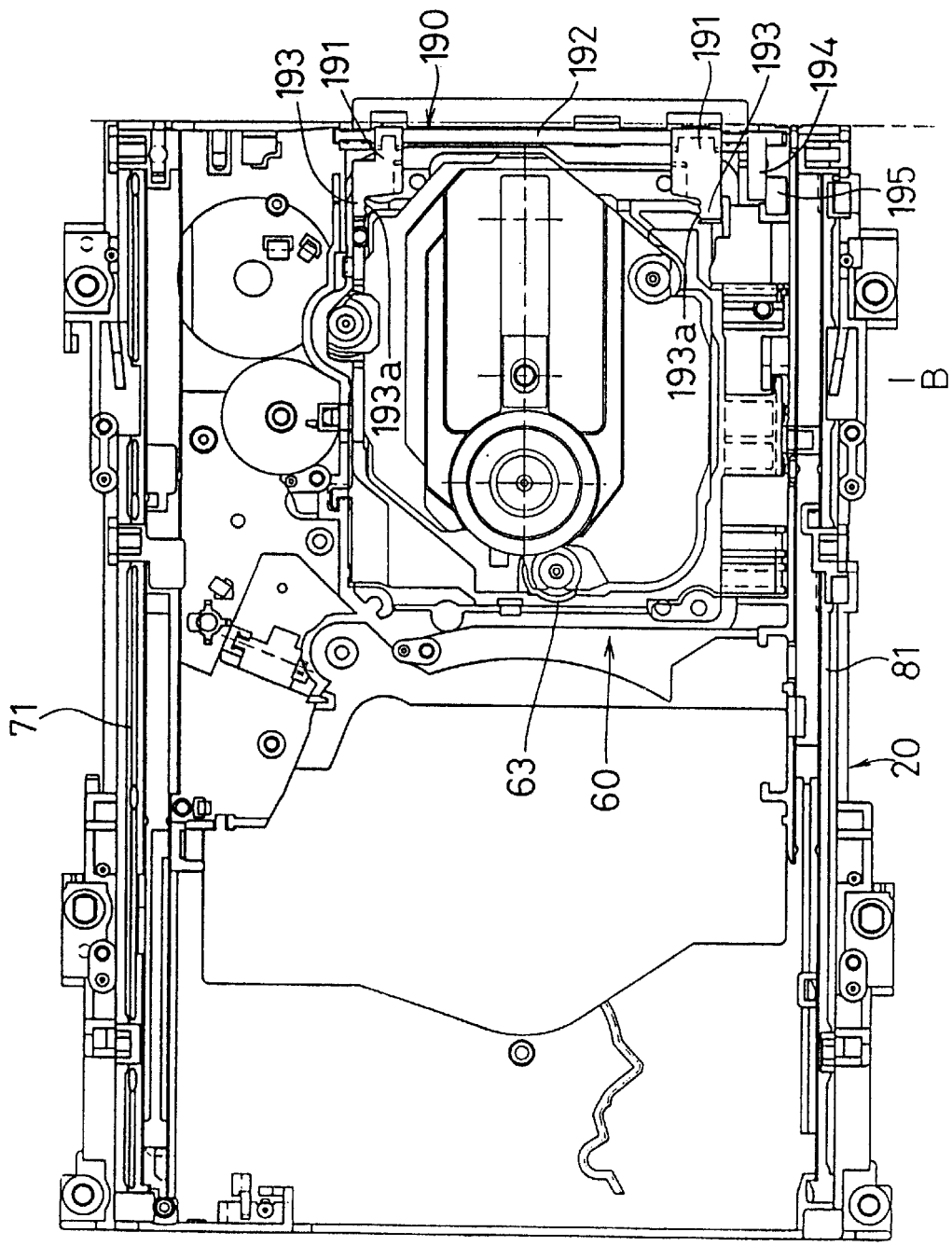
FIG. 28 is a top view showing a covering means of the disc changer in a play state.

The components 191 to 195 constitute an example of the covering means 190. According to the covering means 190, when the tray 23 is at the disc playing position B after moving in the arrow X direction together with the tray base 22, the passive lever 194 and the levers 191 are brought down and rotationally moved rearward, as shown in FIGS. 28 and 29.

Figure 30:
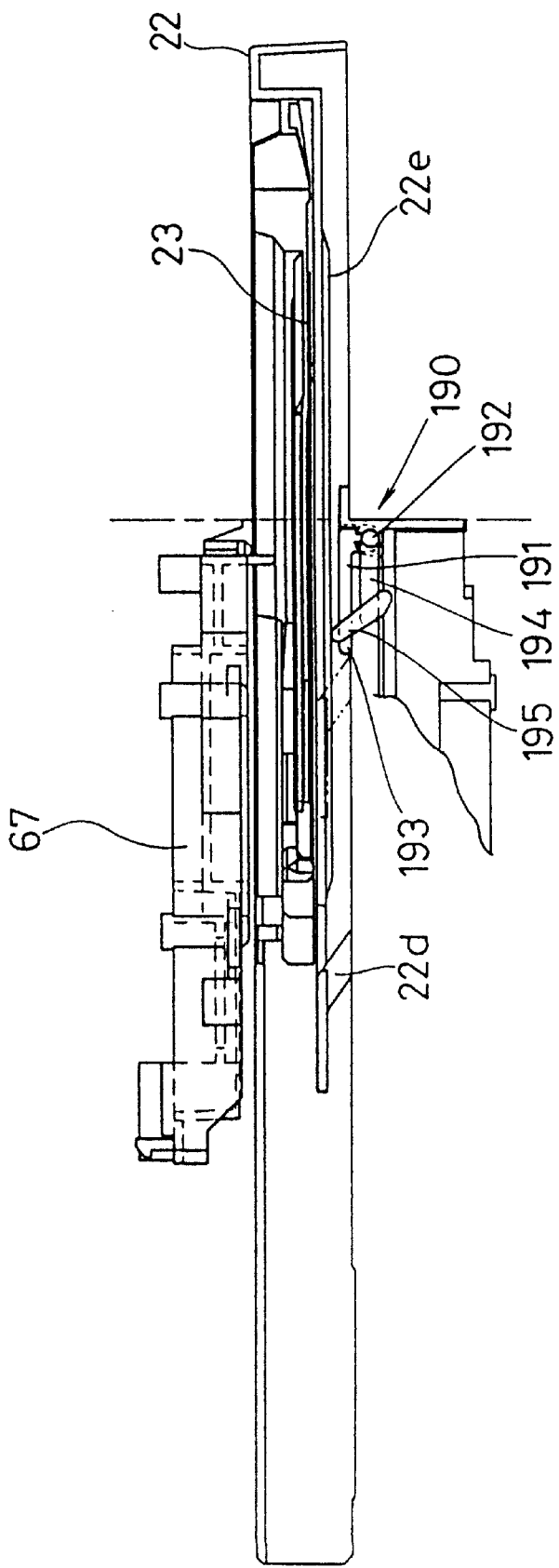
FIG. 30 is a side view showing the covering means of the disc changer wherein the play state is being switched to the open state.

In allowing the tray 23 to protrude from the disc playing position B to the disc removal and change position C, the linear cam body 22e is positioned above the horizontally brought-down passive cam 195 to inhibit the passive lever 194 and the levers 191 from being deflected in the direction in which they are stood and rotationally moved, as shown in FIG. 30.

Figure 31:
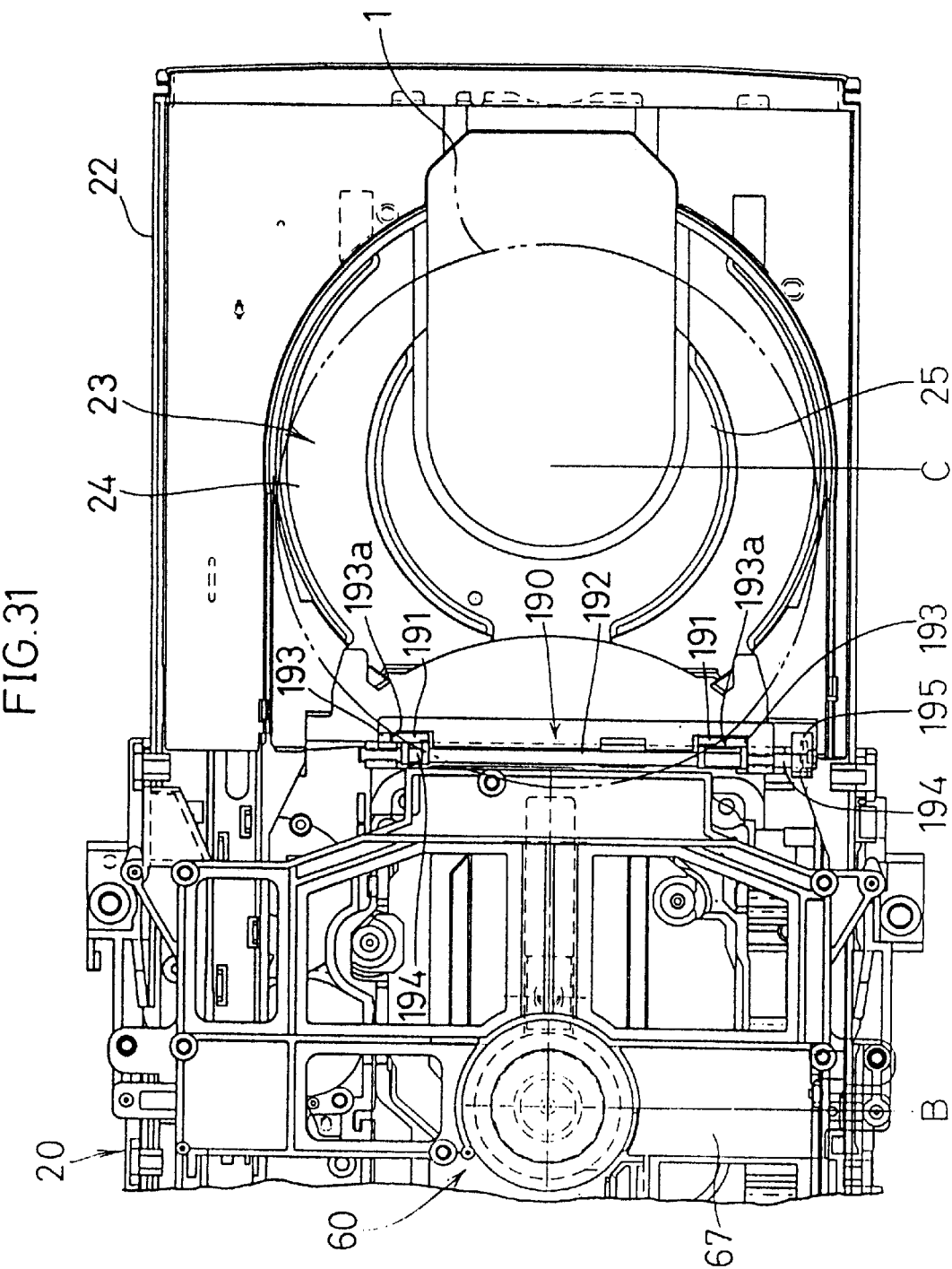
FIG. 31 is a top view showing the covering means of the disc changer in the open state.
Figure 32:
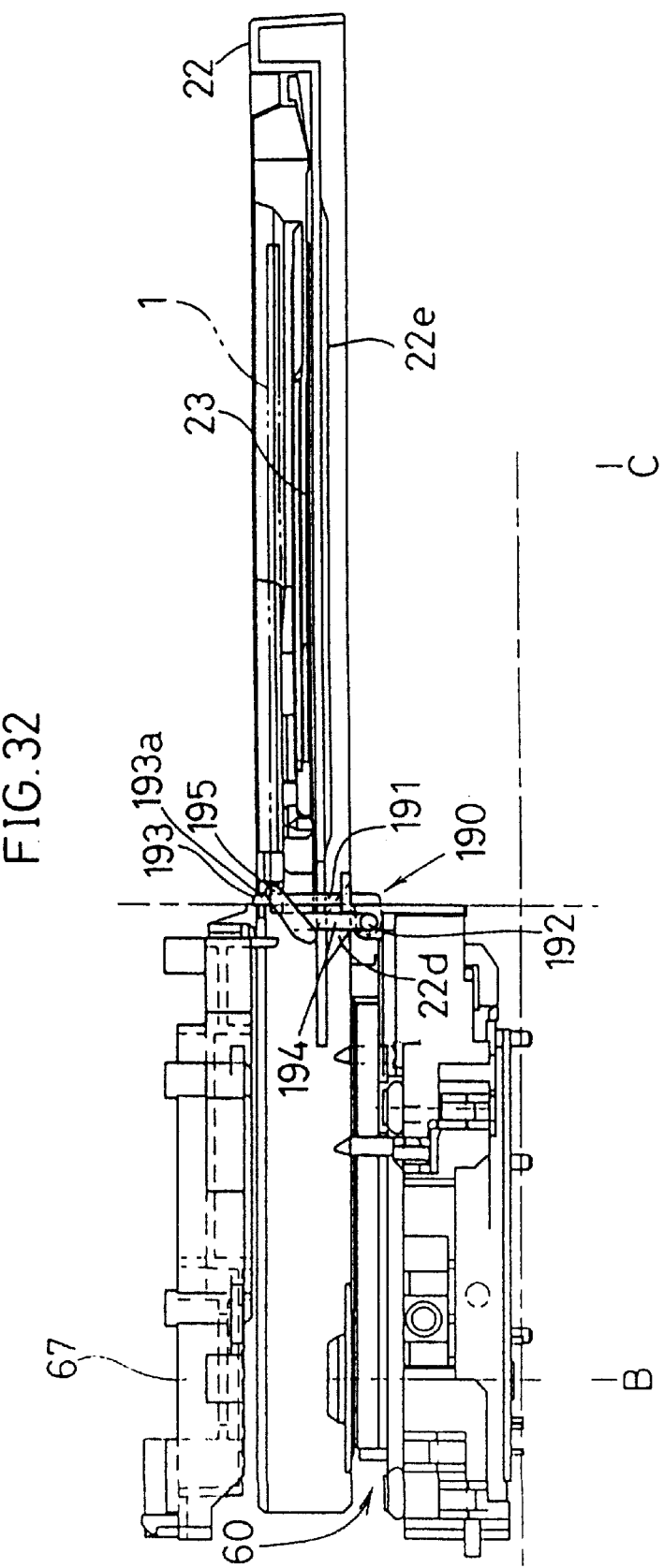
FIG. 32 is a side view showing the covering means of the disc changer in the open state.
Figure 33:
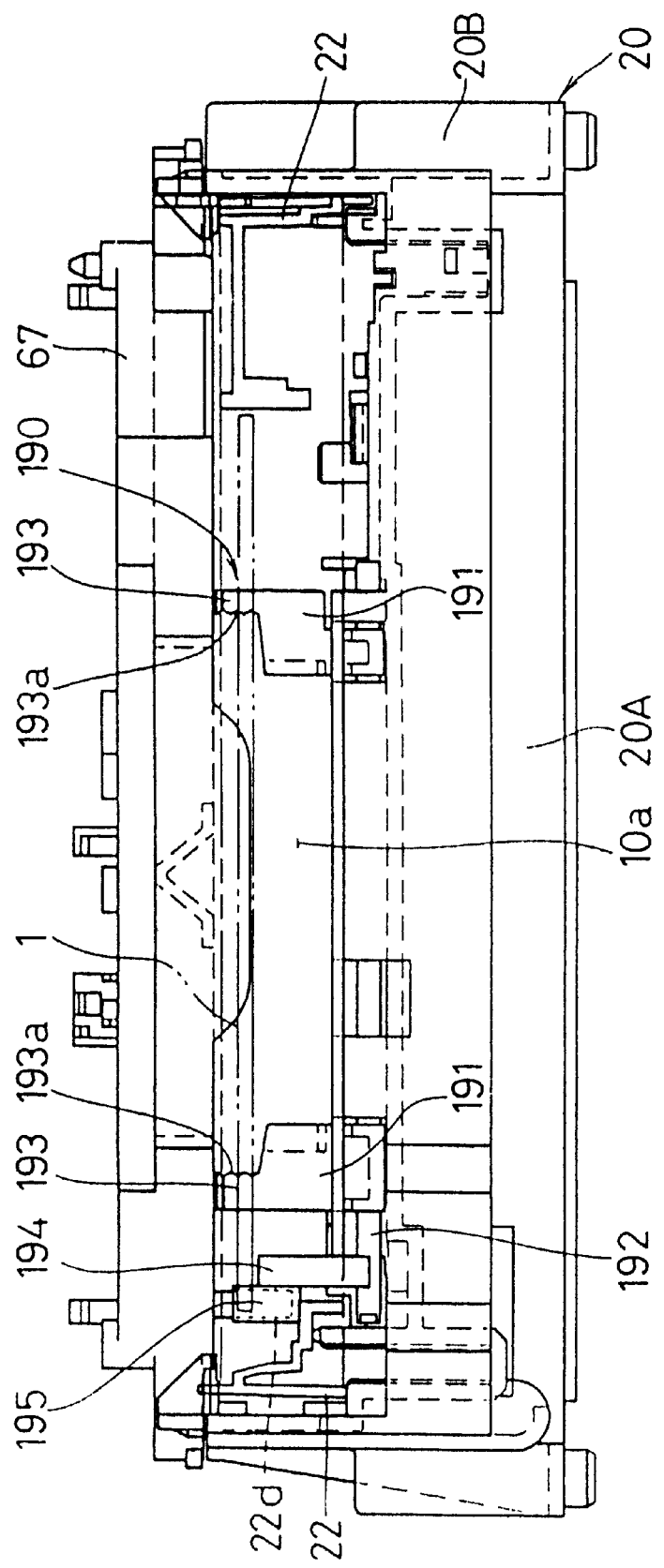
FIG. 33 is a front view showing the covering means of the disc changer in the open state.

Once this protruding movement has caused the tray 23 to protrude and move to the disc removal and change position C, the cam 22d on the tray base 22 slides under the passive cam 195 to stand and rotationally move it based on the cam effect, as shown in FIGS. 31 to 33. Then, the standing and rotational movement of the passive cam 195 causes the lateral pair of levers 191 to be integrally rotationally moved via the rotating shaft 192 to stand both levers 191.

Thus, both sides (at least part) of the opening 10a formed due to the protrusion of the tray 23 to the disc removal and change position C are covered by the protruding portions 193 integrated with both levers 191. In this state, the disc 1 or 2 is manually removed from the tray 23 at the disc removal and change position C or is changed. Subsequently, the tray 23 is moved in the arrow X direction together with the tray base 22, the linear cam body 22e abuts on the stood and rotationally moved passive cam 195 from the front to automatically bring down and rotationally move the passive cam 195 in the horizontal direction, thereby returning the tray 23 to the disc playing position B as shown in FIGS. 28 and 29.

As described above, when the disc 1 or 2 is manually removed or changed and if the small-diameter 2 is likely to accidentally fall toward the inside of the apparatus body 20 through the opening 10a formed due to the opening of the tray 23, the end of the small-diameter disc 2 is caught between the saw-teeth-shaped uneven surfaces 193a formed on the pair of protruding portions 193 provided at an interval smaller than the outer diameter of the small-diameter disc 2, as shown by the imaginary lines in FIGS. 31 to 33, thereby preventing the small-diameter disc 2 from falling into the apparatus body 20.

In this case, since the small-diameter disc 2 is caught between the saw-teeth-shaped uneven surfaces 193a, it is also inhibited from vertical movements to prevent its end from floating and passing beyond the protruding portion 193. Thus, the disc is firmly caught between the surfaces 193a.

As described above, the rotational movement of the levers 191 are automatically driven by the cam 22d and linear cam body 22e provided on the tray 23 in order to open or close the tray 23. Accordingly, even if the disc 1 or 2 is pressed toward the interior of the apparatus body 20 while contacting the levers 191, the levers 191 are precluded from being rotationally moved and brought down, thereby ensuring to prevent the disc 1 or 2 from falling into the apparatus body 20.

Next, the configuration of a detection means 180 partly responsible for control will be described with reference to FIGS. 3 and 16. The detection means 180 consists of a group of detection switches provided on a fixed substrate 181 integrated with the apparatus body 20 and a group of operation cams provided on one 71 of the plates and the tray base 22. The group of detection switches provided on the fixed substrate 181 consist of an open switch 182, a first switch 183, and a second switch 184 arranged in this order from front to rear.

In addition, one 71 of the plates has thereon a first operation cam 185 and a second operation cam 186 that simultaneously turn the first and second switches 183 and 184 on, a third operation cam 187 that turns only the first switch 183 on, and a fourth operation cam 188 that turns only the second switch 184 on. A fifth operation cam 189 is provided on the tray base 22 to turn only the open switch 182 on, as shown in FIG. 3.

The components 181 to 189 constitute an example of the detection means 180. According to the detection means 180, when one 71 of the plates moves to the playing position, the first and second operation cam 185 and 186 simultaneously turn the first and second switches 183 and 184 on to detect that the disc is to be played, based on the movement to the playing position, in order to allow required control to be effected (see FIG. 16(A)). When one 71 of the plates moves to the change position, the third operation cam 187 turns only the first switch 183 on to detect that the disc is to be changed, based on the movement to the change position, in order to allow required control to be effected (see FIG. 16(B)).

Furthermore, when one 71 of the plates moves to the stock position, the fourth operation cam 188 turns only the second switch 184 on to detect that the disc is to be stocked, based on the movement to the stock position, in order to allow required control to be effected (see FIG. 16(C)). In addition, when the tray base 22 protrudes to open the tray, the fifth operation cam 189 turns only the open switch 182 on to detect that the tray is open, in order to allow required control to be effected.

The operation of the disc changer 19 configured as described above and that is an example of the present embodiment will be described.

Figure 42:
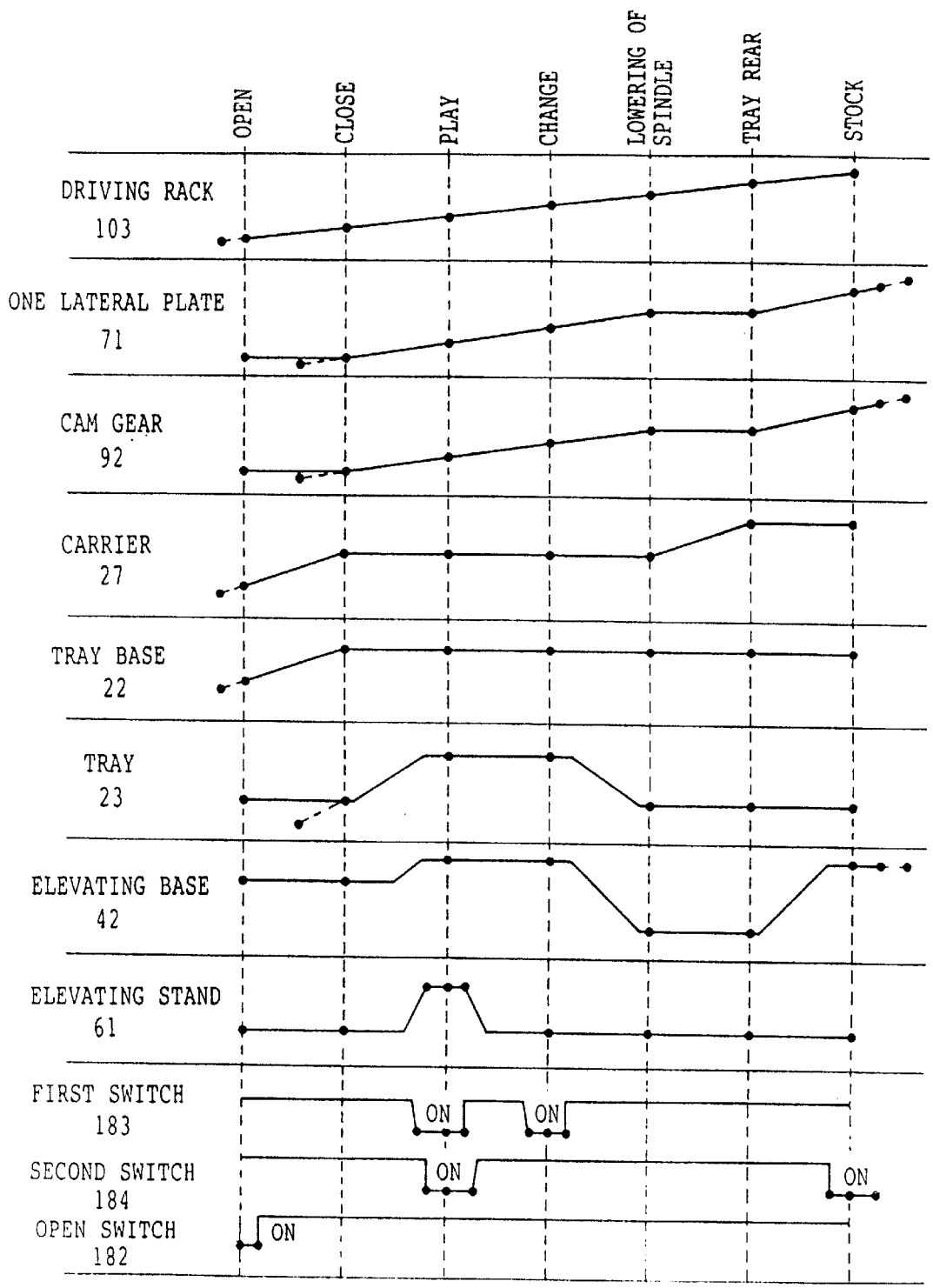
FIG. 42 is a timing chart for each section of the disc changer.
Figure 43:
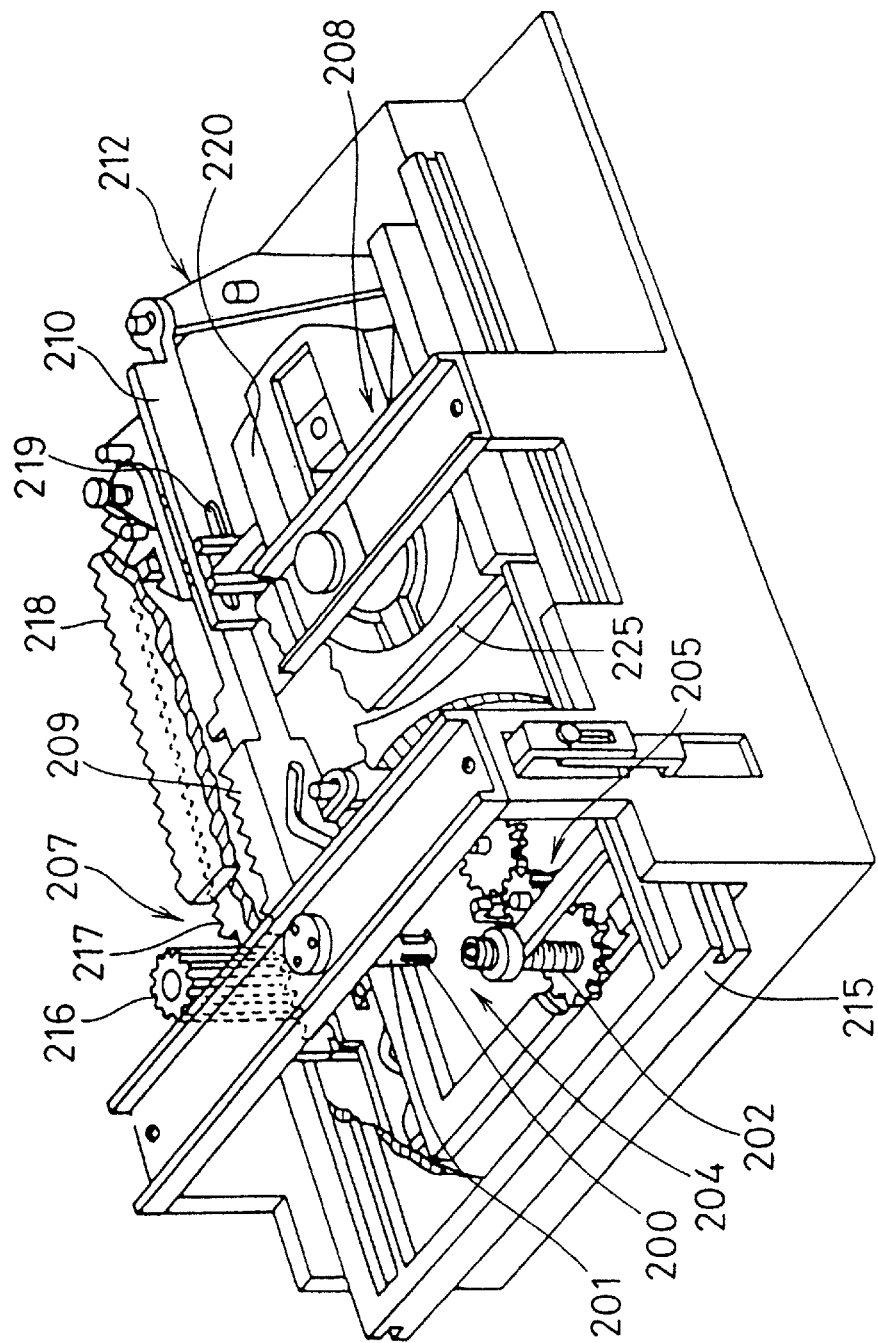
FIG. 43 is a perspective view showing a disc changer according to a conventional improved example with an armoring case removed therefrom.
Figure 44:
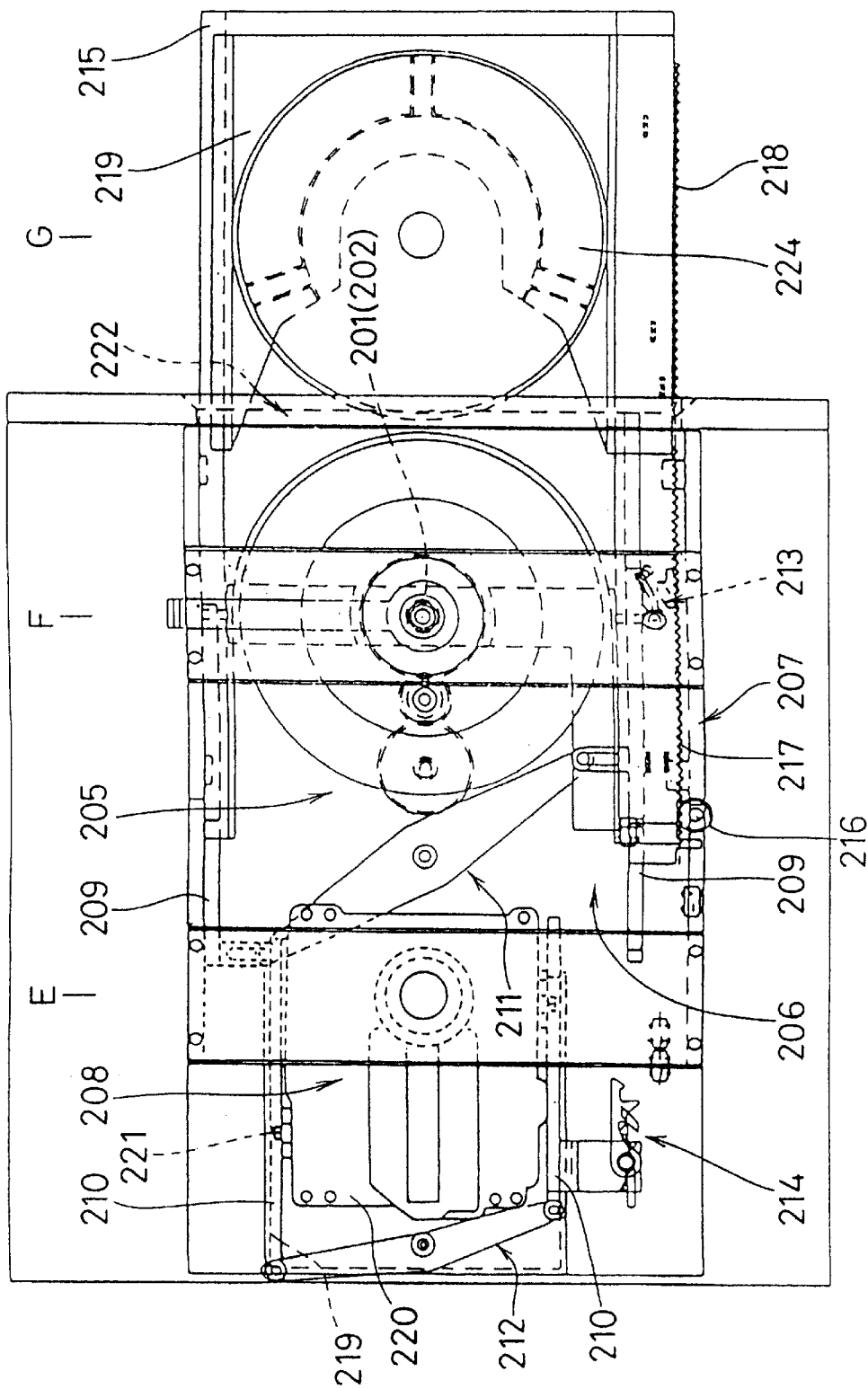
FIG. 44 is a top view showing the disc changer with the armoring case removed therefrom.
Figure 45:
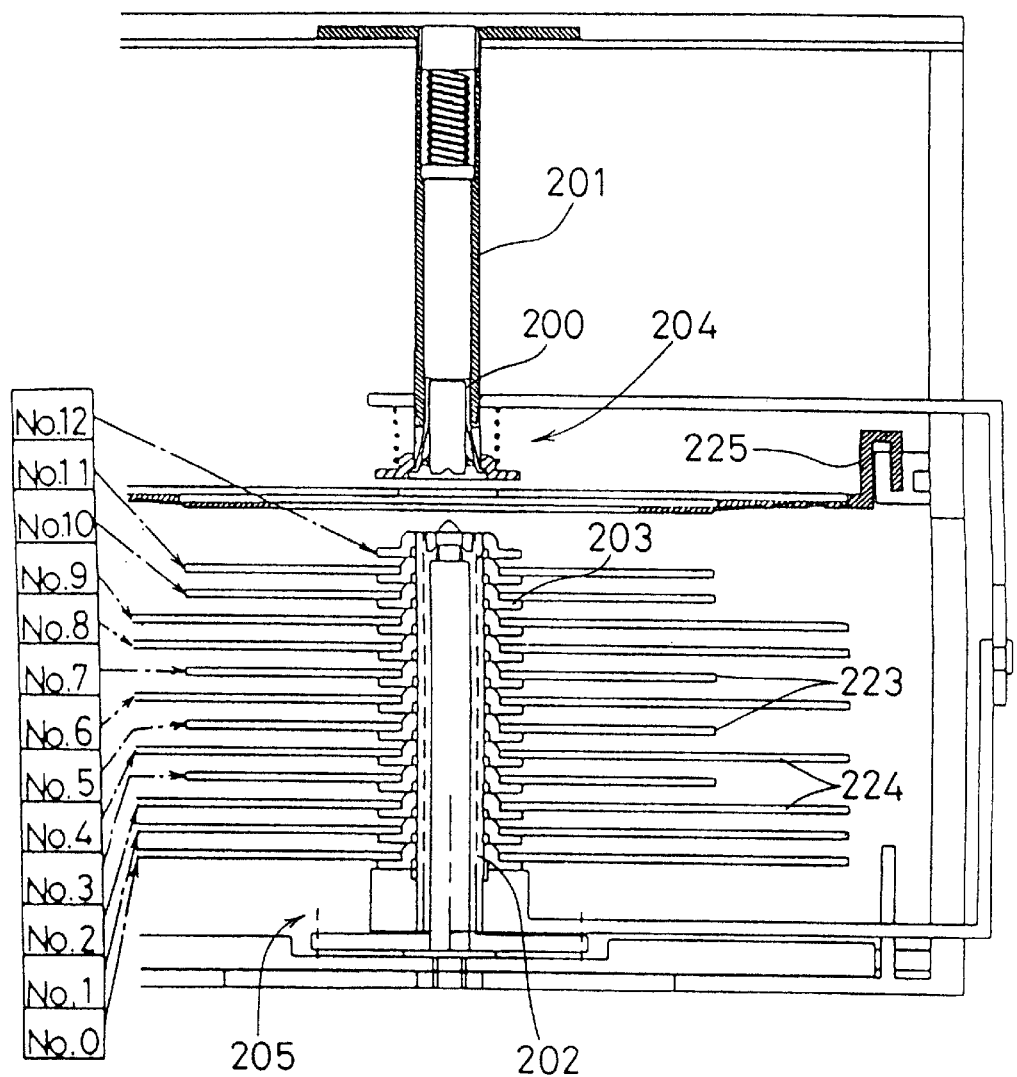
FIG. 45 is a side view of a disc holding means of the disc changer.

The operation will be described with reference to the timing chart in FIG. 42. This figure describes timings for the driving of the driving rack 103, one 71 of the plates (or the other plate 81), the cam gear 92, the carrier 27, the tray base 22, the tray 23, the elevating base 42, the elevating stand 61, the first switch 183, the second switch 184, and the open switch 182 and for the open state, the close state, the play state, the change state, the lower-spindle lowering state, the tray rear state, and the stock state.

Figure 4:
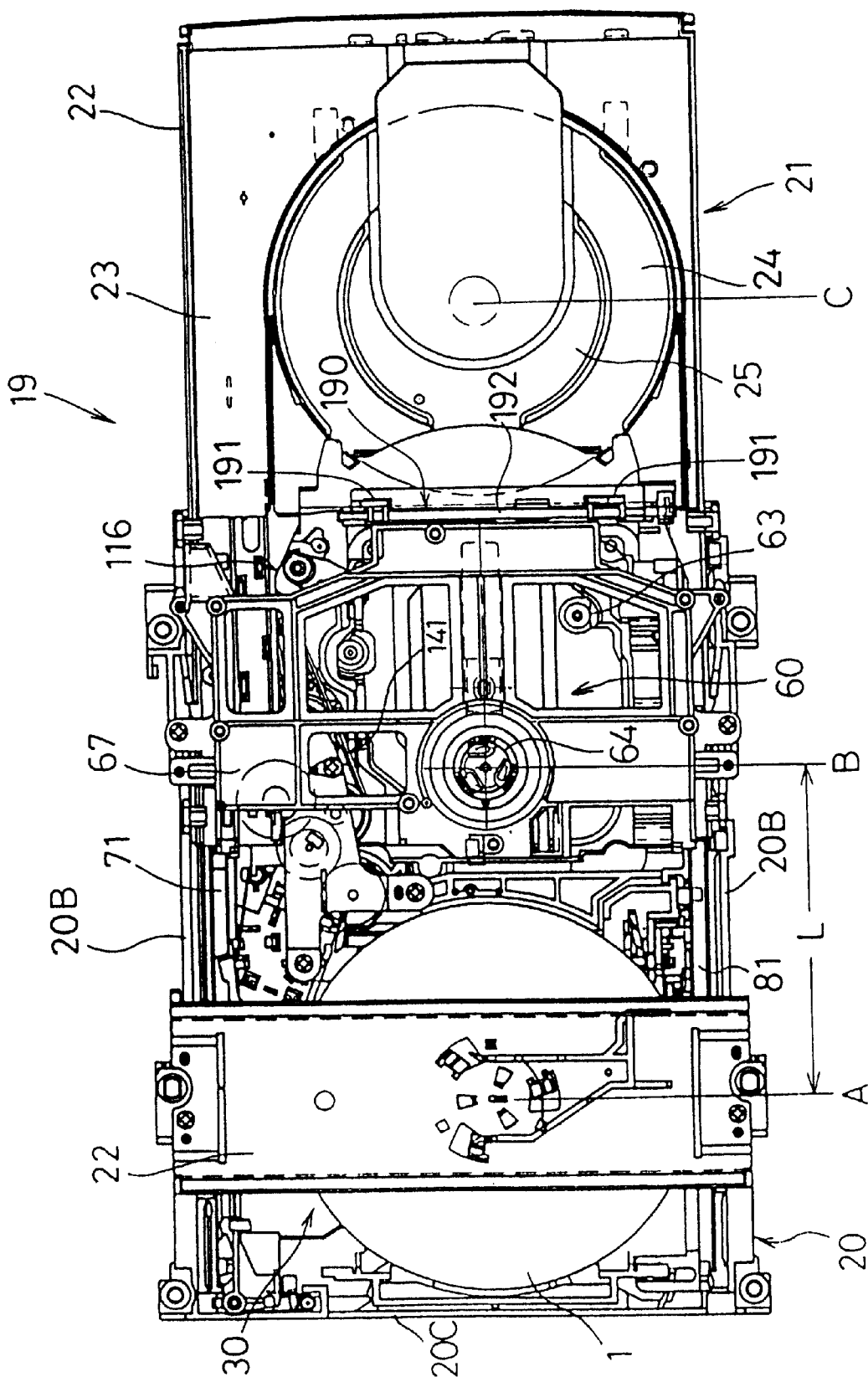
FIG. 4 is a top view showing the disc changer with the armoring case removed therefrom.

FIGS. 1 and 4 show a state in which the horizontal-driving means 100 has driven the tray base 22 and the tray 23 so as to protrude from the front panel 10 in the arrow W direction and in which the open switch 182 has then caused the driving source 140 to be stopped.

Figure 34:
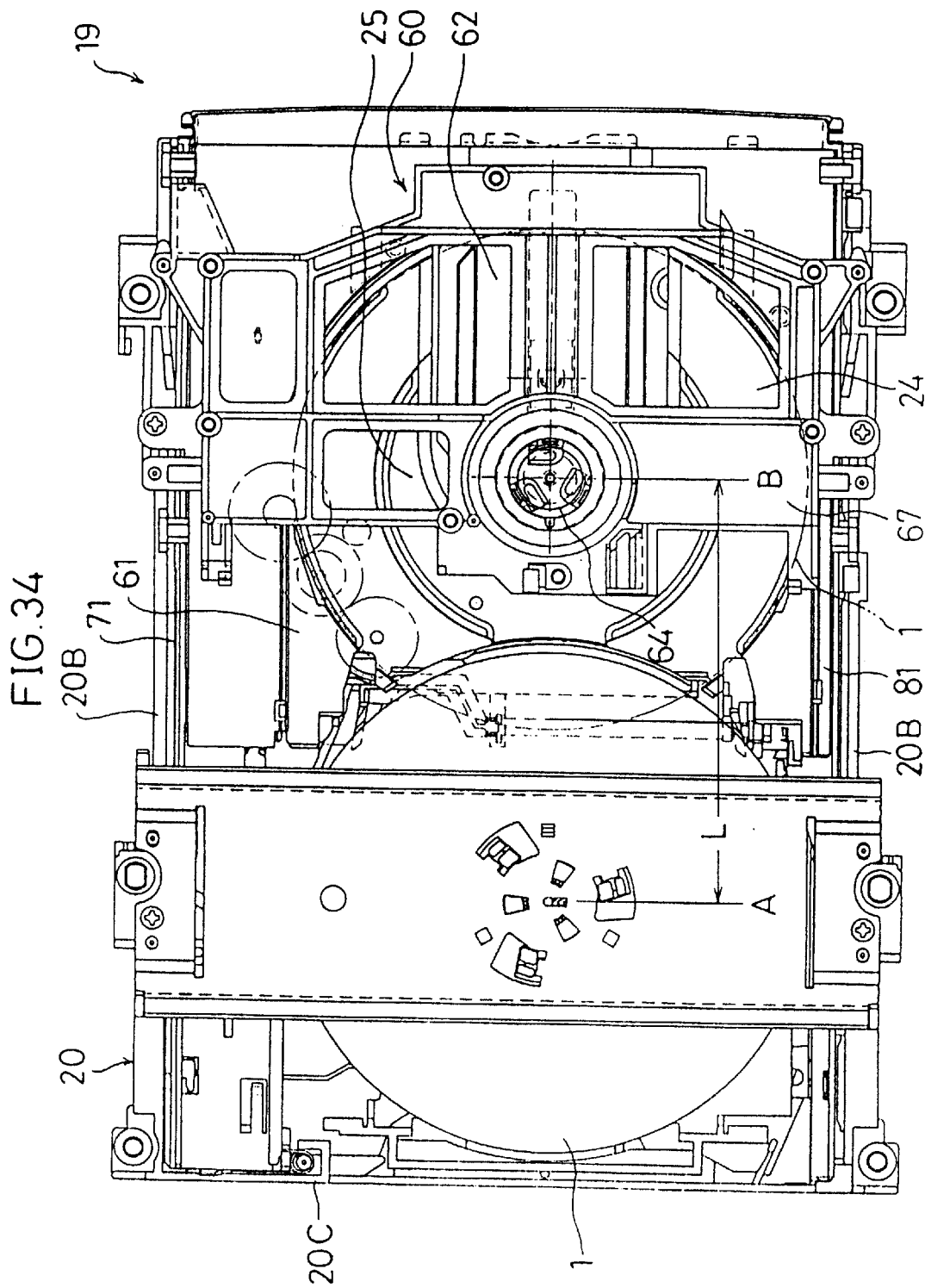
FIG. 34 is a top view showing a disc change operation of the disc changer in the play state.
Figure 36:
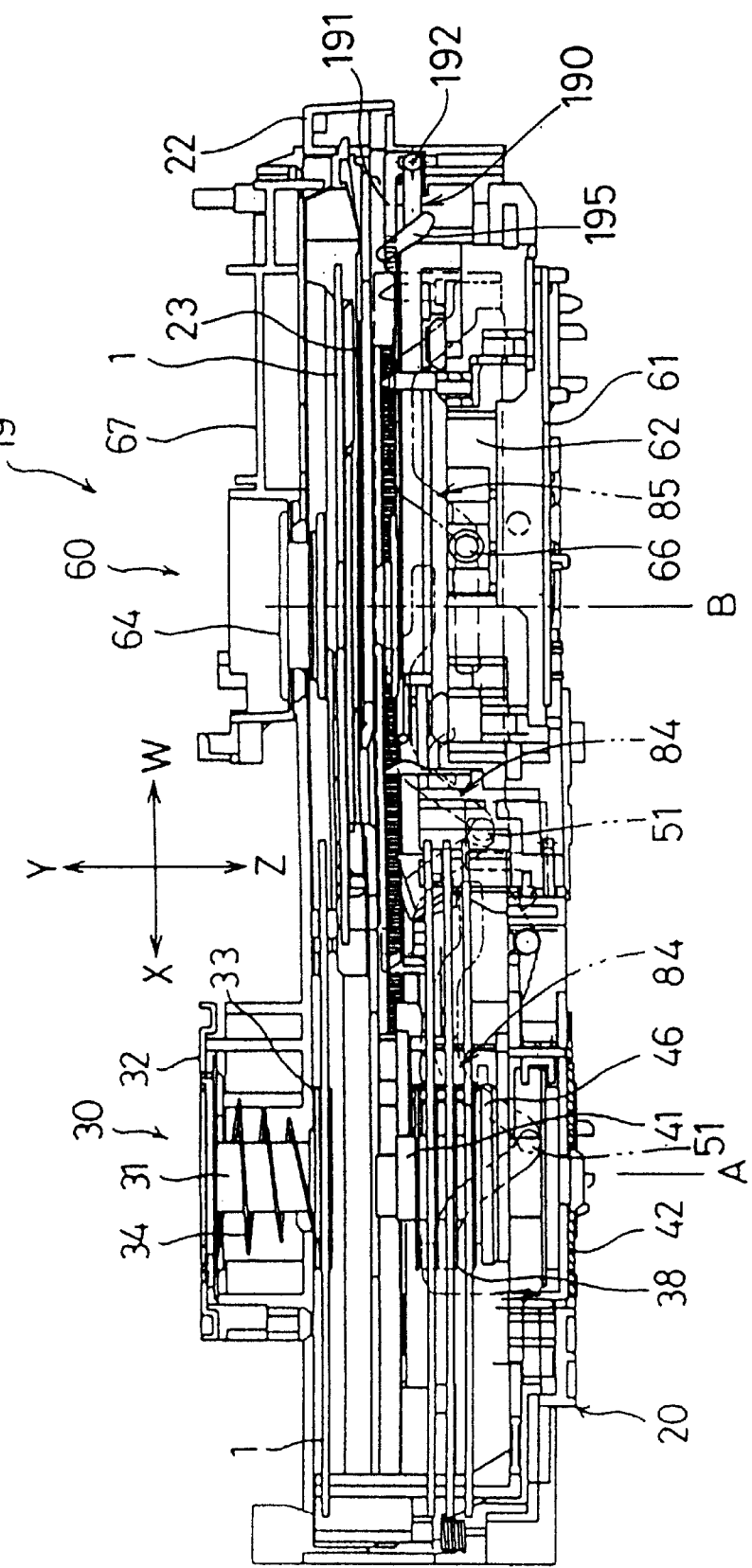
FIG. 36 is a side view showing the disc change operation of the disc changer wherein the lower spindle has lowered and wherein the tray is located at a front position.

In this state, after the large-diameter disc 1 (or the small-diameter disc 2) on the tray 23 has been changed (or supplied), the open and close key 13 is pressed to move the tray base 22 in the arrow X direction in order to transfer the small-diameter disc 1 to the disc playing position B, as shown in FIGS. 34 and 36.

Then, the elevating means 70 elevates the recording/playing apparatus 62 to clamp the large-diameter disc 1 to enter the play state (see FIGS. 11A, 16A, and 35). In the meantime, the disc gap maintaining means 170 is rotationally moved to the disc housing position A to maintain the intended gap. After the disc has been played, the open and close key 13 is pressed again to move the tray base 22 in the arrow W direction in such a way as to protrude as shown in FIG. 1, thereby allowing the large-diameter disc 1 to be changed or removed from the tray 23.

In this case, the protruding portions 193 automatically cover both sides of the opening 10a, so if the large-diameter disc 1 is likely to accidentally fall toward the inside of the apparatus body 20 through the opening 10a, the end of the large-diameter disc 1 is caught between the saw-teeth-shaped uneven surfaces 193a formed in the pair of protruding portions 193 so as not to fall into the apparatus body 20.

After the disc play described above, to change the large-diameter disc 1 on the tray 23 for the large-diameter disc 1 at the disc housing position A, the corresponding one of the No. keys 12 is pressed. Then, the elevating means 70 descends to lower the recording/playing apparatus 62 to open the clamper, and the lower spindle 41 lowers to form a gap between the upper and lower spindles 41 and 31, resulting in a state in which the lower spindle has lowered and in which the tray is located at the front position (see FIGS. 11B and 36).

Subsequently, the horizontal-driving means 100 operates to move the tray 23 in the arrow X direction relative to the tray base 22 to position the large-diameter disc 1 in the gap between both spindles 31 and 41 and to transfer the large-diameter disc 1 to a position at which the centers of the tray 23 and large-diameter disc 1 are aligned with the centers of both spindles 31 and 41, resulting in a state in which the lower spindle has lowered and in which the tray is located at the rear position (see FIGS. 12A and 37).

Then, the elevating means 70 elevates to lift the elevating base 42 to allow the tray 23 to lift the large-diameter disc 1, resulting in the stock state (see FIGS. 12B, 16C, and 38). Then, after the switching mode, the disc holding means 30 is elevated via the gear train 151 by a distance corresponding to one pitch of the spacers, thereby allowing the large-diameter disc 1 to be held on the upper spindle 31 via the spacers 38.

Then, the elevating means 70 descends to lower the elevating base 42 to form a gap between both spindles 31 and 41, and the horizontal-driving means 100 then operates to move the tray 23 in the arrow Y direction relative to the tray base 22. The tray 23 then returns to the disc playing position B, resulting in the state in which the lower spindle has lowered and in which the tray is located at the front position (see FIGS. 11B and 36).

Then, the elevating means 70 elevates to lift the elevating base 42 to connect both spindles 31 and 41, and the change state is then entered (see FIGS. 13, 16B, 26, and 39). Then, after the switching mode, the disc holding means 30 is rotationally driven via the gear train 151 to move the spacers 38 between both spindles 31 and 41 up to a position at which the target large-diameter disc 1 can be held at the bottom of the upper spindle 31.

Then, the elevating means 70 descends to lower the elevating base 42 to form a gap between both spindles 31 and 41, and the horizontal-driving means 100 then operates to move the tray 23 in the arrow X direction relative to the tray base 22, thereby positioning the empty tray 23 in the gap between both spindles 31 and 41 (the state in which the lower spindle has lowered and in which the tray is located at the rear position).

Then, the elevating means 70 elevates to lift the elevating base 42 to connect both spindles 31 and 41, thereby entering the stock state again (see FIGS. 12B, 16C, and 38). Then, after the switching mode, the disc holding means 30 is lowered via the gear train 151 to pass onto the tray 23 the target large-diameter disc 1 held on the upper spindle 31.

Then, the elevating means 70 descends to lower the elevating base 42 to form a gap between both spindles 31 and 41, and the horizontal-driving means 100 then operates to move the tray 23 in the arrow W direction relative to the tray base 22 in order to position the large-diameter disc 1 on the tray 23, at the disc playing position B (the state in which the lower spindle has lowered and in which the tray is located at the front position). Then the above play state is entered (see FIGS. 11A, 16A, 27, and 35).

In this manner, by driving the positions of the plurality of spacers 38 and the plurality of large-diameter discs 1 installed on both spindles 31 and 41 in the vertical direction, any large-diameter disc 1 can be shifted from the position on both spindles 31 and 41 to the disc playing position B, then to the removal position, and back to the disc housing position A on both spindles 31 and 41, and any large-diameter disc 1 can be selected for recording/playing. This configuration eliminates the needs for a stocker having a plurality of shelves or a plurality of subtrays, thereby reducing the weight and costs of the apparatus and providing a disc changer having excellent housing and operating capabilities.

During the above operations, of the modes shown in FIG. 41, a plurality of modes are executed.

In the disc changer that operates as described and that is an embodiment of this invention, its state during the disc change operation changes as shown below.

(1) Horizontal Movement in the X Direction (=Driving of the Elevating Means+Driving of the Disc Transfer Means)

"play state"→(change state: pass)→(spindle open and tray front)→(spindle open and tray rear)→"stock state" . . . The horizontal driving is switched to the spacer vertical driving.

(2) Vertical Driving in the Stock State

One pitch elevation . . . This operation causes the disc on the tray to be transferred onto the spacer. After the elevation by one pitch, the vertical driving is switched to the horizontal driving again.

(3) Horizontal Driving in the W Direction

"Stock state"→(spindle open and tray rear)→(spindle open and tray front)→"change state" . . . The horizontal driving is switched to the spacer vertical driving again.

(4) Vertical Driving in the Change State

Elevation or lowering to a predetermined position . . . The next disc to play is moved to a position at which it can be held at the bottom of the upper spindle. After the movement of the spacers, the vertical driving is switched to the horizontal driving again.

(5) Horizontal Driving in the X Direction

"Change state"→(spindle open and tray front)→(spindle open and tray rear)→"stock state" . . . The horizontal driving is switched to the spacer vertical driving again.

(6) Vertical Driving in the Stock State

One pitch lowering . . . This operation causes the disc on the spacer to be transferred onto the tray. After the lowering by one pitch, the vertical driving is switched to the horizontal driving again.

(7) Horizontal Driving in the W Direction

"Stock state"→(spindle open and tray rear)→(spindle open and tray front)→"change state: pass"→"play state" . . . The disc change operation is finished.

Although the above operations correspond to a procedure for automatically changing the disc being played for another disc housed in the spindles, the keys can be operated to perform various operations such as open, play, and open; and open, selection from housed discs, and play or open.

Although the disc changer that operates as described above and that is an embodiment of this invention has been described in conjunction with the large-diameter disc 1, it is also applicable to the small-diameter disc 2 or a mixture of the large- and small-diameter discs 1 and 2.

What is claimed is:

1. A disc changer that houses a plurality of discs and that selects an arbitrary one from the plurality of housed discs for recording/playing, the disc changer comprising:

an apparatus body;

disc transfer means for transferring a disc in the apparatus body between a disc housing position and a disc playing position;

a vertical pair of spindles detachably holding a plurality of spacers at said disc housing position;

disc holding means capable of relatively elevating and lowering said spindles and driving said spacers in a vertical direction to deliver the disc to said disc transfer means;

disc playing means supported on said apparatus body at said disc playing position so as to be able to elevate and lower;

elevating means for elevating and lowering said spindles and said disc playing means; and disc gap maintaining means that can advance between housed discs adjacent to a played disc in the vertical direction.

2. A disc changer according to claim 1, wherein the distance between the center of the disc housed at said disc housing position and the center of the disc played at said disc playing position is larger then 100 mm and smaller than 120 mm.

3. A disc changer according to claim 1, wherein said disc gap maintaining means has levers rotatably supported on the elevating base of said spindles.

4. A disc changer according to claim 1, wherein said disc gap maintaining means is driven by said elevating means.

5. A disc changer according to claim 1, wherein said disc gap maintaining means is provided between said disc playing position and said disc housing position.

6. A disc changer according to claim 1, wherein sections of said disc gap maintaining means that advance between adjacent discs are provided at two positions that are approximately symmetrical about a centerline common to a played disc and housed discs.

7. A disc changer according to claim 1, wherein the sections of said disc gap maintaining means that advance between adjacent discs comprise two smooth planes having a sharp junction and that can contact the respective end surfaces of an upper and a lower discs.

* * * * *